(12) United States Patent
Benzschawel

(10) Patent No.: US 10,415,605 B1
(45) Date of Patent: Sep. 17, 2019

(54) SYSTEMS AND METHODS FOR CORPORATE LOAN PRICING

(75) Inventor: Terry Benzschawel, New York, NY (US)

(73) Assignee: Citigroup Global Markets, Inc., New York, NY (US)

( * ) Notice: Subject to any disclaimer, the term of this patent is extended or adjusted under 35 U.S.C. 154(b) by 372 days.

(21) Appl. No.: 13/559,714

(22) Filed: Jul. 27, 2012

(51) Int. Cl.
*G06Q 40/04* (2012.01)
*F15B 7/00* (2006.01)

(52) U.S. Cl.
CPC .............. *F15B 7/001* (2013.01); *G06Q 40/04* (2013.01)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| | | | | |
|---|---|---|---|---|
| 7,256,446 B2 * | 8/2007 | Hu et al. | .......................... | 257/316 |
| 7,979,335 B2 * | 7/2011 | Schneider | .................... | 705/36 R |
| 8,249,981 B2 * | 8/2012 | Keenan et al. | .................. | 705/38 |
| 8,577,774 B2 * | 11/2013 | Glinberg | ................ | G06Q 40/00 705/36 R |
| 8,626,639 B2 * | 1/2014 | Studnitzer | ............ | G06Q 20/023 705/37 |
| 8,781,948 B2 * | 7/2014 | Studnitzer | .............. | G06Q 40/04 705/37 |
| 2003/0135450 A1 * | 7/2003 | Aguais et al. | ................... | 705/38 |
| 2005/0027645 A1 * | 2/2005 | Lui et al. | ......................... | 705/38 |
| 2005/0144117 A1 * | 6/2005 | Misra et al. | ..................... | 705/38 |
| 2013/0262338 A1 * | 10/2013 | Shah | ...................... | G06Q 40/00 705/36 R |
| 2014/0214718 A1 * | 7/2014 | Kongtcheu | ............ | G06Q 40/00 705/36 R |

OTHER PUBLICATIONS

Aguais et al., Building a Credit Risk Valuation Framework for Loan Instruments, Algo Research Quarterly, 2000, pp. 21-46, vol. 3, No. 1.
Benzschawel et al., Effect of Stochastic and Correlated Defaults and Recoveries on CDO Tranche Returns, Journal of Structured Finance, 2005, pp. 44-63, vol. 11, No. 2.
Benzschawel et al., Relative Value among Corporate Credits, The Quantitative Credit Analyst, Citigroup, 2006, pp. 7-23, Issue 5.
Benzschawel et al., Loan Valuation, Encyclopedia of Quantitative Finance, R. Cont (Ed.), Wiley and Sons, 2010.
Benzschawel et al., Market-Implied Default Probabilities: Update, Sep. 9, 2011, 39 pages.

(Continued)

*Primary Examiner* — Frantzy Poinvil
(74) *Attorney, Agent, or Firm* — Eric L. Sophir; Dentons US LLP

(57) ABSTRACT

In one embodiment, a computer-implemented method for calculating the price of a corporate loan comprises receiving, by a server, a first data input regarding a particular corporate loan; receiving, by the server, a second data input regarding market data; generating a pricing lattice for the corporate loan, wherein the pricing lattice has a first axis for a credit rating and a second axis for a time period; and deriving, by a server, using backward induction, a value for the corporate loan.

17 Claims, 48 Drawing Sheets

(56) References Cited

OTHER PUBLICATIONS

Bohn, A Survey of Contingent-Claims Approaches to Risky Debt Valuation, The Journal of Risk Finance, pp. 53-70, Spring 2000, vol. 1, No. 3.

Crouhy et al., Credit Rating Systems, in Risk Management, Chapter 7, 2001, pp. 259-313, McGraw-Hill, New York.

Deitrick et al., Leveraged Loan Handbook: A Guide to the Corporate Loan Market, Citi Markets and Banking, 2004, 63 pages.

Downs et al., Dictionary of Finance and Investment Terms, Barron's, Hauppauge, New York, 1991.

Duffie et al., Modeling Term Structures of Defaultable Bonds, Review of Financial Studies 12, 1999, pp. 687-720, No. 4.

Emery et al., Corporate Default and Recovery Rates, Moody's Global Corporate Finance, 1920-2007, Special Comment, 2008, 60 pages.

Israel et al., Finding Generators for Markov Chains via Empirical Transition Matrices with Applications to Credit ratings, Mathematical Finance, 2001, pp. 245-265, vol. 11, No. 2.

Jarrow et al., A Markov Model for the Term Structure of Credit Spreads, The Review of Financial Studies, 1997, pp. 481-523, vol. 10, No. 2.

Markowitz, Portfolio Selection, Journal of Finance, 1952, pp. 77-91, vol. 7, No. 1.

Merton, Theory of Rational Option Pricing, Bell Journal of Economics, 1973, pp. 141-183, vol. 4, No. 1.

Merton, On the Pricing of Corporate Debt: The Risk Structure of Interest Rates, Journal of Finance 29, 1974, pp. 449-470, vol. 29, No. 2.

Miller et al., A Guide to the Loan Market, Standard & Poor's, 2007, 49 pages.

Rosen, Does Structure Matter?, Advanced Methods for Pricing and Managing the Risk of Loan Portfolios, Algorithmics Inc., 2002, 53 pages.

Samson et al., Corporate Ratings Criteria, Standard & Poor's, 2008, 107 pages, McGraw-Hill Companies.

Sobehart et al., Hybrid Contingent Claims Models: A Practical Approach to Modeling Default Risk. In Credit Ratings: Methodology, Rationale and Default Risk, M. Ong ed., Risk Books, UK 2002, 21 pages.

Sobehart et al., Hybrid Probability of Default Model, Quantitative Credit Analyst, Citi Markets and Banking, 2003, p. 5-30, Issue 3.

Statement of Financial Accounting Standards No. 157, Fair Value Measurements, Financial Accounting Series, Financial Accounting Standards Board, No. 284-A, Sep. 2006, 158 pages.

Statement of Financial Accounting Standards No. 159, The Fair Value Option for Financial Assets and Financial Liabilities, Financial Accounting Series, Financial Accounting Standards Board, No. 289-A, Feb. 2007, 60 pages.

Taylor et al., The Handbook of Loan Syndication & Trading, McGraw-Hill, 2007, pp. 213-216.

Vazza et al., Annual 2006 Global Corporate Default Study and Rating Transition, Standard and Poor's Global fixed Income Research, 2007, 47 pages.

Vazza et al., Default, Transition, and Recovery: 2007 Annual Global Corporate Default Study and Rating Transitions (Premium), Standard & Poor's Global fixed Income Research, 2008, 58 pages.

* cited by examiner

GLOBAL

| Pricing Date | Day Count | Calendar | Discount Curve | Reset | Funding Cost |
|---|---|---|---|---|---|
| 11/16/2008 | ACT/360 | NYK | USD Libor | 9/15/2008 | 35 |

AVERAGE CDS

| Rating | 1Y | 3Y | 5Y | 7Y | Recovery |
|---|---|---|---|---|---|
| AAA | 23 | 29 | 33 | 42 | 0.40 |
| AA | 29 | 39 | 43 | 53 | 0.40 |
| A | 46 | 66 | 86 | 84 | 0.40 |
| BBB | 78 | 112 | 136 | 0.40 |
| BB | 142 | 204 | 259 | 244 | 0.38 |
| B | 277 | 400 | 474 | 463 | 0.36 |
| CCC | 581 | 839 | 969 | 946 | 0.26 |

PRICING GRID

| Rating | Drawn Spread | Commit Fee |
|---|---|---|
| AAA | 150 | 40 |
| AA | 150 | 40 |
| A | 150 | 40 |
| BBB | 200 | 50 |
| BB | 250 | 55 |
| B | 300 | 60 |
| CCC | 400 | 100 |

DATA INPUTS

| Unique ID | Type | Currency | LCDS 1Y | LCDS 3Y | LCDS 5Y | LCDS 7Y | LCDS Recovery | Maturity | Coupon | Rating |
|---|---|---|---|---|---|---|---|---|---|---|
| LX063671 | TLB | USD | 100 | 225 | 246 | 280 | 0.70 | 11/26/2012 | 175 | B |
| LX065231 | TLB | USD | 502 | 585 | 627 | 643 | 0.69 | 10/31/2014 | 225 | B- |
| LX063951 | TLB | USD | 457 | 603 | 663 | 739 | 0.66 | 3/16/2014 | 225 | B- |
| LX041803 | TLB | USD | 208 | 267 | 358 | 492 | 0.73 | 1/3/2013 | 175 | B+ |
| 124846648 | Rev | USD | 49 | 114 | 148 | 165 | 0.39 | 11/5/2012 | 200 | BBB- |

DATA OUTPUTS

| Loan Recovery | Usage (%) | Model Price | Prepayment Option Price | CR01 | RR01 |
|---|---|---|---|---|---|
| 0.73 | 100 | 99.66 | 0.09 | -0.03 | 0.20 |
| 0.69 | 100 | 91.17 | 0.20 | -0.02 | 0.46 |
| 0.65 | 100 | 87.23 | 0.09 | -0.02 | 0.65 |
| 0.73 | 100 | 97.11 | 0.01 | -0.03 | 0.26 |
| 0.43 | 5 | 98.36 | | -0.03 | 0.05 |

FIG. 3

| From \ To | AAA | AA+ | AA | AA- | A+ | A | A- | BBB+ | BBB | BBB- | BB+ | BB | BB- | B+ | B | B- | CCC+ | CCC | CCC- | CC | D |
|---|---|---|---|---|---|---|---|---|---|---|---|---|---|---|---|---|---|---|---|---|---|
| AAA | 91.4 | 5.6 | 2.1 | 0.4 | 0.3 | 0.1 | 0 | 0 | 0 | 0 | 0 | 0 | 0 | 0 | 0 | 0 | 0 | 0 | 0 | 0 | 0 |
| AA+ | 2.9 | 80.9 | 7.9 | 6.6 | 1.1 | 0.3 | 0.2 | 0.1 | 0 | 0 | 0 | 0 | 0 | 0 | 0 | 0 | 0 | 0 | 0 | 0 | 0 |
| AA | 1.2 | 5.1 | 80.4 | 8.4 | 3.1 | 1.2 | 0.4 | 0.1 | 0.1 | 0 | 0 | 0 | 0 | 0 | 0 | 0 | 0 | 0 | 0 | 0 | 0 |
| AA- | 0.2 | 1.3 | 4.4 | 82.5 | 7.9 | 2.5 | 0.7 | 0.2 | 0.1 | 0.1 | 0 | 0.1 | 0 | 0.1 | 0 | 0 | 0 | 0 | 0 | 0 | 0 |
| A+ | 0.1 | 0.1 | 1.1 | 5.6 | 82.0 | 7.1 | 2.6 | 0.6 | 0.4 | 0.1 | 0.2 | 0.1 | 0.2 | 0 | 0.1 | 0 | 0 | 0 | 0 | 0 | 0 |
| A | 0.1 | 0.1 | 0.2 | 1.2 | 5.6 | 80.4 | 7.7 | 2.8 | 0.9 | 0.4 | 0.5 | 0.2 | 0.4 | 0.1 | 0.1 | 0.2 | 0.1 | 0 | 0 | 0 | 0.2 |
| A- | 0 | 0.1 | 0.1 | 0.3 | 2.1 | 8 | 76.9 | 6.8 | 3.4 | 1.1 | 0.9 | 0.5 | 0.8 | 0.5 | 0.5 | 0.2 | 0.2 | 0.2 | 0 | 0 | 0.3 |
| BBB+ | 0 | 0 | 0.1 | 0.1 | 0.3 | 2.3 | 7.5 | 76.3 | 7.6 | 3.1 | 1.8 | 0.7 | 1.3 | 0.8 | 0.8 | 0.8 | 0.2 | 0.2 | 0.2 | 0.1 | 0.7 |
| BBB | 0.1 | 0 | 0.1 | 0.1 | 0.2 | 0.8 | 3.3 | 6.9 | 77.0 | 7.0 | 5.7 | 2.7 | 4.4 | 1.4 | 1.2 | 1.1 | 0.1 | 0.2 | 0.1 | 0 | 0.8 |
| BBB- | 0.1 | 0 | 0.1 | 0.1 | 0.2 | 0.3 | 0.7 | 3.3 | 9.4 | 74.0 | 10.6 | 5.4 | 8.6 | 3.1 | 2.7 | 2.4 | 0.2 | 0.4 | 0.1 | 0 | 1.9 |
| BB+ | 0 | 0 | 0 | 0 | 0 | 0.2 | 0.4 | 0.8 | 3.2 | 10.6 | 70.0 | 68.0 | 69.4 | 8.4 | 5.1 | 4.3 | 0.5 | 0.6 | 0.3 | 0.1 | 2.8 |
| BB | 0 | 0 | 0 | 0 | 0 | 0.1 | 0.2 | 0.4 | 1.0 | 3.3 | 10.3 | 7.1 | 7.7 | 68.1 | 10.2 | 9.7 | 1.2 | 1.9 | 0.5 | 0.4 | 4.7 |
| BB- | 0 | 0 | 0 | 0 | 0 | 0.2 | 0.2 | 0.2 | 0.3 | 0.7 | 3.1 | 2.9 | 2.5 | 8.9 | 66.0 | 64.2 | 3.6 | 4.2 | 1.1 | 0.6 | 9.2 |
| B+ | 0 | 0 | 0 | 0 | 0.1 | 0.1 | 0.1 | 0.2 | 0.3 | 0.2 | 0.7 | 0.8 | 0.7 | 3.8 | 8.5 | 12.4 | 6.0 | 7.5 | 4.3 | 1.4 | 11.4 |
| B | 0 | 0.1 | 0 | 0 | 0 | 0.1 | 0.2 | 0.1 | 0.1 | 0.1 | 0.4 | 0.3 | 0.2 | 1.4 | 3.6 | 5.3 | 55.8 | 51.6 | 3.6 | 3.1 | 19.9 |
| B- | 0 | 0 | 0 | 0 | 0 | 0.2 | 0.1 | 0.1 | 0.1 | 0.2 | 0.1 | 0 | 0.7 | 1.3 | 1.8 | 3.3 | 9.4 | 7.3 | 48.2 | 5.1 | 27.9 |
| CCC+ | 0 | 0.1 | 0 | 0 | 0 | 0 | 0.1 | 0 | 0 | 0 | 0.0 | 0.3 | 0.2 | 1.4 | 0.5 | 2.5 | 4.7 | 4.4 | 6.3 | 6.2 | 37.0 |
| CCC | 0 | 0 | 0 | 0 | 0 | 0 | 0.1 | 0.1 | 0.3 | 0.5 | 0.3 | 0 | 0.7 | 0.1 | 0.7 | 0 | 1.5 | 0 | 0 | 47.1 | 0 |
| CCC- | 0 | 0 | 0 | 0 | 0 | 0 | 0.1 | 0.1 | 0 | 0 | 0.2 | 0.3 | 0.4 | 0 | 0 | 0 | 0 | 0 | 0 | 0 | 0 |
| CC | 0 | 0 | 0 | 0 | 0 | 0 | 0 | 0 | 0 | 0 | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 | 0 | 0 | 0 | 0 | 0 | 0 | 0 | 0 | 0 | 100 |

*FIG. 16*

| S&P Rating | Drawn Fee (% of Issuer CDS_3Yr) | Fee Min | Fee Max |
|---|---|---|---|
| A+ | 100 | 50 | 150 |
| A | 100 | 75 | 175 |
| A- | 100 | 100 | 200 |
| BBB+ | 100 | 125 | 225 |
| BBB | 100 | 150 | 250 |
| BBB- | 100 | 150 | 250 |

*FIG. 39*

| Rating | Coupon | | | | | Rating | Coupon | | | | |
|--------|----|-----|-----|-----|-----|--------|-----|-----|-----|-----|-----|
|        | 2  | 4   | 6   | 8   | 10  |        | 2   | 4   | 6   | 8   | 10  |
| A+     | 63 | 63  | 63  | 63  | 63  | A+     | 84  | 91  | 97  | 101 | 106 |
| A      | 75 | 75  | 75  | 75  | 75  | A      | 96  | 104 | 112 | 117 | 122 |
| A-     | 100| 100 | 100 | 100 | 100 | A-     | 100 | 100 | 100 | 100 | 100 |
| BBB+   | 125| 125 | 125 | 125 | 125 | BBB+   | 128 | 139 | 150 | 157 | 163 |
| BBB    | 150| 150 | 150 | 150 | 150 | BBB    | 150 | 162 | 174 | 183 | 190 |
| BBB-   | 174| 174 | 174 | 174 | 174 | BBB-   | 174 | 190 | 204 | 214 | 222 |

FIG. 40

| Net Debt/EBITDA Ratio (LR) | Drawn Spread (bp) |
| --- | --- |
| LR > 3.5 | 125 |
| 3.0 < LR <= 3.5 | 105 |
| 2.5 < LR <= 3.0 | 90 |
| 2.0 < LR <= 2.5 | 75 |
| 1.5 < LR <= 2.0 | 65 |
| LR <= 1.5 | 60 |

*FIG. 41*

| Issuer Name | Price ($) | | |
|---|---|---|---|
| | Based Grid | No Grid | Difference |
| ABBOTT LABORATORIES INC | 99.28 | 99.27 | -0.01 |
| ALTRIA | 100.00 | 100.00 | 0.00 |
| AMERICAN ELECTRIC POWER | 100.00 | 100.00 | 0.00 |
| BAKER HUGHES INCORPORATED | 99.63 | 99.61 | -0.02 |
| BORGWARNER INCORPORATED | 99.26 | 99.21 | -0.04 |
| CATERPILLAR INCORPORATED | 97.95 | 97.91 | -0.04 |
| CBS CORPORATION | 100.00 | 100.00 | 0.00 |
| CONSTELLATION ENERGY GROUP INC | 98.59 | 98.53 | -0.07 |
| CUMMINS INC | 99.35 | 99.28 | -0.08 |
| DEERE & COMPANY | 99.57 | 99.55 | -0.02 |
| DELL INCORPORATED | 98.36 | 98.33 | -0.03 |
| DTE ENERGY COMPANY | 100.00 | 100.00 | 0.00 |
| EL PASO CORP 1 | 118.77 | 118.77 | 0.00 |
| EL PASO CORP 2 | 112.02 | 112.02 | 0.00 |
| FIRSTENERGY CORPORATION | 100.20 | 100.20 | 0.00 |
| FORTUNE BRANDS INCORPORATED | 98.71 | 98.57 | -0.14 |
| NEWMONT MINING CORP | 102.82 | 102.82 | 0.00 |
| PITNEY BOWES INC | 97.68 | 97.62 | -0.06 |
| VIACOM INC | 99.40 | 99.36 | -0.04 |
| WALT DISNEY COMPANY | 100.00 | 100.00 | 0.00 |

*FIG. 42*

| S&P Rating | Fee (bp) |
|---|---|
| AAA | 10 |
| AA+ | 15 |
| AA | 20 |
| AA- | 25 |
| A+ | 30 |
| A | 35 |
| A- | 40 |

FIG. 44

| Implied Rating | Fee (bp) |
|---|---|
| AAA | 10 |
| AA+ | 10 |
| AA | 10 |
| AA- | 15 |
| A+ | 20 |
| A | 25 |
| A- | 30 |

*FIG. 45*

| Issuer | Previous Model | New Model | Change | Numerical Credit Rating | | |
|---|---|---|---|---|---|---|
| | | | | S&P | Implied | Diff |
| ALTRIA | 99.67 | 99.53 | -0.15 | 9 | 10 | 1 |
| AMERICAN ELECTRIC | 99.54 | 100.07 | 0.53 | 9 | 5 | -4 |
| BAKER HUGHES | 99.32 | 99.21 | -0.11 | 6 | 7 | 1 |
| BORGWARNER | 99.13 | 99.32 | 0.20 | 10 | 8 | -2 |
| CBS CORPORATION | 99.24 | 99.80 | 0.56 | 10 | 8 | -2 |
| CUMMINS | 99.94 | 99.50 | 0.57 | 9 | 3 | -6 |
| DEERE | 99.29 | 98.38 | 0.09 | 6 | 3 | -3 |
| DELL | 98.33 | 98.33 | 0.00 | 7 | 7 | 0 |
| EL PASO | 110.11 | 110.11 | 0.00 | 13 | 14 | 1 |
| EL PASO | 117.55 | 117.55 | 0.00 | 13 | 14 | 1 |
| FIRST ENERGY | 99.92 | 99.92 | 0.00 | 10 | 12 | 2 |
| FORTUNE BRANDS | 99.05 | 99.40 | 0.35 | 10 | 8 | 2 |
| PITNEY BOWES | 98.32 | 98.15 | -0.18 | 6 | 7 | 1 |
| WALT DISNEY | 99.60 | 99.68 | 0.08 | 6 | 1 | -5 |

*FIG. 46*

| Input Data | Model Output |
|---|---|
| Firm: XYZ | Price: 94.67 |
| Rating: B | No Prepay Price: 94.75 |
| Market Price: 96.06 | Loan Spread: 534bp |
| Coupon: L+375bp | Prepay Value: 0.073 |
| Maturity: 3.2 Yrs | Prepay Spread Value: 2.8bp |
| Coupons/Yr: 4 | |
| Recovery Rate: 70% | Effective Duration: 2.3 Yrs |
| Prepay Cost: 0.50 | Effect of Default: 0.5 Yrs |
| LCDS 5Y: 780bp | Effect of Prepayment: 0.1 Yrs |

*FIG. 47*

SYSTEMS AND METHODS FOR CORPORATE LOAN PRICING

FIELD OF THE INVENTION

This application relates to systems and methods for pricing a corporate loan.

BACKGROUND

Corporations borrow money from banks in the form of loans. Loans may include amortizing term loans, institutional term loans, revolving credit lines, second lien term loans, and covenant-lite loans. In amortizing term loans, the periodic payments include partial payment of principal, similar to a mortgage loan. Institutional term loans are structured to have bullet or close-to-bullet payment schedules and are targeted for institutional investors. Revolving credit lines, also known as "revolvers," are unfunded or partially funded commitments by lenders that can be drawn at the discretion of the borrowers. Second lien term loans have cash flow schedules similar to institutional term loans, except that the claims on borrowers' assets are behind those of first-lien term loan holders in the event of default. Covenant-lite loans are borrower-friendly versions of institutional term loans that have less than the typical stringent versions of institutional loan terms that restrict use of the principal or subsequent firm borrowing activities.

Banks may then trade or manage these loans like stocks and bonds. The loans are similar to bonds because both have regular coupon payments and a risk of default. However, the loans differ from bonds because they are private agreements (not securities), a floating rate instrument (little interest rate risk), quarterly coupon payments, prepayable at par on coupon dates, often collateralized, small interest rate risk, and term loans are often collateralized while revolving credit lines are senior unsecured.

In some instances, the loans may be traded or managed together in a portfolio. Unlike bonds, the loans often have a floating rate of return. Because most corporate loans trade infrequently, price discovery is difficult or impossible. There is no generally accepted method for computing market credit spread from loan prices. It is also difficult to calculate the effects of a risk of default and the ability to prepay at par. The limitations of standard loan pricing models make it difficult to manage risk in loan portfolios.

SUMMARY

A loan prepayment option is difficult to quantify. As a result, the prepayment options introduce unquantifiable risk in that the cash position could go away very quickly with little warning. So it is desirable to be able to separate a "risky" portion from a "riskless" portion of the yield of a corporate bond. Corporate bonds are quoted on a spread-to-Treasuries or spread-to-LIBOR basis. Often, bonds have embedded put or call options, and existing techniques can allow for computing option-adjusted spreads that account for those option values. Loans, however, are typically quoted on price, not spread. Most loans allow borrowers to prepay or draw on credit lines at their discretion. This can introduce uncertainty into the duration of the loan. The corporate loan market is larger than the bond market, but no generally accepted procedure for accounting for the loan prepayment option exists.

The likelihood of obligor prepayment depends on a number of factors, including the credit state of the borrower, prepayment penalty, prevailing rates of financing, and other firm-specific and loan-specific factors. A calculation should include an accurate model of credit transitions and evolution of future loan financing rates, loan indicative data, and historical data on prepayments for calibration. It is desirable to be able to calculate an option adjusted spread or option adjusted price on a loan. Loan credit default swaps (LCDS) have begun trading in the United States without the prepay option, which makes quantifying the prepayment option more critical. Some models can calculate the value of the loans based on financial economic principals, including taking the ability to prepay the loan into account in calculating the value of a loan, but these models do not value the loan prepayment option.

It is desirable to mark loans to market for better origination and valuation, better portfolio management, regulatory and investor demand, improve industry best practice, and to reduce earnings volatility. More specifically, it is desirable to understand value of the loan and the cost of complex terms and embedded options; assess the profitability of customer relationships; measure the performance of the loan portfolio; identify hedging, investment and arbitrage opportunities; determine the "correct" price to buy, sell, hedge or securitize a loan; provide greater balance sheet transparency; reduce probability of loan portfolio generating earnings surprises; and match loan value changes with hedge mark-to-market.

It is also desirable to calculate an option-adjusted spread (OAS) to improved relative value assessment, price illiquid loans, accurately hedge portfolios, and evaluate the cost and benefits of credit protection via LCDS. More specifically, it is desirable to accurately price loans, exploit what are likely huge market inefficiencies, optimize risk/reward characteristics of CLOs and portfolios, obtain reasonable estimates of NAVs on CLOs, assess portfolio sensitivities to factors that affect prepayments, look for value in cash loans versus LCDS, and trade cash loans versus bonds versus CDS versus LCDS. It can be challenging to calculate an OAS or a spread on a loan, but because of the prepayment option, the duration of the loan is not known.

The methods and systems described herein attempt to overcome the disadvantages of the conventional systems. To account for the effects of default, the credit-state dependence of loan prepayments and revolving credit line usage, a lattice-based model for pricing term loans can be used. The loan in the example is a five-year term loan issued to a double-B-rated obligor with a coupon of LIBOR+200 bp and an assumed recovery value in default of 75% of par. This example is used to illustrate the construction of the lattice and the pricing of a loan.

That is, borrowers tend to prepay loans when market rates are below their current borrowing rate, and they typically draw on revolving credit lines as their credit deteriorates. The middle panel of the figure shows how transition probabilities are assigned when given an obligor's initial credit state, in this case double-B. In that panel, the left and right sets of probabilities are from historical ratings transitions and risk-neutral probabilities, respectively. The transformations from physical to risk-neutral default probabilities are calculated daily from CDS spreads using a method described by Jarrow, Lando and Turnbull. Forward LIBOR rates appear at the top and at each time step in the lattice are added to the 200 bp premium to produce the cash flows assigned in the diagram. In default, an absorbing state in the lattice, the cash flow is the recovery value of 75 and that at maturity, the loan pays the principal plus the coupon.

The model calculates loan prices using backward induction; expected cash flows are discounted starting from maturity back to the present as elaborated in greater detail below. In backward induction, the value of the loan at each node is calculated starting with all nodes at the step prior to maturity and working backward though the lattice to the present date. The provisional value assigned to each node at time t is determined by summing the discounted values assigned to all nodes at t+1 by the forward LIBOR rate from t to t+1 weighted by the probabilities of transitioning from a given node t to each node at t+1.

For term loans, the provisional value at each node is compared with the value of refinancing the loan at that time and if it exceeds the refinancing price, the node value is assigned the refinancing value. Otherwise, the provisional value is assigned to that node.

Revolving credit lines are more complicated than term loans in that they consist of a drawn portion, which is similar to a term loan, along with an undrawn portion, corresponding to a line of credit. In addition, the relative amounts drawn and undrawn can change over time. Revolving loans are considered briefly below and are described in detail in a later section. In short, to price a revolving credit line, one must first assign the usage rate (the amount drawn as a percentage of the revolving line) to each node. Then, the drawn fraction of the credit line is priced as a term loan and the undrawn fraction is assessed a smaller commitment fee and other associated charges. In addition, the model must account for the existence of credit-state-dependent pricing grids on the cost of revolving lines of credit Although the schematic representation of the loan pricing model is relatively straightforward, the model implementation process and choice of parameters pose significant challenges. This is because the success of the model in accurately valuing term loans depends critically upon (1) knowledge of the terms of the loan including its covenants and pricing grids, (2) estimation of the original credit state of the obligor, (3) the credit state transition probabilities, including to default, and (4) the assumed recovery value of the loan in default. Pricing revolving lines of credit requires additional information on their (5) commitment fees and (6) usage rates, including how usage varies with changes in firms' credit quality.

The loan valuation process begins by assigning an initial credit risk state to the firm whose loan is being priced. That is, the firm is assigned an initial credit state at time t=0, using one of several methods. One method is to use the credit rating implied by a firm's CDS or LCDS spreads (as referenced to daily market aggregates by agency rating category), but user inputs, agency ratings, or other model-based credit states could also be used.

After determining the initial credit state, each node in the pricing lattice is assigned a probability of transitioning to each node at the next time step. The process of assigning transition probabilities, as described in further detail below, first uses historical credit-state transitions to assign the probability of arriving at each node in the lattice given a starting node i. For t=0, only transitions from the initial state i to the credit-state nodes, j, at t+1 have non-zero probabilities. For all subsequent time steps, each node will have positive probabilities of input from all nodes j at t−1, except from the default state, which is an absorbing one. That is, after time t=1, probabilities of transitioning from all non-default states to all credit states at the next step can be assessed from the historical matrix. That process is continued for all time steps to maturity. The procedure produces, for each node at time t in the pricing lattice, a set of probabilities of arriving at each of the nodes in the lattice at time t+1.

The transition matrix constructed from historical data is called a physical credit state transition matrix because it is determined from past average rates of transitioning among credit states at various time intervals. To account for transition probabilities changing with the credit cycle and that the market charges premiums for uncertainty about future credit states, the physical credit state transition matrix is converted to a risk-neutral credit transition matrix. The conversion process takes as input market data from credit default swaps (CDS), loan CDS (LCDS), and liquid bonds and loans. Construction of the risk-neutral transition matrix presents conceptual and numerical challenges as described below. For now, the necessity of converting from physical transition probabilities to risk-neutral ones can be viewed as accounting for the extra compensation, required by investors for taking the risk of potential credit changes for a risky obligor, over that required to compensate for the physical probability of default. Importantly, risk-neutral default probabilities are inferred directly from credit market spreads.

The next step in the valuation process is to apply the backward induction process on the risk-neutral pricing lattice. At each time step, the values at each credit state node are tested for the economic value of prepayment for term loans or for assumed drawdown/repayment for revolving credit lines. For term loans the test consists of determining if the provisional value at the given node exceeds the maturity value of the loan. This process is iterated for each node at a given time step, and for each previous time step back to the present date. For revolving loans, one must determine at each node whether the outstanding loan balance is increased or decreased and apply the appropriate pricing algorithm to the drawn and undrawn amounts at each time step to determine the value at that step. The resulting value when discounted back to the present date is taken as the price of the loan.

In one embodiment, a computer-implemented method for calculating the price of a corporate loan comprises receiving, by a server, a first data input regarding a particular corporate loan; receiving, by the server, a second data input regarding market data; generating a pricing lattice for the corporate loan, wherein the pricing lattice has a first axis for a credit rating and a second axis for a time period; and deriving, by a server, using backward induction, a value for the corporate loan.

In another embodiment, a computer-implemented method for calculating the price of a corporate loan comprises receiving, by a server, loan data transmitted from a client about the corporate loan; preparing, by the server, indicative data about the corporate loan; retrieving, by the server, market rates; calibrating, by the server, the loan to the market rates; calculating, by the server, risk measures for the loan; and preparing, by the server, a report for the client that includes a priced loan with sensitivity measures.

In yet another embodiment, a computer-implemented method for calculating the price of a corporate loan comprises assigning, by a server, an initial credit state to a corporate loan; obtaining, by the server, a transition matrix of historical credit migrations; converting, by the server, the transition matrix to a risk neutral matrix; creating, by the server, a company-specific transition matrix using company-specific market data; and calculating, by the server, the price of the corporate loan.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 depicts a sample output according to an exemplary embodiment.

FIG. 16 depicts a matrix of five-year historical rating transition probabilities according to an exemplary embodiment.

FIG. 39 depicts a CDS spread-based pricing grid according to an exemplary embodiment.

FIG. 40 depicts fee lattices based on a pricing grid in FIG. 39 for the 2nd, 4th, 6th, 8th, and 10th coupon dates using a constant CDS and forward CDS according to an exemplary embodiment.

FIG. 41 depicts a loan pricing grid based on firm leverage ratio according to an exemplary embodiment.

FIG. 42 depicts price differences using the model described herein and simplified models as applied to rating-based pricing grid loans according to an exemplary embodiment.

FIG. 44 depicts a pricing grid of commitment fees from a credit agreement according to an exemplary embodiment.

FIG. 45 depicts an adjusted pricing grid to be used within a model according to an exemplary embodiment.

FIG. 46 depicts an impact of implied rating model change on selected loan prices according to an exemplary embodiment.

FIG. 47 depicts model inputs and indicative data, and model summary output according to an exemplary embodiment.

DETAILED DESCRIPTION

Figure 1:
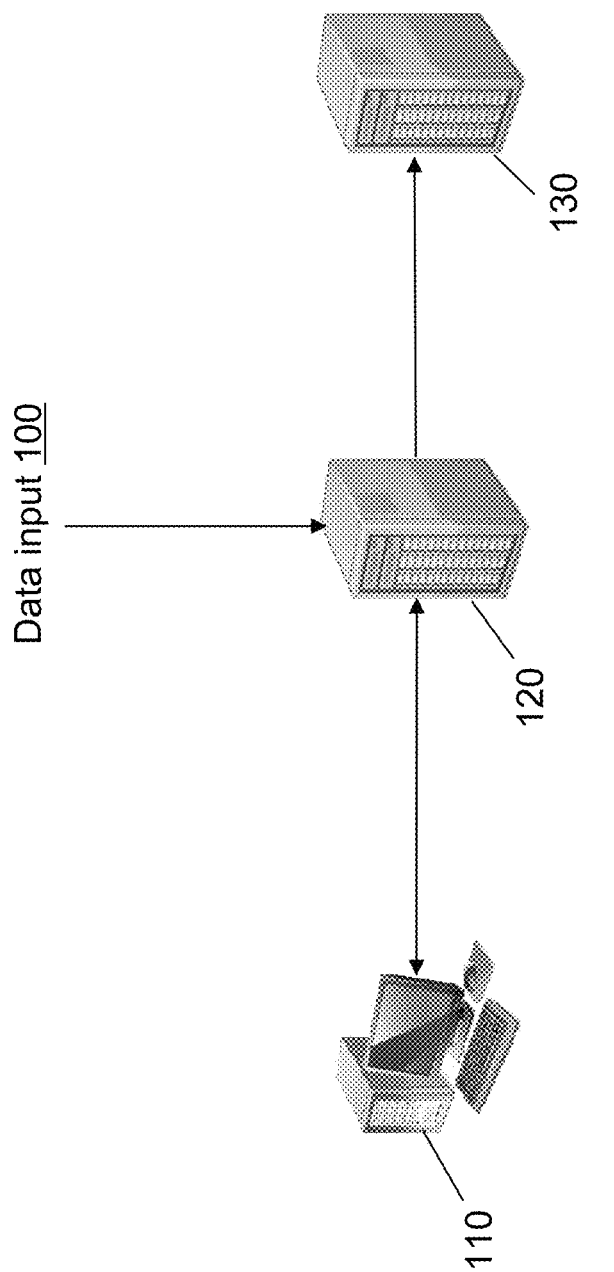
FIG. 1 depicts a system overview according to an exemplary embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

The systems and methods described herein use a model for pricing and risk management of amortizing loans, term loans, revolving loans and credit lines, second lien term loans, letters of credit, and covenant-lite loans. The loans can be callable and also include revolvers (i.e., loans of contractual fixed amounts, but only partial utilization). Unlike conventional methods, the model can account for loan prepayment options and a likelihood of default by a corporation. The systems and methods can generate prices and credit spreads for illiquid loans as implied from bond prices and credit default swap spreads; perform a valuation of credit-state-dependent loan prepayment options; incorporate credit dependent pricing grids and usage; calculate expected default times and losses due to default; calculate sensitivities to changes in loan prices due to changes in credit risk premiums and changes in recovery values in default; and calculate implied changes in portfolio values and expected losses in response to market moves. The systems and methods can be used to provide market implied prices for assets that do not frequently trade; obtain value and timing of a loan prepayment option and default; calculate loan price sensitivities to changes in credit risk premiums, default rates, and recovery values in default; and estimate daily changes in profit and loss from market invoices. The systems and methods can also implement FAS 159 (the "Fair Value Option") on loan portfolios, determine market-implied spreads for new loan origination, implement FAS 107 for quarterly mark-to-market of loan portfolios for publicly traded firms, calculate margin requirements and risk for counterparty credit exposure, and provide pricing and risk measures for a portfolio.

The model can start with a construction of a set of obligor specific quarterly risk neutral transition matrices that span to the loan maturity. These default probabilities are assigned by rating into the time nodes of the time by rating pricing lattice. These transition matrices are based on historical credit migration and transition probabilities and are adjusted for average market implied default probabilities as inferred from implied probability of default of the obligor in combination with those implied by the CDS and LCDS markets. The constructed set of transition matrices then defines transition probabilities in each rating-time node of the lattice. The loan value is then derived via backward induction, where at each node the prepayment impact or condition is evaluated. The calibration of term loans is performed using a set of loans that underlie the North American Loan Credit Default Swap Index (LCDX) and adjusts the discounting level of each loan using a spread adjustment factor found to provide the best fit to the cash loan prices. In the case of revolving credit lines, the usage pattern can be modeled via a simple rating and initial usage dependent model, which follows reasonable historical usage patterns.

The model can perform a backward induction calculation on a straightforward lattice grid model, where the set of quarterly transition matrices can be constructed using the Jarrow, Lando and Turnbull (JLT) method. This can provide stable, risk-free transition matrices whose cumulative product represents valid cumulative transition matrices for long tenors. Given the lattice grid, where the transition probabilities at the nodes for a given time reflect the obligor-specific "risk-neutral" transition matrix at that time, the loan price is obtained via backward induction. In this process, the prepayment condition is checked at each node, and if met, the node price is adjusted according to a prepayment penalty and refinancing cost assumption. In the case of revolving credit lines, a rating dependent usage pattern is applied and the face value at each node is scaled with the usage (utilization ratio). The usage assumption upon default can have severe impact on pricing. This pricing model applies the same cash flow propagation procedure to revolvers and term loans. Previous models valuated revolvers along net cash flows, i.e., propagated differences to par along the grid.

In order to account for prepayment, loan valuation models are based on credit quality migration patterns, and thus, lattice grid models are the most direct approach. One alternative might be a neural network-type matrix pricer. The credit migration pattern can be embedded using historical transition matrices as reported by the rating agencies. The systems and methods herein embed a straightforward one (offset) parameter calibration rather than a multi-parameter calibration.

Referring to FIG. 1, a system overview is shown. A quantitative credit strategy (QCTS) server 120 can calculate the pricing of the loan using a data input 100 and a user input about the loan from a user 100. The QCTS server 120 can perform this calculation on a real-time or periodic (e.g., daily) basis. The calculations can be based upon a model that can be reset each time the server 120 receives new data. The data input 100 and the user input 110 can come from user input, trader input, derived from transformation, based on historical projection, or any combination of these types of inputs. The data input 100 and the user input 110 can come from different sources or the same source. The data input 100 and the user input 110 can be transmitted to the QCTS server 120 on a real-time or periodic basis. Further, the model used by the server 120 can receive the data input 100 and the user input 110 and use the data in that form, or the server 120 can derive values from the data input 100 and user input 110 for use in the model.

The data input 100 can include primary market factors, such as historical credit migration (transition) matrices, average credit default swap (CDS) curves for each rating category, interest rate curve (spot/zero coupon curves), obligor-specific CDS curves, obligor-specific loan data, usage data for analysis of revolving loan modeling, and bond and loan recovery. Other market factors for pricing revolving credit lines include loan utilization and fee structure (e.g., drawn fee, facility fee, commitment fee as a function of rating and usage). In one embodiment, the data input 100 includes indicative data (e.g., maturity, pricing grids, seniority, and usage amount (revolvers, letters of credit)), probability of default (e.g., risk level is based on a credit curve determined from a hierarchy), and recovery value (e.g., based on a hierarchy and depends on seniority).

The user input 110 about the loan can include input from a user, such as loan amount, loan terms, loan conditions, maturity date, interest, coupon of the loan, margin/fees, amortization, and embedded options. The user input 110 can also include a loan identifier (e.g., by name, a number, or other coding), as well as any user assumptions. The user 110 that enters the user input can be a borrower, a client, or personnel of a financial institution. The user input 110 can be in a variety of forms, including a spreadsheet format.

In one embodiment, data input to the server 120 includes indicative data, probability of default, and recovery value. The indicative data includes maturity, pricing grids, seniority, and usage amount (e.g., revolvers, letters of credit). The probability of default includes a risk level based on a credit curve determined from a hierarchy (referred to as XDS). The XDS (credit curve) hierarchy is (1) quoted LCDS, (2) quoted CDS, and (3) median CDS for all issuers with the same senior unsecured rating.

The recovery value is based on a hierarchy (referred to as XRR). Second lien loans are assigned senior unsecured bond recovery values. The XRR (recovery rate) hierarchy for a senior secured first lien loan with recovery in the LCDS quote is (1) recovery in the CDS quote plus the difference between median quoted recoveries for LCDX and CDXHY constituents (~20%), and (2) median recovery in LCDS quotes for LCDX constituents (~60%).

In another embodiment, the input to the server 120 includes the maturity and coupon of a loan to be scored. The server 120 can value hypothetical loans with user assumptions. Providing more information can override assumptions of the model. The model checks for assumptions and, if not provided, assigns default values according to a hierarchy. The model has a repository of loans that it can scan on input of a loans identified by the user 110.

The server 120 can transmit the pricing information back to the user 110, such as a trader. Alternatively, the server 120 can transmit the pricing to a transaction server 130 to execute a transaction based upon the calculation and received information. The server 120 and the transaction server 130 can be located at a financial institution. The server 120 and the transaction server 130 can be separate servers or a single server that includes the functionality of both servers.

Figure 2:
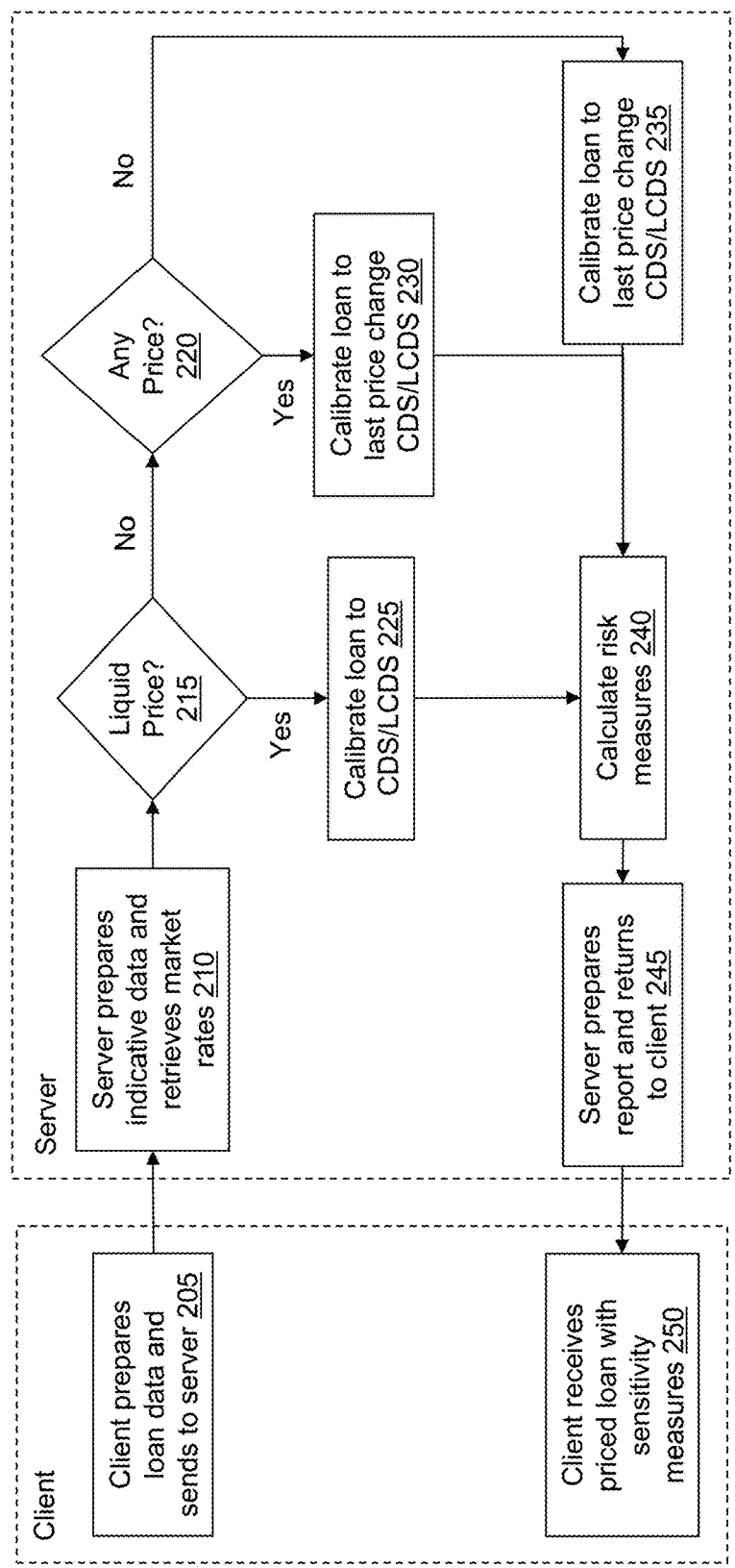
FIG. 2 depicts a flowchart for a loan pricing method according to an exemplary embodiment.

Referring to FIG. 2, in an exemplary method for loan pricing, the client prepares loan data and sends the loan data to the server 205. The server prepares indicative data and retrieves market rates 210, which can include CDS curves, loan indicative data, recovery value, loan characteristics, prepayment penalties, and drawn amount. The server determines if the price is liquid 215. If the price is not liquid, then the server determines whether it is any price 220. If not, then the server calibrates the loan to the last price change using credit default swaps (CDS) or loan credit default swaps (LCDS) 235. If the price is liquid, then the server calibrates the loan to CDS/LCDS 225. If the price is not liquid, but is any price, then the loan is calibrated to the last price change CDS/LCDS 230. The server then calculates risk measures 240. The server prepares a report and returns to the client 245. The client receives a priced loan with sensitivity measures 250.

The server can output to the client the requested loan pricing with sensitivity measures. In one embodiment, the loan pricing can be presented in a spreadsheet format, as shown in FIG. 3. The output includes a pricing date 305, average CDS values 310 by term and a recovery for each rating, a pricing grid 315 that includes a drawn spread and commit fee for each rating, The output also shows the data inputs 320, which include an identification, type, currency LCDS 1 year, LCDS 3 year, LCDS 5 year, LCDS 7 year, LCDS recovery, maturity date, coupon, credit rating, loan recovery, and usage percentage. Data outputs 325 include a model price 330, a prepayment option price 335, a credit rating 340, and a recovery rate 345.

At the time of pricing, an exemplary loan was rated single-B by Standard & Poor's and had a five-year LCDS trading at a spread of 780 bp. The actual loan had a nominal coupon of L+375 bp, had 3.2 years remaining until maturity, and a 0.50 point penalty for early repayment of principal. Finally, the recovery value in default assumed for pricing is 70% of face value.

Given these inputs, the risk-neutral ratings transition matrix computed using the JLT method was adjusted to accommodate the 780 bp LCDS spread and the lattice was populated with risk-neutral transition probabilities and expected nominal cash flows. The backward induction method was then applied to value the loan. In addition, we calculated the loan's effective duration and the value of its prepayment option, and these appear in the right portion of FIG. 47. The resulting loan price is 94.67. The pricer also calculates the loan price with no prepayment option. That value is 94.75, just 0.07 above the price with prepayment, demonstrating the small value of the prepay option (only 2.8 bp of credit spread) given the large discount of the current loan price to par. Also of interest is the option-adjusted spread to LIBOR of the loan, now calculable given the pattern of coupon payments output from the pricing lattice. Even though the sample loan has a coupon of L+375 bp, its option adjusted spread is 534 bp. The model also outputs the effective duration, in this case 2.3 years, and the shortening effects of prepayment and default on the duration of the loan. Finally, the model generates an expected time to principal (ignoring default), which indicates when the principal is likely to be repaid given the prepayment option. Due to the small value of prepayment for this loan, the expected time of principal repayment is 3.1 years, just slightly shorter than the 3.2 year maturity of the loan.

The model also provides a detailed analysis of the cash flows from the loan that result from default, prepayment, and nominal coupon and principal payments. An example of this analysis appears in FIG. 17. The left panel of the figure displays nodes from the model's pricing grid on which X's indicate that the model specifies a prepayment of principal and to which the terminal value of the loan (coupon plus principal) is assigned.

Figure 17:
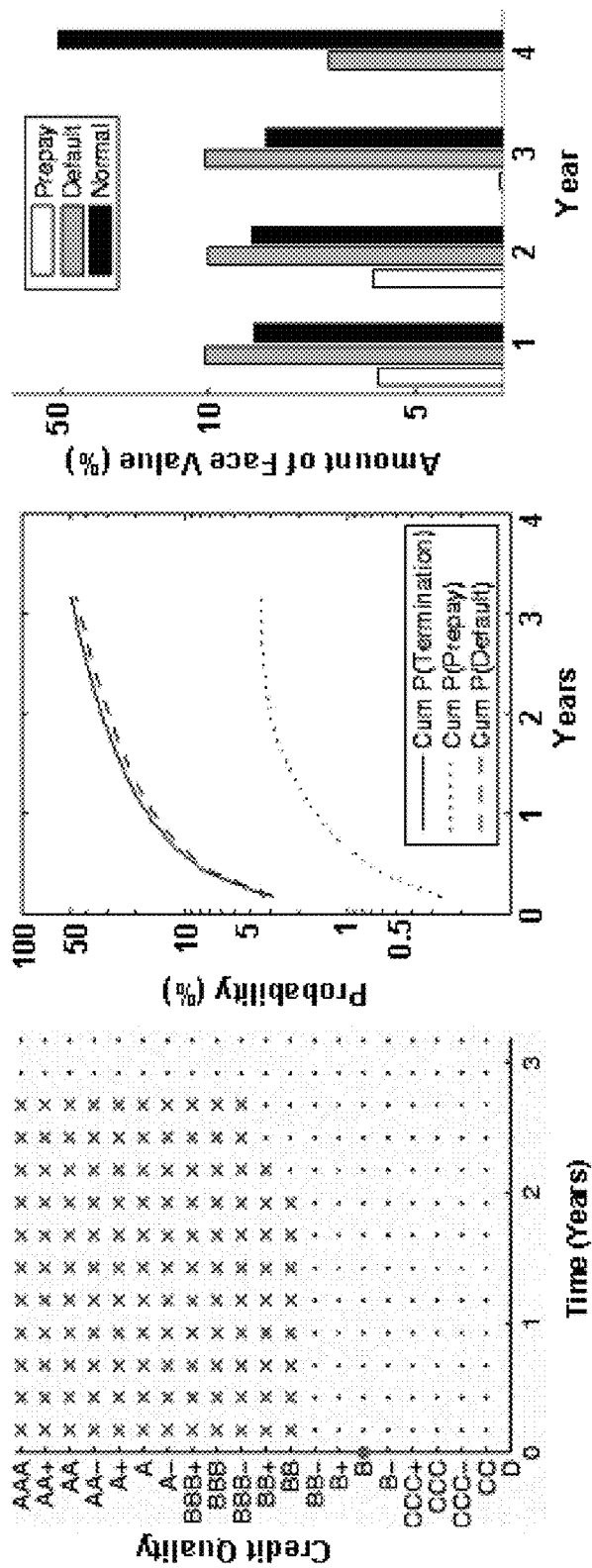
FIG. 17 depicts analysis of cash flows from a loan pricing model according to an exemplary embodiment.

The middle panel of FIG. 17 displays the likelihood of terminations of the loan from the present date to maturity (solid line). For termination prior to maturity, contributions from the component factors of prepayment (dashes) or default (dots) are also shown. The probability axis of the graph is in logarithmic units, enabling display of the relatively small contribution from prepayment to loan termination. The figure indicates that loan termination prior to maturity will more likely result from default than from prepayment. The model also outputs an analysis of the fraction of the cash flows from the loan that result from default, prepayment, and nominal coupons and principal payments and those appear in the right panel of FIG. 17. That is, each bar in the right panel is the probability-weighted size of the expected cash flows from default, prepayment, or coupons and principal. For example, the likelihood of the loan going to maturity and paying the principal and coupon is roughly 50% of the sum of the expected cash flows from all sources.

Like bonds, loans contain risk of default, i.e., an obligor may fail to make timely payments of interest and/or principal. Loan spreads are typically calculated by treating the loan as a floating rate bond, called the yield-to-maturity (YTM) method. Given a loan with coupon at the t-th payment date $c_t$ (LIBOR+contractual spread), notional F, obligor specific spread s, and quarterly coupon payments, the relationship between loan price V and spread s is given by $$V = \sum_{t=1}^{4n} \frac{c_t/4}{\left(1+\frac{r_t+s}{4}\right)^t} + \frac{F}{\left(1+\frac{r_{4n}+s}{4}\right)^{4n}} \quad (1)$$

where $r_t$ is the spot rate for maturity t with respect to the LIBOR curve (i.e., the solution of $D_L(t)=1/(1+r_t/4)^t$). However, loans are typically prepayable at par at any given coupon date, and the loan prepayment option increases the uncertainty regarding the expected pattern of cash flows. Prepayment can occur when the spread decreases and the value V exceeds par (F). This can be due to market spread movements (decreases) or obligor rating migration. Thus, valuing the prepayment option has proved difficult due to its dependence on the evolution of an obligor's credit state and the changing market costs of borrowing. Accordingly, the YTM method may be inappropriate as it does not provide for the valuation of the loan prepayment option or capture the effects of changes in credit quality or recovery value in default on loan prices.

Bank loans may be similar to bonds in that they have regular coupon payments and a risk of default. Unlike bonds, however, bank loans are private agreements (not securities), are a floating rate instrument (little interest rate risk), has quarterly coupon payments, is prepayable at par on coupon dates, is often collateralized, has a small interest rate risk, and term loans are often collateralized while revolving credit lines are senior unsecured (secured lien bonds have recovery rates similar to unsecured bonds).

Loans are prepayable at par on any coupon date, and prepayment is highly dependent on changes in credit quality. As credit improves: default is unlikely, prepayment is likely, refinancing is cheaper, and the loan value increase is capped at par. As credit deteriorates: default is more likely, prepayment is much less likely, refinancing is expensive, and the loan loses value with the floor at a recovery rate. For example, a loan may have a credit rating of BB. The credit may improve and approach AAA, so fault is less likely, prepayment is more likely, refinancing is cheaper, and the loan value increase is capped at par. The credit state may also deteriorate towards D, so default will be more likely, no prepayment, refinancing is expensive, and the loan loses value with the floor at a recovery rate. As a result, a model can use a lattice on which the credit quality (the y-axis) evolves along the time until the maturity of the loan.

Figure 4:
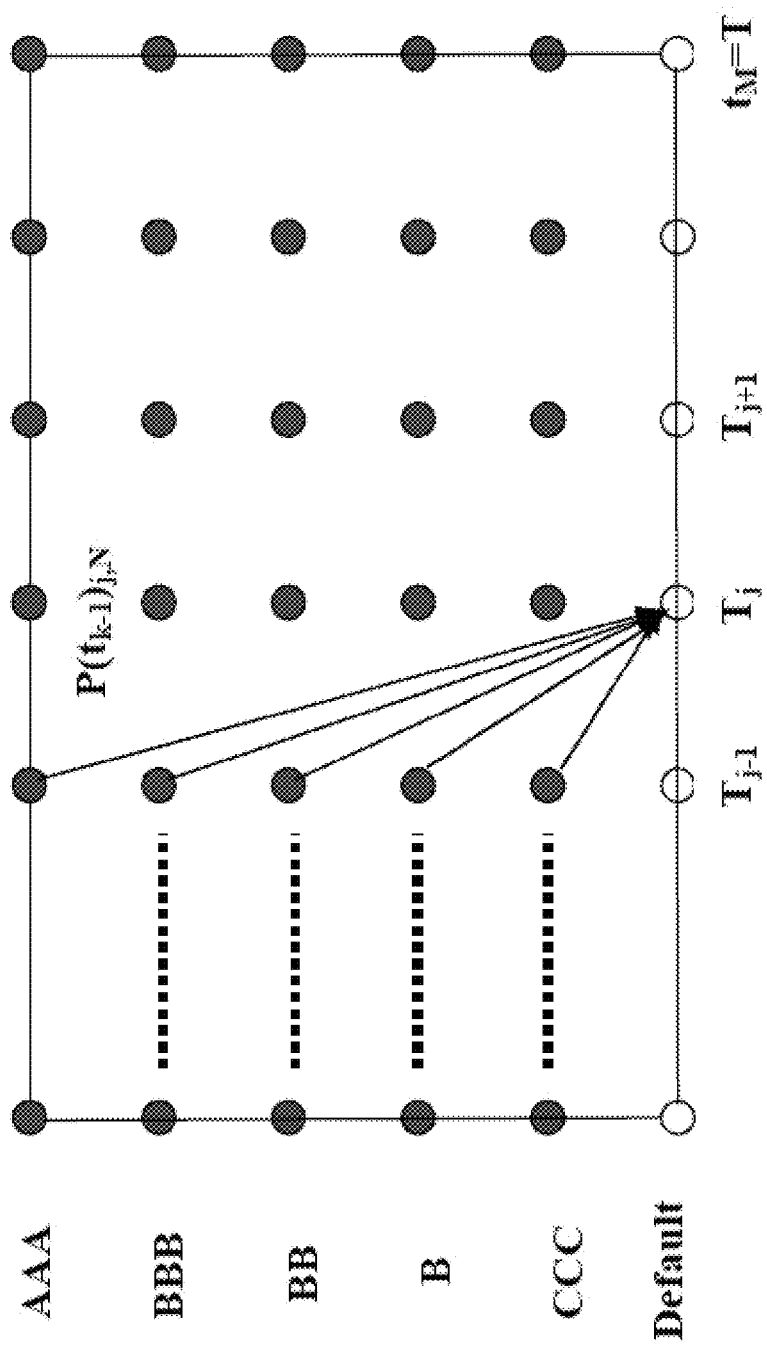
FIG. 4 depicts a schematic credit state dependent pricing lattice for a loan according to an exemplary embodiment.

One approach to modeling prepayable loans is to use a pricing lattice grid on which the credit quality (the y-axis) evolves along the time until the maturity of the loan. For example, the model can plot a pricing lattice grid with non-defaulting nodes AAA to CCC and the defaulting node along the vertical axis, along with equidistant spaced cash flow time nodes (e.g., one year) on the horizontal axis. As shown in FIG. 4, a default index is denoted with N and the probabilities $P(t_{k-1})_{j,N}$ reflect the depopulation of the non-defaulting states at $t_{k-1}$ into default conditional on not defaulting up to $t_{k-1}$. The lattice grid in this exemplary embodiment is based on historical one year transition matrices and assumes that the non-default transition probabilities implied by the historical average reflect the current environment correctly.

Figure 5:
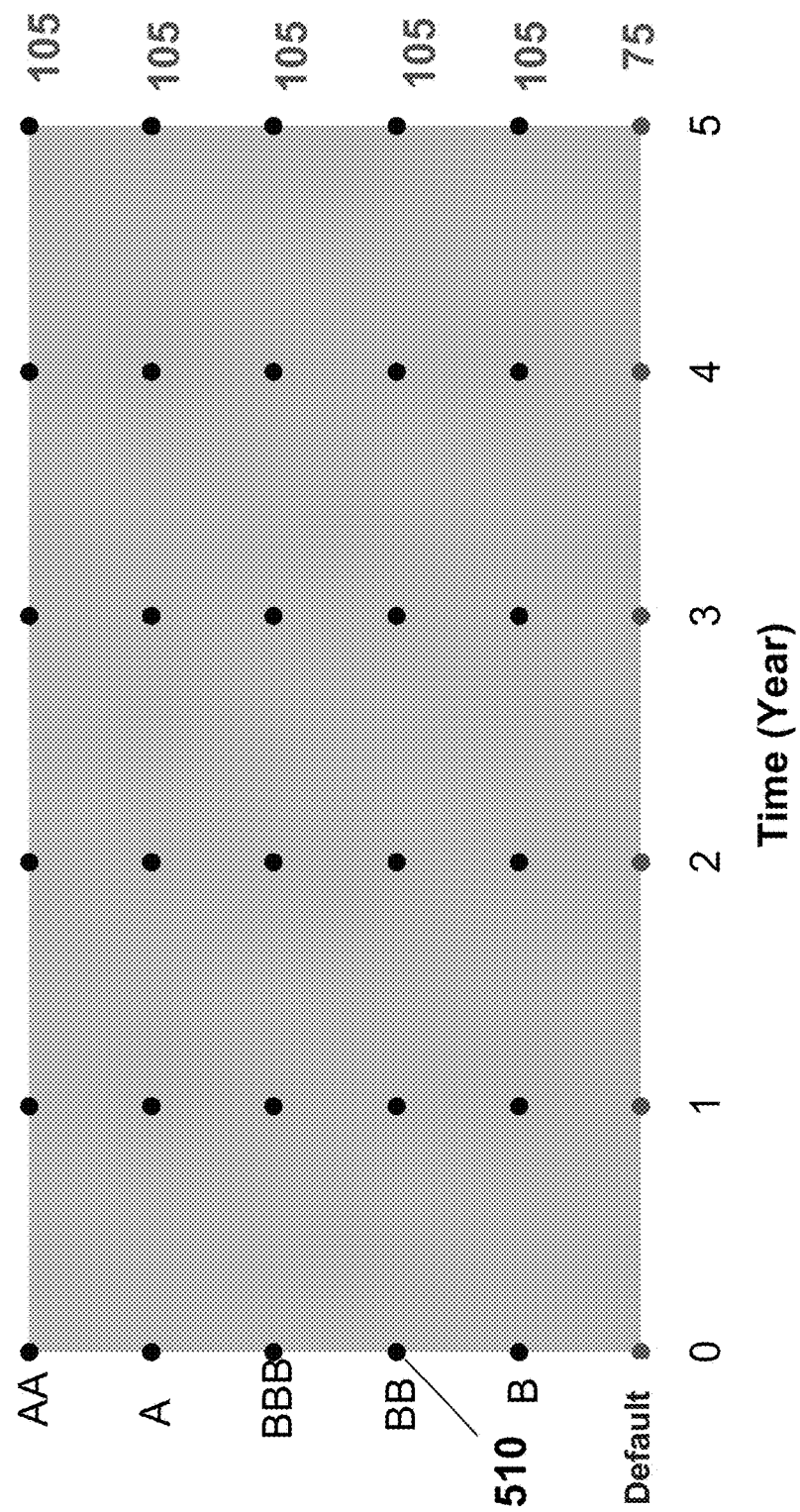
FIG. 5 depicts a schematic credit state dependent pricing lattice for a loan according to an exemplary embodiment.

As shown in FIG. 5, a schematic lattice is shown for a loan that pays 105 at maturity and 75 in default. The obligor's credit state is at BB at node 510.

Figure 6:
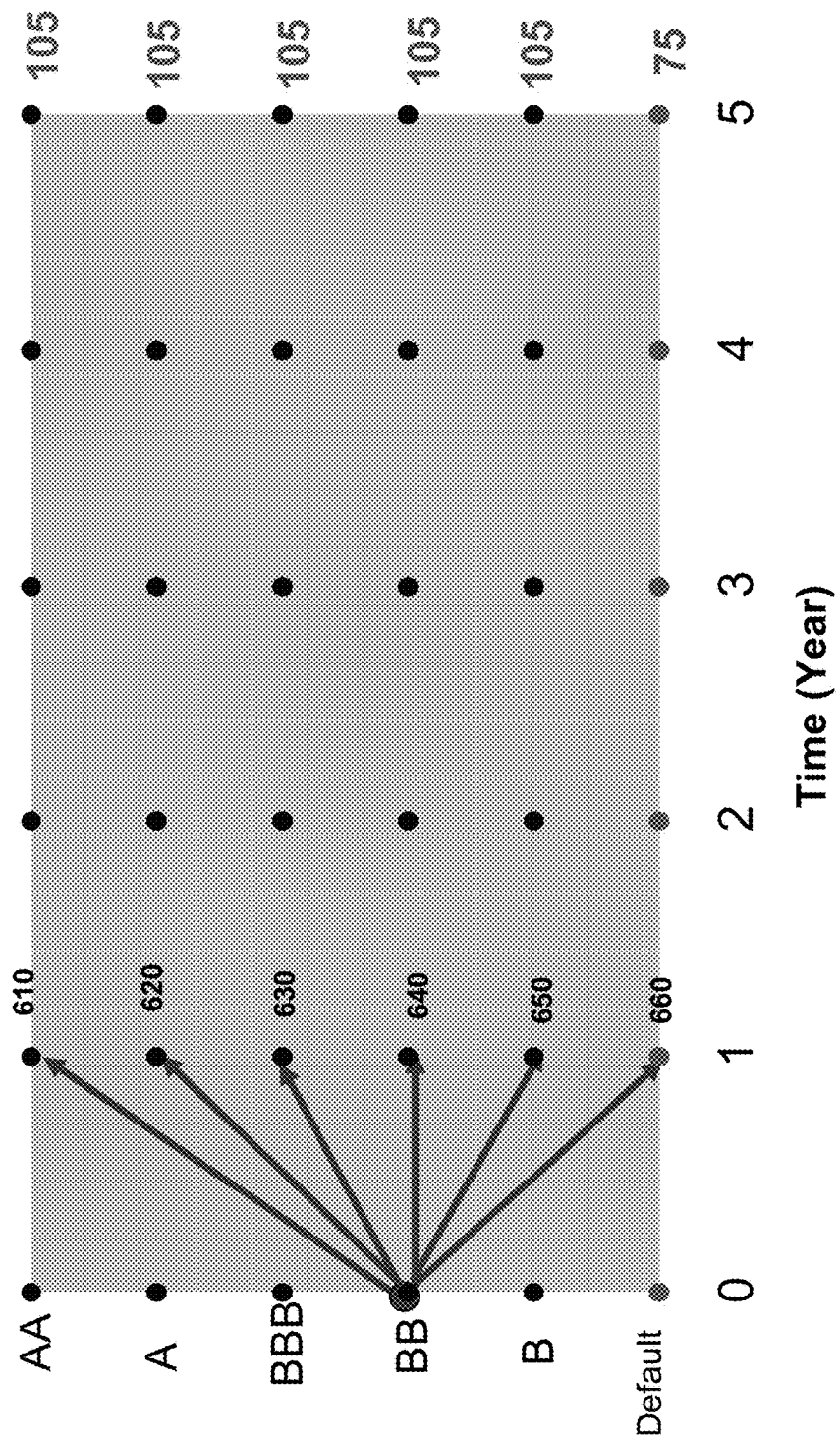
FIG. 6 depicts a schematic credit state dependent pricing lattice for a loan according to an exemplary embodiment.

As shown in FIG. 6, a schematic lattice is shown for a period one year later. At any given time step, there is some probability of the obligor's actual credit transitions from the model being at any of the subsequent nodes 610, 620, 630, 640, 650, 660, where each subsequent node is a different credit rating. The obligor has a probability of 0.04 of node 610, a probability of 0.11 of node 620, a probability of 0.19 of node 630, a probability of 0.45 of node 640, a probability of 0.17 of node 650, and a probability of 0.04 of node 660.

Figure 7:
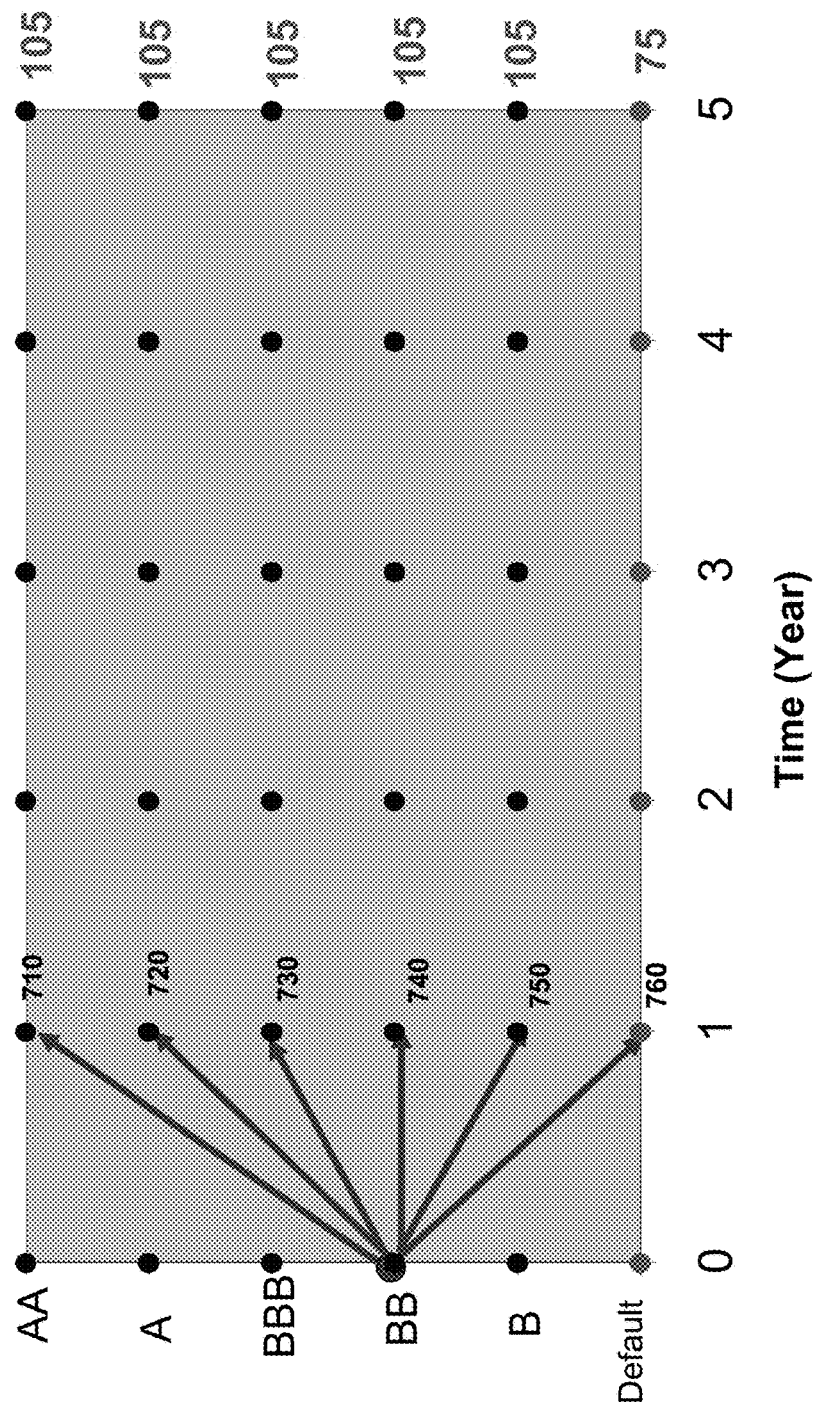
FIG. 7 depicts a schematic credit state dependent pricing lattice for a loan according to an exemplary embodiment.

As shown in FIG. 7, a schematic lattice is shown. At any given step, there is some probability of the obligor's risk neutral credit transitions from the model and CDS curves being at any of the subsequent nodes 710, 720, 730, 740, 750, 760, where each subsequent node is a different credit rating. The obligor has a probability of 0.01 of node 710, a probability of 0.05 of node 720, a probability of 0.14 of node 730, a probability of 0.38 of node 740, a probability of 0.23 of node 750, and a probability of 0.19 of node 760.

Figure 8:
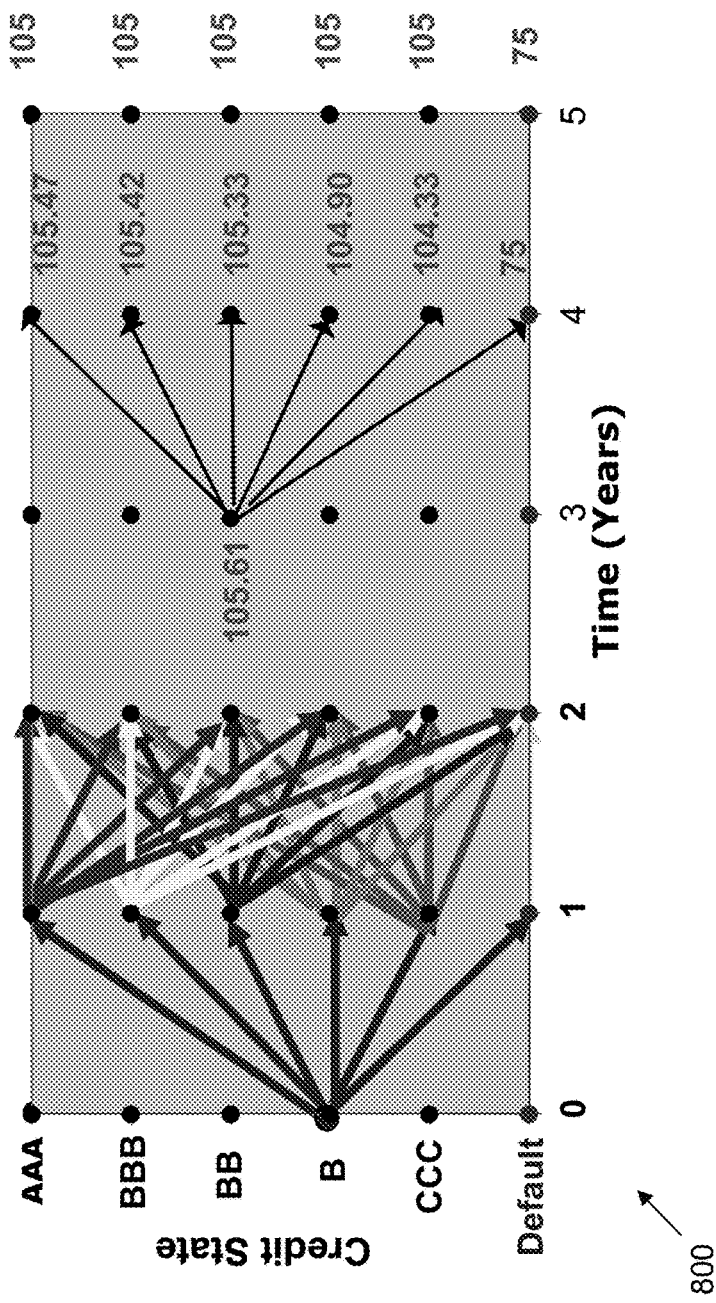
FIG. 8 depicts a schematic credit state dependent pricing lattice for a loan according to an exemplary embodiment.

Referring to FIG. 8, a credit state dependent pricing lattice 800 is shown. On a given time step, each non-default node gives rise to transitions to all nodes at the next time step. The loan is valued via backward induction on a lattice of credit state and time. The valuation starts at maturity and works backward at each time step. The node value is the value of cash flows at t+1 weighted by transition probabilities discounted LIBOR. Default is assigned the recovery value. The transition probabilities are assigned by combining historically observed ratings transitions and the market-implied risk level of the issuer. The prepayment decision is evaluated at each node by comparing cost of continuation versus prepayment.

The exemplary loan has a five year loan term, a LIBOR constant at 200 bp, a coupon of LIBOR+300 bp, a recovery of 75% of par, and an obligor rating of single B. As shown in the lattice 800, the node (BB, t=3) has a value of 105.61 and the prepayment cost is F+C=105 assuming no penalty. Thus, the obligor would prepay the loan at node (BB, t=3) and that node would be assigned the terminal value of 105 for subsequent discounting.

Figure 9:
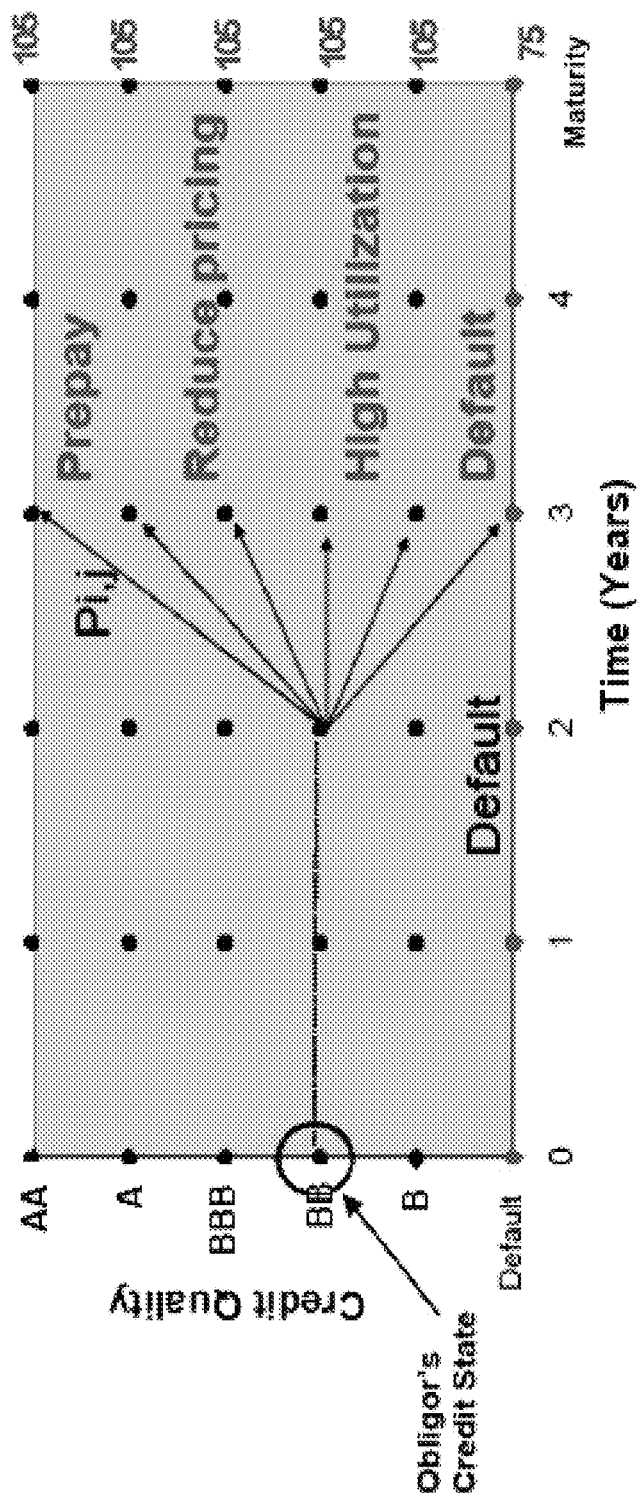
FIG. 9 depicts a schematic credit state dependent pricing lattice for a loan according to an exemplary embodiment.

Economic consequences can be evaluated at each node. If credit improves, prepayment is more likely. If credit deteriorates prepayment is less likely and default more likely. As shown in FIG. 9, a schematic lattice illustrates a callable 5-year loan with an annual coupon of 200 bps over a flat LIBOR term structure L=3%, with a recovery rate of 75%. Given the borrower's credit state is BB at year 2, the borrower has a certain probability to reach an equal, better, or worse rating at 3 years. If the rating improves, the probability for defaulting within the next 2 years decreases and the loan price increases. If the loan price is higher than 105 plus costs associated to calling the loan (e.g., prepayment penalty, replacement), the borrower will call the loan or, in case of a revolving credit line, the borrower might significantly reduce the drawn portion of the credit line or call the loan. In this example, the node (BB, t=3) has a value of 105.61 and the prepayment cost is F+C=105 assuming no penalty. Thus, the obligor would prepay the loan at node (BB, t=3) and that node would be assigned the terminal value of 105 for subsequent discounting. The method in Equation (1) cannot capture the rating migration and thus the option value of calling a loan.

Figure 10:
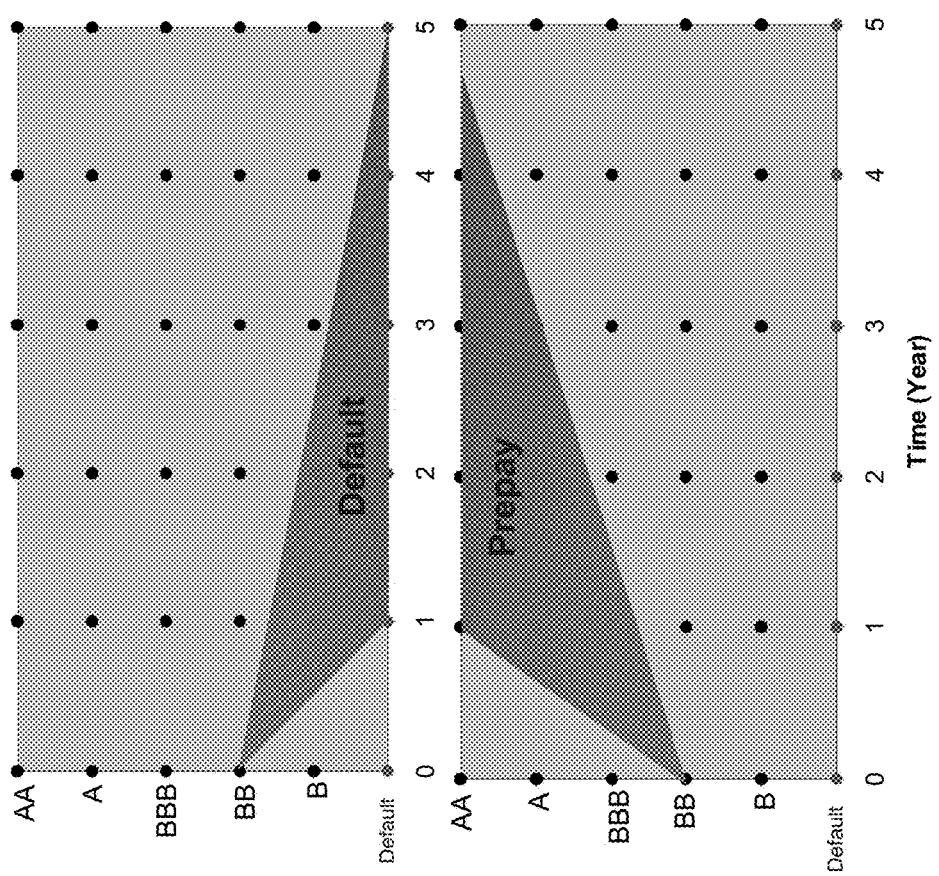
FIG. 10 depicts a schematic credit state dependent pricing lattice for a loan according to an exemplary embodiment.

Referring to FIG. 10, the obligor's credit may deteriorate or improve over time. If the obligor's credit deteriorates, the obligor will likely not prepay the loan. In fact, the obligor may default, and the loan holder would receive the recovery value. If the obligor's credit quality improves over time, then prepayment is likely.

Figure 11:
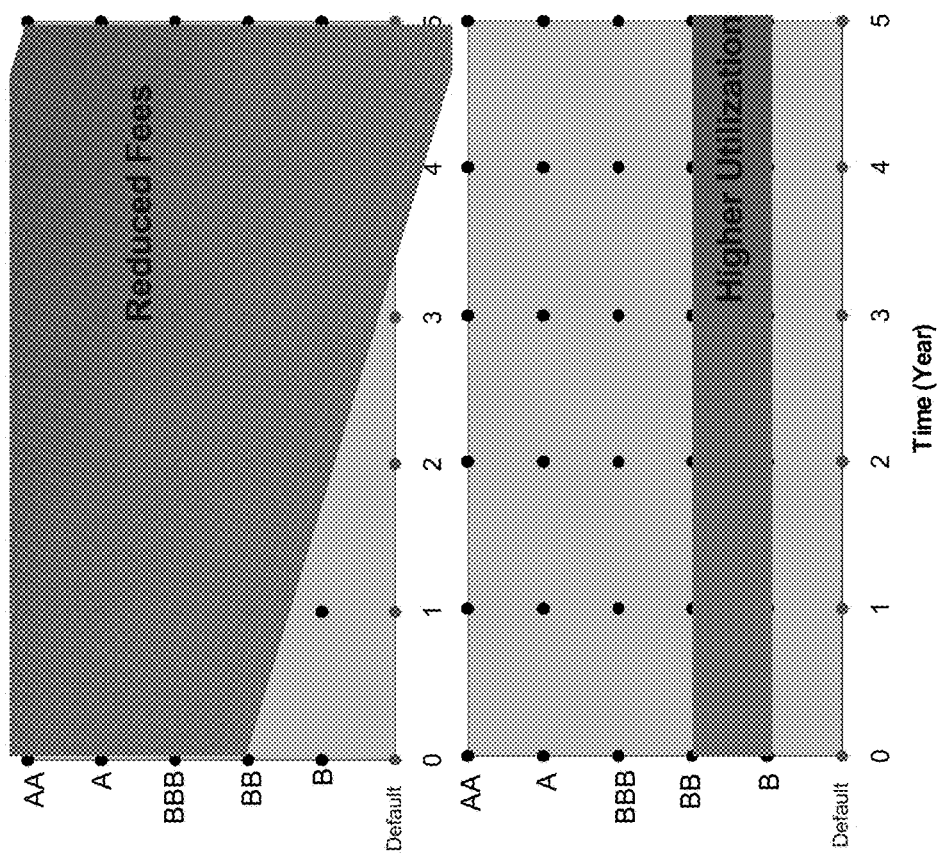
FIG. 11 depicts a schematic credit state dependent pricing lattice for a loan according to an exemplary embodiment.

Referring to FIG. 11, a pricing grid and revolver utilization are shown. Improved credit can result in a reduced coupon over time. Deteriorating credit can result in higher usage over time.

Figure 12:
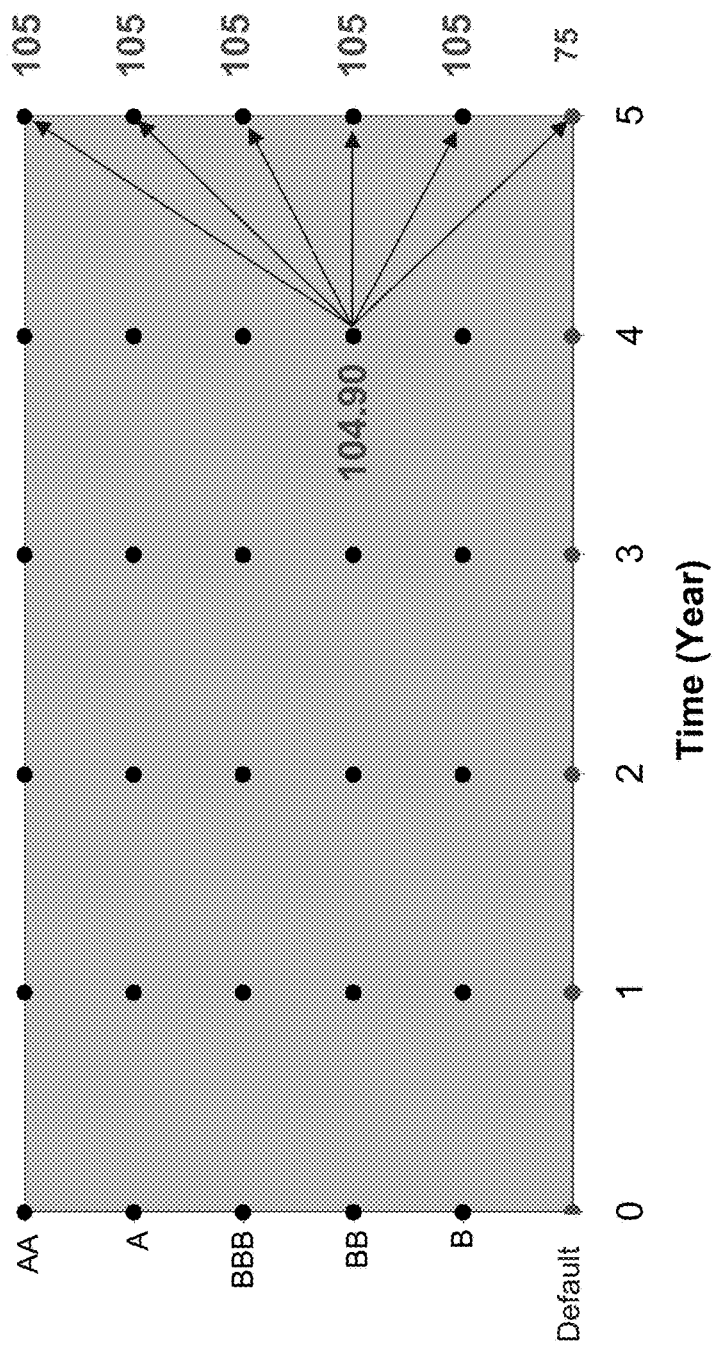
FIG. 12 depicts a schematic credit state dependent pricing lattice for a loan according to an exemplary embodiment.

Referring to FIG. 12, the model can perform a backward induction calculation on a straight forward lattice grid model. Given the lattice grid where the transition probabilities at the nodes for a given time reflect the obligor specific "risk neutral" transition matrix at that time, a loan price is obtained via backward induction. The prepayment can be checked at every node, and if met, the node price is adjusted according to prepayment penalty and refinancing cost assumptions. In backward induction calculation, the model starts at the end of the lattice. Cash flows and loan values are determined for each period. Cash flow plus continuation value (or prepayment value) is weighted using risk-neutral transition probabilities. To get the value for each node at the beginning of the current period, a discount for each time-step by forward rate is implied from a zero-EDF yield curve. As shown in this exemplary lattice grid, a node value was calculated as 104.90.

Figure 13:
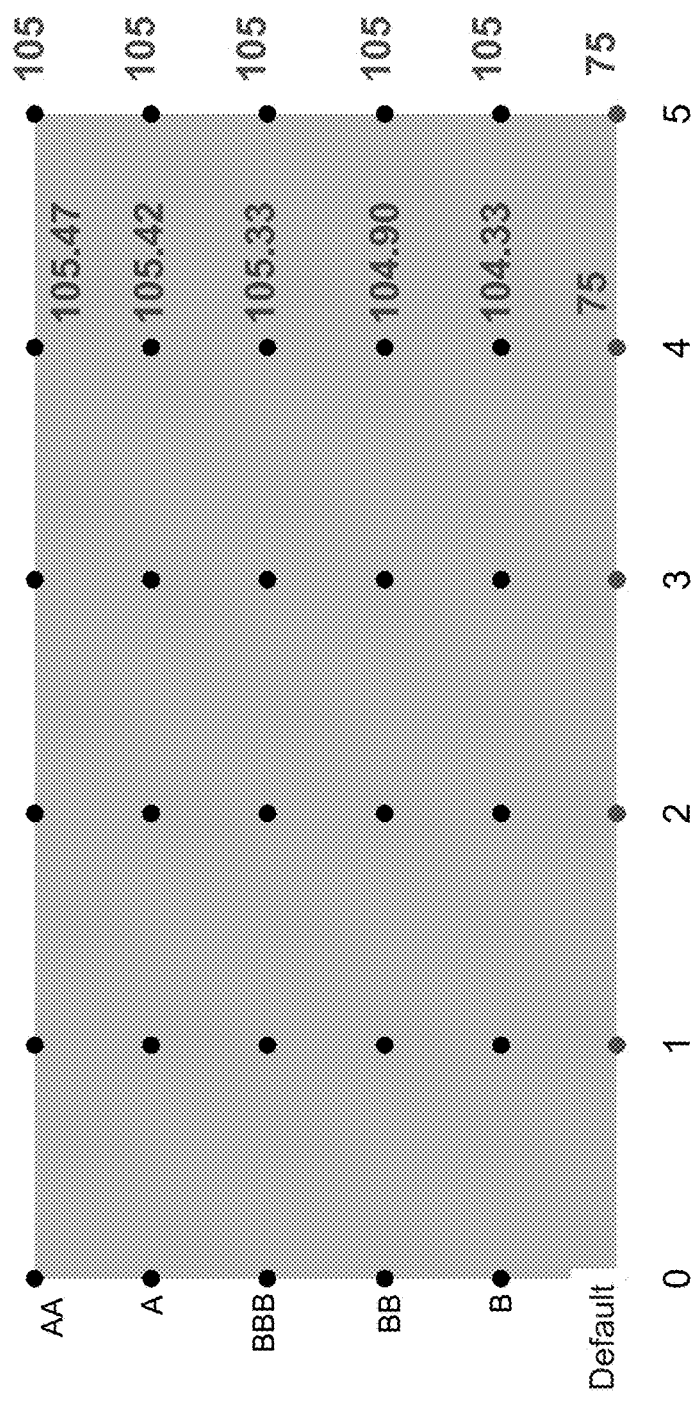
FIG. 13 depicts a schematic credit state dependent pricing lattice for a loan according to an exemplary embodiment.
Figure 14:
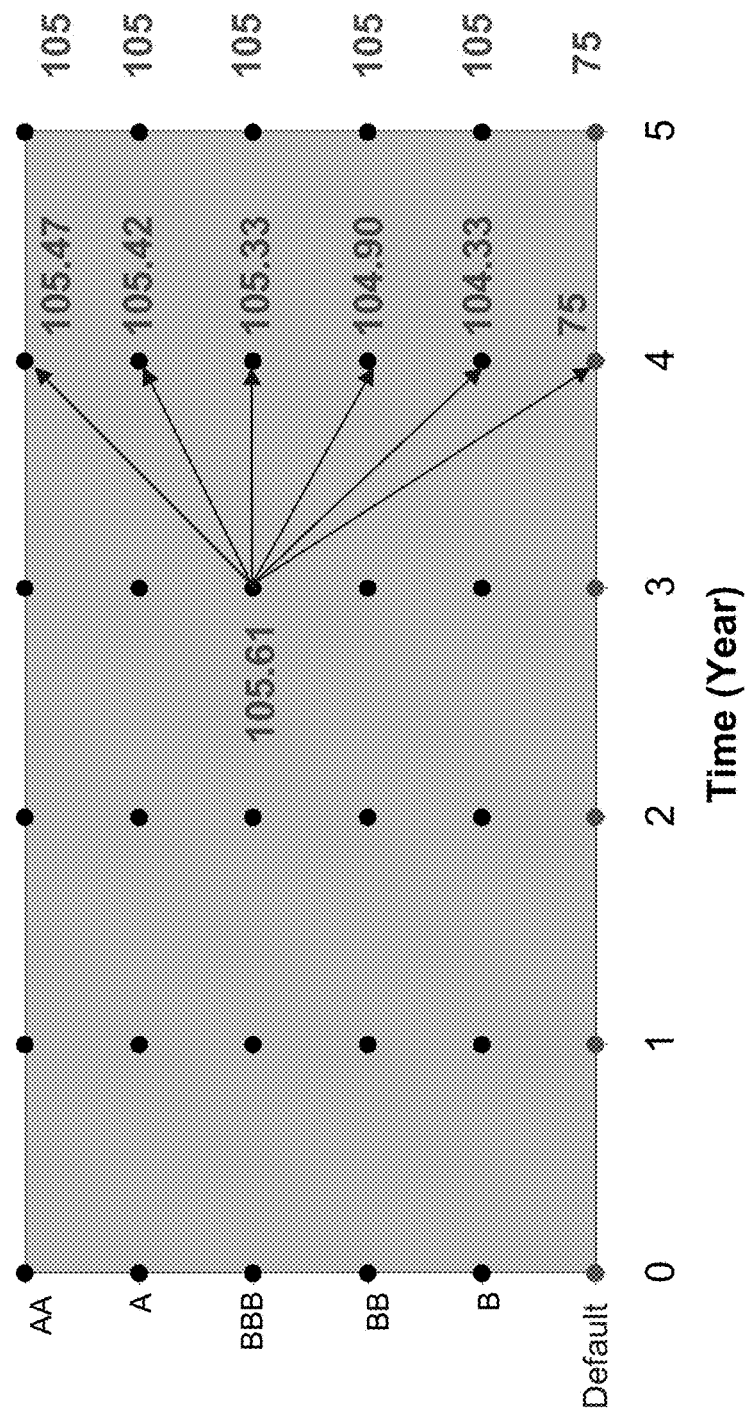
FIG. 14 depicts a schematic credit state dependent pricing lattice for a loan according to an exemplary embodiment.

This process can be repeated until the initial state is reached. Referring to FIG. 13, each of the node values for year 4 were calculated using backward induction. Each node is checked for a continuation value. If the value is less than or equal to 105.5, then continue. Referring to FIG. 14, a node value for year 3 is calculated using backward induction and based upon the calculated values of year 4. The node shown at T=3 is 105.61, which is greater than the value of prepayment. The lender receives 105.5.

To price the prepayment option, run the model with and without the ability to prepay. The difference in price is the option value. The market price of the loan is used along with the option price to compute the spread on an option-corrected loan price. The difference between the spread on the option-corrected loan price and a loan spread for the price is the spread value of the prepayment option. Spread values of the loan prepayment option are directly related to the dollar price of the option over a wide range of values.

The duration of the prepayable loan is not available. Because there is no access to the intermediate results of the pricing lattice, duration can be calculated by other methods. Our approach is to calculate the option value between successive nodes. This calculation can be performed using a bootstrap method to determine the option value between each time period in the lattice. The expected cash flows are related to the differences between pricing with and without the prepay option at each time period.

The rating based lattice pricing method embodies rating transition matrices. Rating agencies can provide historical rating (probability) transition matrices for various horizons. Such transition probability matrices reflect averages with respect to obligors within the same rating category as well as average transition rates over the years, thus also over credit cycles. When implementing such transition matrices into a lattice model, one has to consider that the main driving elements of the lattice pricing model are the transitions from a non-default state into default, and that the default transition probabilities implied by the historical matrices are different from those implied by current market spreads and recovery assumptions. Also, for an obligor, whose LCDS curve is available, one should make use of this additional information when determining the default probabilities of the transition matrix. The rating based lattice adjusts the elements of the historical transition matrix that lead into default. After the adjustment of the transition probabilities into default, all other elements can be rescaled so that the sum of transitions from a given rating (all elements in a row) remains 1.

The following is an exemplary process for valuating a loan of a given obligor. Once a lattice is generated, i.e., each time-rating node of the lattice has all transition probabilities assigned (and calibrated to risk neutral default probabilities), the loan can be priced. Pricing can include using backward induction in which the repayment condition is checked at each time step and node and, if met, the price at that node is replaced with the prepay value.

Figure 15:
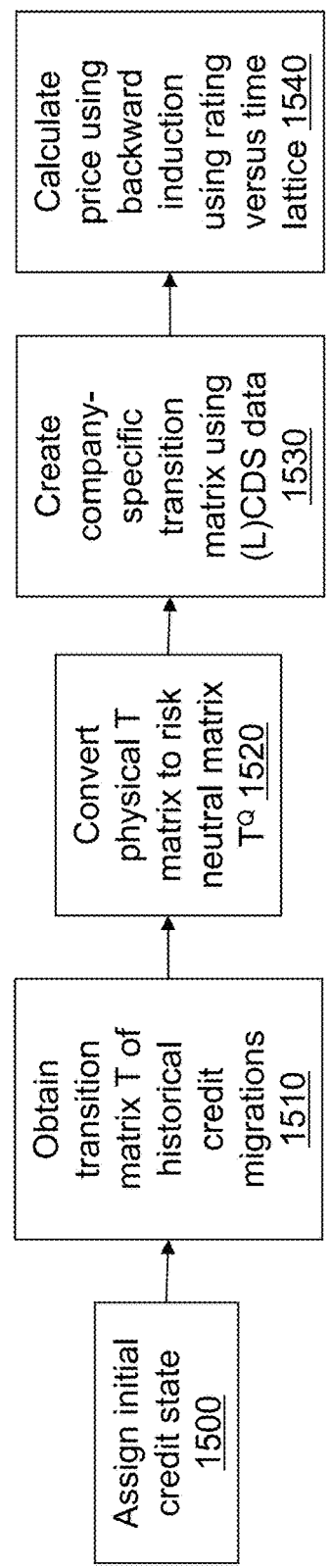
FIG. 15 depicts a process for valuating a term loan according to an exemplary embodiment.

Referring to FIG. 15, an exemplary process is shown for valuating a term loan of a given obligor using a lattice approach calibrated to market risk neutral default probabilities. In 1500, an initial credit state is assigned. The credit quality assignment can follow the Standard & Poor's credit rating scale and distinguishes among 21 categories specified by the rating ID j=(AAA, AA+, ... CCC, D), where D stands for default. The hierarchy of credit state assignments can be (1) market implied rating, (2) analyst rating, (3) hybrid probability of default model-based assignment (which takes as input the firms' equity and balance sheet items and generates cumulative default probabilities, which are then matched to credit ratings), and (4) credit agency rating.

In 1510, a transition matrix T of historical credit migrations is obtained using credit rating agency publications. For each node in the lattice, a set of probabilities of transitioning to each subsequent node (credit state) is assigned. This process requires the construction of credit state transition matrices that specify the probability on each time step of transitioning to any of the 21 credit states at time t+1 contingent on being in state j at time t.

FIG. 16 shows the matrix of five-year historical rating transition probabilities in percent from Standard & Poor's. Because the pricing lattice is divided into time steps of 0.25 years, the five-year transitions can be turned into quarterly rates. A t year N×N transition matrix T can be well approximated by a generator $\tilde{Q}$ (a N×N matrix) such that:

$$T \cong e^{Q \cdot t} = I + t \cdot \tilde{Q} + (t \cdot \tilde{Q})^2/2! + \ldots$$

$$\tilde{Q} = (T-I) - (T-I)^2/2 + (T-I)^3/3 - (T-I)^4/4 + \ldots \quad (2)$$

For matrices with dominant diagonal elements such as the historical transition matrices, Equation (2) converges well, i.e. a good approximation can be already reached taking the first 8 terms for $\tilde{Q}$. Since some of the elements (especially transitions over many ratings) of historical transition matrices are zero or very small, the approximation above may result in a few negative off-diagonal elements that may result in negative transition probabilities. To correct for such undesired negative transition probabilities Israel, Rosenthal and Wei developed the following algorithm. Denoting the elements of the corrected generator Q with $q_{ij}$ the correction follows $$G_i = |\tilde{q}_{ii}| + \sum_{j \neq i} \text{Max}(\tilde{q}_{ij}, 0); \quad B_i = \sum_{j \neq i} \text{Max}(-\tilde{q}_{ij}, 0) \quad (3)$$

The negative off-diagonal elements are then added into the diagonal element and all other elements that have the correct sign, proportional to their absolute values:

$$q_{ij} = \begin{cases} 0 & i \neq j, \tilde{q}_{ij} < 0 \\ \tilde{q}_{ij} - \dfrac{B_i}{G_i}|\tilde{q}_{ij}| & \text{otherwise}, G_i > 0 \\ \tilde{q}_{ij} & \text{otherwise}, G_i = 0 \end{cases} \quad (4)$$

Given the generator matrix Q, the physical transition matrix $T_{\Delta t}^P$ can be constructed for any desired time interval $\Delta t$. Note that the last row of the N×N transition matrix T consists of zeros for the non-diagonal elements and 1 for the diagonal element, as default is an absorbing state. Thus the last Row of Q consists of zeros for all elements, i.e. $q_{Nj}=0$ j=1, . . . , N.

In 1520, physical matrix T is converted to risk neutral matrix $T^Q$ using the JLT method, where the adjustment of the transition probabilities into default comes along with reduction of rating migration probabilities. Alternatively, the risk neutral transition matrix can be constructed by assigning the default probability adjustment exclusively to the diagonal elements of the transition matrix, which reflect the probabilities of no rating change. This method should result in higher option prices as the transformation does not reduce the physical rating migration probabilities.

The last column with index N of the transition matrix $T_{\Delta t}^P$ contains the physical (historical) default probabilities, i.e., $[T_{\Delta t}^P]_{iN}$ specifies the physical default probability for a given initial state i. This physical default probability is usually not equal to the market implied default probability as expressed by CDS spreads or bond/loan spreads over Libor and the related recovery assumption, as investors require a premium for taking on default risk, which market participants often measure in terms of additional default probability. As illustrated in the table below, historically estimated physical default probabilities are usually lower than those implied by market-based risk neutral measures.

|  | Credit Rating | | | | | | |
| --- | --- | --- | --- | --- | --- | --- | --- |
| Default Rate | AAA | AA | A | BBB | BB | B | CCC |
| Physical | 0.00 | 0.01 | 0.05 | 0.24 | 0.96 | 7.18 | 21.61 |
| Rsk-Neutral | 0.81 | 0.27 | 0.26 | 0.58 | 1.86 | 11.71 | 25.48 |

Using risk-neutral measures, the relationship of CDS spread s(T), associated recovery rate R and risk neutral default rate κ(t) for a contract maturing at T and a flat interest rate r is given by $$s(T) \cdot \int_0^T e^{-\int_0^t \kappa(t')dt' - r \cdot t} dt = (1-R) \int_0^T \kappa(t) \cdot e^{-\int_0^t \kappa(t')dt' - r \cdot t} dt \quad (5)$$

Assuming a constant default rate κ(t)=κ within 0 and T, Equation (5) translates into $$s(T) \cdot = (1-R) \cdot \kappa \quad (6)$$

With $P_S(t) = e^{-\int_0^t \kappa(t')dt'}$: Risk neutral survival probability $1 - P_S(t)$: Cumulative risk neutral default probability The physical transition matrix can be translated into a risk neutral transition matrix that incorporates the risk neutral default probabilities, using the JLT method alone or in combination with other methods.

The "average" risk neutral transition matrix ($T^Q$) is time homogeneous and not specific to any obligor. However, a given obligor may have LCDS and/or CDS trading and those market spreads may be available. Presumably, the market spreads for a firm provide the best estimates of investors' expectations for the company's likelihood of default in the next few years. Furthermore, both historical data and CDS spreads imply that ratings transitions and default probabilities are not time-invariant as was assumed above. To incorporate obligor specific information, the average risk-neutral transition matrix is adjusted to be consistent with the firms' LCDS/CDS information.

Figure 18:
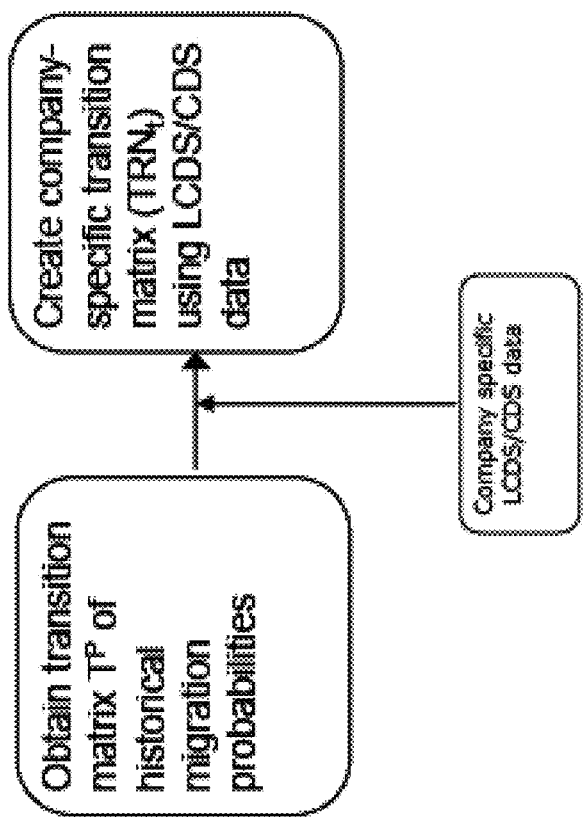
FIG. 18 depicts a schematic diagram of the JLT method according to an exemplary embodiment.

The JLT method can be used to construct risk-neutral ratings-transition matrices that account for the term structures of CDS spreads for all rating categories. The main features of the JLT method are that: (1) the obligor specific, time-heterogeneous, risk-neutral transition matrix is obtained by adjusting the physical probability of default as illustrated in FIG. 18, which shows the generation of obligor specific credit rating transition matrix using the JLT method, and (2) instead of finding one scaling factor $\gamma_m$ for each quarterly interval in the transition matrix, JLT matches an obligor's market-implied probability of default at time $t_m$ to a vector of credit state- and time-dependent scaling factors, $\Gamma_m^j$. In this process each element $\Gamma_m^j$ of the vector $\Gamma_m$ is calculated such that (a) the probability of default for the obligor's credit state (R) calculated using $T_m^Q$ matches the probability of default implied from its LCDS/CDS spread levels, and (b) the probability of default for all other ratings j≠R matches their probabilities as inferred from average CDS and LCDS spread levels for that credit state.

Figure 48:
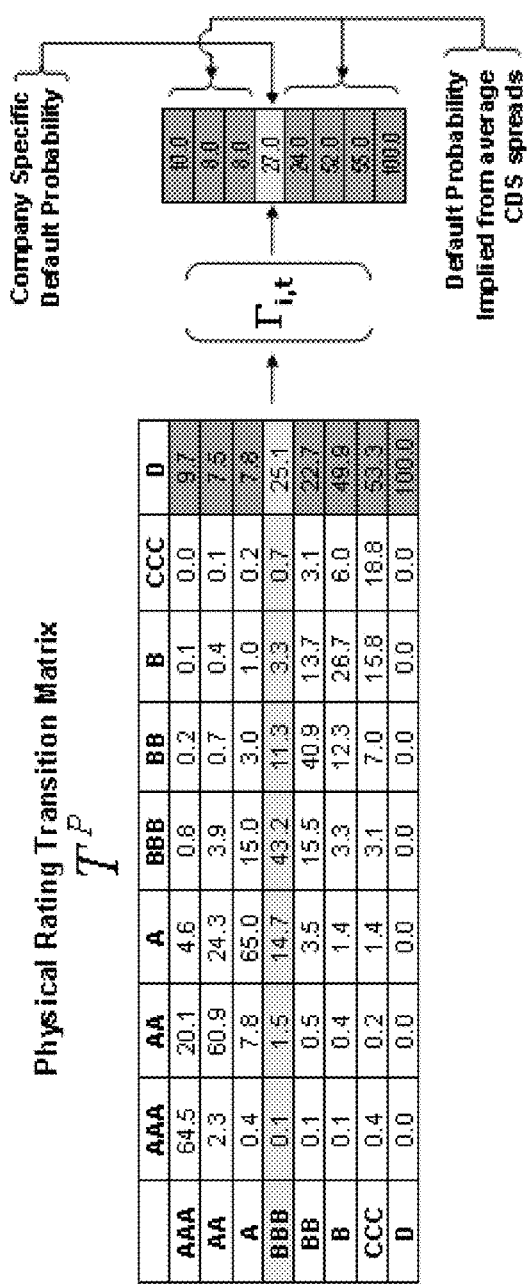
FIG. 48 depicts a JLT method of generating the default vector of the firm-specific credit rating transition matrix according to an exemplary embodiment.

Cumulative probabilities of default are calculated for each rating category and each time step using average CDS levels. Similarly, the obligor specific cumulative probability of default is also calculated for each time step leading to a N-dimensional vector $PD_m^Q$, whose N-th element is 1, $PD_N^{Q,j}=1$, as it reflects the default states. This vector of cumulative risk neutral default probabilities ($T_t^Q$) is shown in the right hand side of FIG. 48. The first gamma vector $\Gamma_1^j$ is obtained via $$\Gamma_1^j = \begin{cases} \dfrac{1 - PD_1^{Q,j}}{1 - \langle T_{fst}^P \rangle_{j,N}} & j < N \\ 1 & j = N \end{cases} \quad (7)$$

$PD_1^Q$ is the vector of cumulative default probabilities $PD_1^{Q,j}$ up to the first coupon payment and $T_{fst}^P$ is the physical transition matrix for the first period where $T_{fst}^P = (T_{1yr}^P)^{t_{fst}}$. Given the vector $\Gamma_1 = \{\Gamma_1^1, \ldots, \Gamma_1^j, \ldots, \Gamma_1^N\}$, the risk neutral transition matrix is calculated as $$\langle T_1^Q \rangle_{j,n} = \begin{cases} \Gamma_1^j \langle T_{fst}^P \rangle_{j,n} & n < N \\ 1 - \sum_{i=1}^{N-1} \Gamma_1^j \langle T_{fst}^P \rangle_{j,i} & n = N \end{cases} \quad (8)$$

Note that with $\langle T_{fst}^P \rangle_{N,n} = \delta_{N,n}$ Equations (7) and (8) produce $\langle T_1^Q \rangle_{N,n} = \delta_{N,n}$.

For all other time steps up to maturity a system of linear equations has to be solved. Given the physical transition matrix $T^P = (T_{1yr}^P)^{\Delta t}$ for the interval $\Delta t$, and the set of risk neutral transition matrices up to $t_{m-1}$, one has to find a vector $X_m$ such that $$\left[\prod_{k=1}^{m-1} T_k^Q\right] X_m = PD_m^Q, \text{ and} \qquad (9)$$

$$\Gamma_m^j = \begin{cases} \dfrac{1 - X_m^j}{1 - \langle T^P \rangle_{j,N}} & j < N \\ 1 & j = N \end{cases} \qquad (10)$$

where $PD_m^Q = \{PD_m^{Q,1}, \ldots, PD_m^{Q,N-1}, 1\}$ is a vector of market implied cumulative probability of default up to time $t_m$ for all ratings (averages derived from CDS spread curves for all rating categories, except that of the given obligor, j=R, for which the obligors (L)CDS curve is used). In an analogous manner to Equation (8) the risk neutral transition matrix at $t_m$, $T_m^Q$ is given by $$\langle T_m^Q \rangle_{j,n} = \begin{cases} \Gamma_m^j \cdot \langle T^P \rangle_{j,n} & n < N \\ 1 - \sum_{i=1}^{N-1} \Gamma_m^j \cdot \langle T^P \rangle_{j,i} & n = N \end{cases} \qquad (11)$$

Because the solution $X_m$ of Equation (9) reflects the conditional default probability on the interval $[t_{m-1}, t_m]$, where conditional refers to conditional on the obligor's survival to time $t_{m-1}$, it is not surprising that $X_m^j = \langle T_m^Q \rangle_{j,N}$. Therefore all elements of the $X_m$ vector have to be within 0 and 1. Note that in addition to accounting for the direct transitions into default $X_m$ accounts also for the mitigation contribution to default. Using the JLT method, however, it is not always possible to find a solution $X_m$ to Equation (9) with $0 \leq X_m^j \leq 1$ for $\forall j$. One solution to this problem constructs a constrained weighted linear least square error minimization algorithm instead of Equation (8) to solve for $X_t$ such that the resulting solutions are always between 0 and 1.0. Also, the error minimization routine is weighted to ensure that the smallest error (difference) occurs between values for the obligor-specific market-implied probability of default and the cumulative default probability implied from the transition matrix.

The JLT method captures the risk-neutral default transitions when the credit has transitioned away from its initial state. In implementation, the JLT algorithm can be too computationally intensive for processing a large number of loans on a daily basis. But one can use the JLT method for one-off processing, for example on a small number of loans to be priced infrequently.

An intermediate approach is also possible and this is what we have implemented for large batch jobs. The JLT method is first used to calculate risk-neutral ratings transition matrices once daily for each rating category using average CDS curves. Thus, we have 21 canned risk-neutral ratings transition matrices, one for each potential non-default initial rating category. Then, when pricing each individual credit with no CDS or LCDS curve, we use the average JLT matrix that corresponds to its inferred rating category. Otherwise, if the CDS/LCDS curve is known, one can make small proportional adjustments of the JLT matrix from the nearest CDS-implied rating category that matches the obligor's CDS curve. This ensures that any adjustments to the JLT-determined probabilities will be relatively small.

The backward induction method is designed to work with any risk-neutral credit state transition matrix. Thus, the same method can be applied to inputs generated by the JLT method or any other method for producing risk-neutral transition ratings. The reason for pricing loans using backward induction is to account for the obligor's credit-state and risk-premium dependent prepayment option as well as firms' options to draw on credit lines of revolving loans.

One advantage of the JLT approach is that it produces accurate estimates of risk-neutral default probabilities that preserve the pattern of transition probabilities among non-default states. The JLT approach can preserve the transition probabilities into non-default states. A drawback of the JLT algorithm is that the propagation algorithm may produce fluctuations in some transitions that compound over time and may finally lead to solutions outside of [0,1]. A constrained minimization algorithm as proposed by the business avoids negative transition probabilities (as the solutions are constrained such that $0 \leq X_k^j < 1$) but might not eliminate the problem of fluctuations due to the cascading algorithm. Another challenge of the JLT method is the need of correct rating assignment to the loan. If a higher credit rating than the one implied by the obligor's (L)CDS curve is assigned to the obligor, the loan will be overpriced, since migration into neighboring states will lead to significantly reduced default probabilities in future periods.

A combined method can be used instead. The first step is transformation of the physical one year transition matrix $T_{1yr}^P$ into a risk neutral (CDS implied) transition matrix $T_{1yr}^Q$ according to the first JLT step:

$$\Gamma_1^j = \begin{cases} \dfrac{1 - PD_{1yr}^{Q,j}}{1 - \langle T_{1yr}^P \rangle_{j,N}} & j < N \\ 1 & j = N \end{cases} \qquad (12)$$

$$\langle T_{1yr}^P \rangle_{j,n} = \begin{cases} \Gamma_1^j \langle T_{1yr}^P \rangle_{j,n} & n < N \\ 1 - \sum_{i=1}^{N-1} \Gamma_1^j \langle T_{1yr}^P \rangle_{j,i} & n = N \end{cases}$$

$PD_{1yr}^{Q,j}$ is the average CDS curve for rating j implied 1 year default probability (not obligor specific at this point). The second step is the determination of the time homogeneous first transition matrix $T_{fst}^Q$ (where $t_{fst}$ is the time of the first coupon payment for the given obligor) and the transition matrix $T^Q$ for quarterly time intervals $\Delta t$:

$$T_{fst}^Q = (T_{1yr}^Q)^{t_{fst}}, T^Q = (T_{1yr}^Q)^{\Delta t} \qquad (13)$$

The third step is the computation of the time heterogeneous obligor specific set of transition matrices based on proportional adjustments to average rating transition probabilities.

Once the set of obligor specific risk neutral transition matrices has been determined up to the loan's maturity, the transition probabilities at the first and all subsequent quarterly time steps are fed into the lattice at the related time nodes.

In 1530, a company-specific transition matrix is created using CDS or LCDS data, which can be firm-specific or credit dependent.

In 1540, the price is calculated using backward induction using a rating versus time lattice, and considering prepayment and default. Backward induction can be used to price loans to account for obligors' credit-state and risk-premium dependent prepayment option as well as firms' options to draw on revolving credit lines. The model incorporates the assignment of transition values to the lattice pricing grid, subsequent present valuing of cash flows beginning at the maturity of the loan, and the implementation of the prepayment decision that an obligor must make at each time step.

Referring back to the pricing lattice in FIG. 8, risk-neutral rating transitions (including to default) are first propagated forward from the pricing date to maturity. Subsequently, the expected cash flows are propagated backward as sums of state-probability weighted cash flows discounted at each period using the appropriate forward LIBOR rate. The exemplary pricing lattice is for a five-year term loan to a single-B rated obligor. The loan has a coupon of LIBOR+ 3%, a face value of 100, and an assumed value in recovery of 75. For convenience, a flat Libor term structure of 2% and annual coupon payments are assumed, thereby generating a constant 5% coupon to maturity.

The left portion of the lattice in FIG. 8 from t=0 to t=2 shows how the obligor's credit state evolves probabilistically over time. In the lattice, probabilities are assigned reflecting risk-neutral ratings transitions between each node at time t to all nodes at t+1. Thus, the probability of being at a given node will be conditional upon all the previous transitions.

Within the model, the decision to prepay the loan is evaluated at each node in the lattice, working back from maturity. At each node, the discounted value of the future cash flows (i.e., the node value) is compared with the cost of prepayment. If the cost of holding the loan is higher than the cost of prepaying, then the principal of the loan is prepaid along with the coupon.

Assuming a prepayment penalty of $K_{PP}$=0.5% (to the lender) of the principal F and a refinancing cost rate $K_{RF}$=0.5% of the principal F, prepayment will occur at each node at time t if the back induced (probability weighted) loan prices at t+1 discounted with D(t,t−1) exceed par+1% (101). In this case, the value at the given node is replaced with 105.5 (equal to par+coupon+prepayment penalty). The loan price including coupon at node m,j, $V_{m,j}$, can be expressed as $$V_{m,j} = \begin{cases} \left(\dfrac{1}{1+\dfrac{L(t_m)}{4}}\sum_{k=1}^{N} P_{j,k}^m \cdot V_{m+1,k}\right) + c_m & F \cdot (1+K_{PP}+K_{RF}) < \dfrac{1}{1+\dfrac{L(t_m)}{4}}\sum_{k=1}^{N} P_{j,k}^m \cdot V_{m+1,k} \\ F \cdot (1+K_{PP}) + c_m & F \cdot (1+K_{PP}+K_{RF}) \geq \dfrac{1}{1+\dfrac{L(t_m)}{4}}\sum_{k=1}^{N} P_{j,k}^m \cdot V_{m+1,k} \\ F \cdot R & j = N \end{cases} \quad j < N, \quad (14)$$

where:
F: Face value of loan contract
$c_m$: Coupon payment at m-th time step in the pricing grid (associated with time $t_m$), usually comprised of Libor $L(t_{m-1})$ plus a contractual spread $s_c$.
$T_M$: Time of Loan Maturity
R: Credit Quality (on an agency rating equivalent scale) of the obligor
$K_{PP}$ reflects the prepayment penalty as a fraction of the face value
$P_{j,k}^m$ refers to the probability of migrating from state j at $t_m$ to state k at $t_{m+1}$.
The probability $P_{j,k}^m$ is conditional on reaching the node m,j and reflect the elements of the transition matrix at time $t_m$:

$$P_{j,k}^m = \langle T_m Q \rangle_{j,k} \quad (15)$$

Note that Equation (15) implies that $P_{N,k}^m = \delta_{N,k}$, i.e., that a firm in default at $t_m$ will remain in default for all t>$t_m$.

Rating dependent features of revolving credit lines have been integrated into the valuation methodology. Pricing grids for drawn and undrawn amounts can be specified by credit ratings or CDS spreads.

| Rating | Undrawn Fee (bps) | Drawn Fee (bps) | |
|---|---|---|---|
| | | <=50% | >50% |
| AAA | 50 | 100 | 130 |
| AA | 50 | 120 | 156 |
| A | 50 | 140 | 182 |
| BBB | 70 | 170 | 221 |
| BB | 70 | 200 | 260 |
| B | 70 | 220 | 186 |

For CDS spread-based fees, usage is converted to a CDS-implied rating.

| CDS (bps) | Undrawn Fee (bps) | Drawn Fee (bps) | CDS-Implied Rating |
|---|---|---|---|
| <200 | 50 | 200 | BB+ and higher |
| <400 | 50 | CDS quote | BB− to B+ |
| >=400 | 50 | 400 | B− and lower |

The revolver usage as a function of ratings can also be input to the model. The usage assumption is that the usage remains at a current level from a credit state of B− to AAA, and the usage jumps to one from D to B−, from an initial time to maturity. The model allows the user to input pricing grid and usage parameters.

The model incorporates the assignment of transition values to the lattice pricing grid, subsequent present valuing of cash flows beginning at the maturity of the loan, and the implementation of the prepayment decision that an obligor must make at each time step. Loans are priced using the backward induction method on a lattice of credit state and time to account for obligors' credit-state and risk-premium dependent prepayment option as well as firms' options to draw on revolving credit lines. Valuation starts at maturity and works backward at each time step. Node value is the value of cash flows at t+1 weighted by transition probabilities discounted LIBOR. Transition probabilities are assigned by combining historically observed ratings transitions and the market-implied risk level of the issuer. Default is assigned the recovery value. The prepayment decision is evaluated at each node by comparing cost of continuation versus prepayment.

Expected times to loan default and prepayment are determined as probability weighted averages of presence in those states over time from examination of the pricing lattice. At each node, the loan is in one of three states: prepayment, default, or continuation. The expected time to a default or repayment is calculated by weighting the time at a node in which that event occurs by the probability of transitioning into that node.

For a non-amortizing loan, the loan price including coupon at node m,j, $V_{m,j}$, can be expressed as $$V_{m,j} = \begin{cases} \left( \frac{1}{1 + \frac{L(t_m)}{4}} \sum_{k=1}^{N} P_{j,k}^m \cdot V_{m+1,k} \right) + c_m & F \cdot (1 + K_{PP} + K_{RF}) < \frac{1}{1 + \frac{L(t_m)}{4}} \sum_{k=1}^{N} P_{j,k}^m \cdot V_{m+1,k} \\ F \cdot (1 + K_{PP}) + c_m & F \cdot (1 + K_{PP} + K_{RF}) \geq \frac{1}{1 + \frac{L(t_m)}{4}} \sum_{k=1}^{N} P_{j,k}^m \cdot V_{m+1,k} \\ F \cdot R & j = N \end{cases} \quad j < N, \qquad (16)$$

Where $K_{PP}$ reflects the prepayment penalty as a fraction of the face value and $P_{j,k}^m$ refers to the probability of migrating from state j at $t_m$ to state k at $t_{m+1}$. The probability $P_{j,k}^m$ is conditional on reaching the node m,j and reflect the elements of the transition matrix at time $t_m$:

$$P_{j,k}^m = \langle T_m^Q \rangle_{j,k} \qquad (17)$$

Where:
F: Face value of loan contract
$c_m$: Coupon payment at m-th time step in the pricing grid (associated with time $t_m$), usually comprised of Libor $L(t_{m-1})$ plus a contractual spread $s_c$.
$T_M$: Time of Loan Maturity
R: Credit Quality (on an agency rating equivalent scale) of the obligor.

As shown in the exemplary lattice below, a five-year term loan to a single-B rated obligor has a coupon of LIBOR+3%, a face value of 100, and an assumed recovery of 75. This example uses a flat LIBOR term structure of 2% and annual coupon payments are assumed, thereby generating a constant 5% coupon to maturity. Assuming a prepayment penalty of $K_{PP}$=0.5% (to the lender) of the principal F and a refinancing cost rate $K_{RF}$=0.5% of the principal F, prepayment will occur at each node at time t if the back induced (probability weighted) loan prices at t+1 discounted with D(t,t−1) exceed par+1% (101). In this case, the value at the given node is replaced with 105.5 (equal to par+coupon+prepayment penalty). The calculation of node values uses backward induction, whereby values at each non-defaulted node consist of the coupon value plus the backward induced discounted loan prices from the immediately following nodes. Thus, at each node, the prepayment condition is evaluated.

More complicated loans, such as revolving credit lines and amortizing loans, can be priced based upon the core components of this model. Revolving lines of credit are priced assuming that the fraction of the loan drawn at a particular time, called the "usage," is directly related changes to the obligor's credit quality. That is, if a borrower's credit rating improves, it can access credit more cheaply and is also less likely to draw on existing lines of credit. Conversely, a borrower with deteriorating credit will likely draw on the credit lines it obtained when more highly rated and is less likely to repay drawn lines of credit. Finally, if the market premium for lending decreases, the obligor is likely to take advantage of cheaper alternative funding, whereas if lending premiums increase, the obligor will likely retain their existing drawn credit at the lower rate. One of the considered (and rejected) approaches is based on the comparison of the market cost of borrowing with that of the drawn and potentially drawn credit lines. If the current price of credit is cheaper than the drawn line, the obligor will pay off any outstanding principal and will not draw on any un-drawn lines of credit at the higher rate. Conversely, if the cost of borrowing increases, there will be no loan repayment and the borrower will draw on all credit lines possible at the lower rate. This automatically results in a rating-dependent loan utilization.

An alternative method can more closely follow the patterns of usage observed historically. In both approaches, usage of the revolving credit lines is expressed mathematically as a credit-dependent fraction of its notional value. Thus, the face value of the loan, F in Equation (16), is replaced by F→$U_j$*F where j is the credit state and $U_j$ is the fractional usage that ranges from 0 to 1. Note that in the current formulation, usage $U_j$ is not dependent on the previous rating i, but depends exclusively on the obligor's rating state j that corresponds to the pricing time t in the lattice.

The model of the systems and methods described herein can incorporate funding costs. The effects of financing costs on cash loans may not be accounted for in models using only CDS levels for discounting loan cash flows. Funding costs are reflected in the cash-CDS basis and these can be large. The systems and methods herein can estimate funding costs on a daily basis as the median CDS-cash basis of the CDX-IG index constituents. Funding costs also affect differentially drawn and undrawn portions of revolving credit. The systems and methods can split revolving lines into two parts: drawn fraction, u, and undrawn fraction, 1−u. The drawn amount, u, is discounted at LIBOR plus funding cost. The undrawn amount, 1−u, is discounted at LIBOR. So for the drawn portion, the usage, u, has a discounting of 1+r+δ, where r is the LIBOR rate and δ is the funding cost. For the undrawn portion, the usage, 1−u, has a discounting of 1+r.

Figure 19:
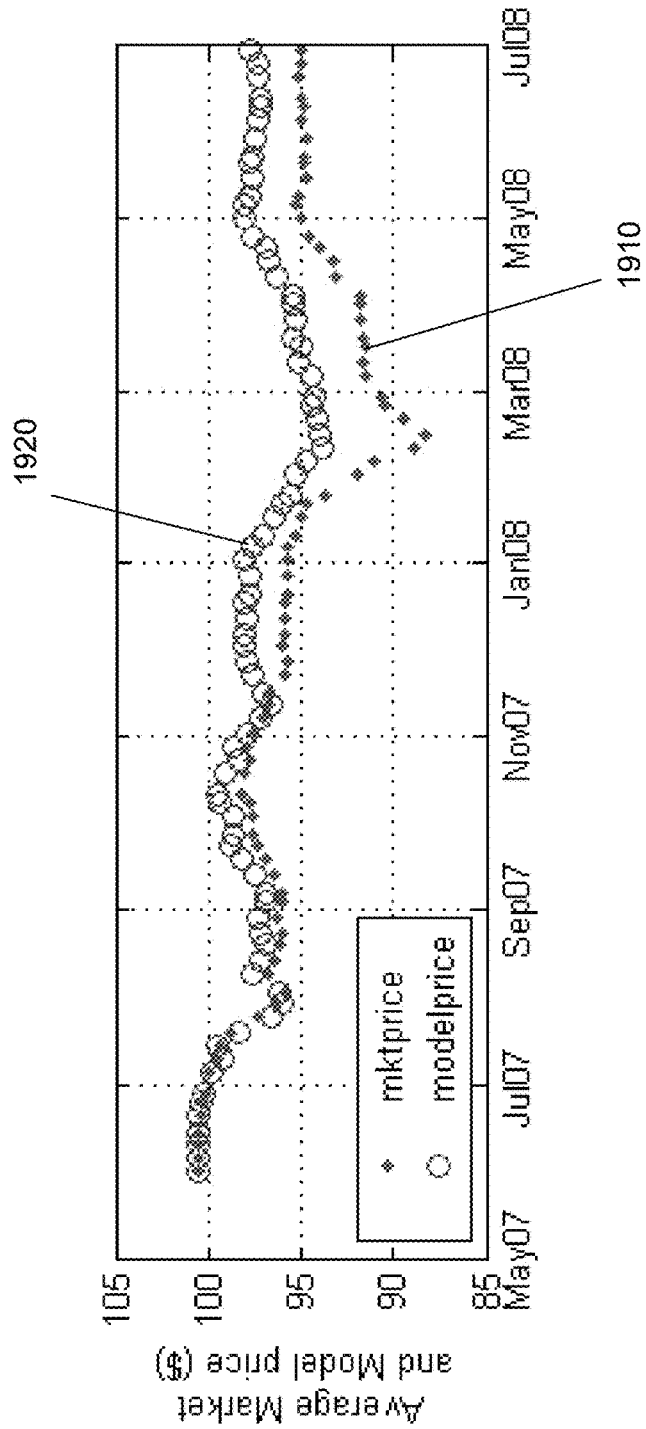
FIG. 19 depicts a discrepancy between average market and model prices over time according to an exemplary embodiment.

Calibration can be useful as model and market prices can deviate. Calibration tracks the LCDS versus cash bond/loan basis. The CDS-cash basis may reflect changes in funding costs, liquidity, and differences in cash and synthetic investors. As shown in FIG. 19, a the average market price 1910 and average model price 1920 can differ over time.

Figure 20:
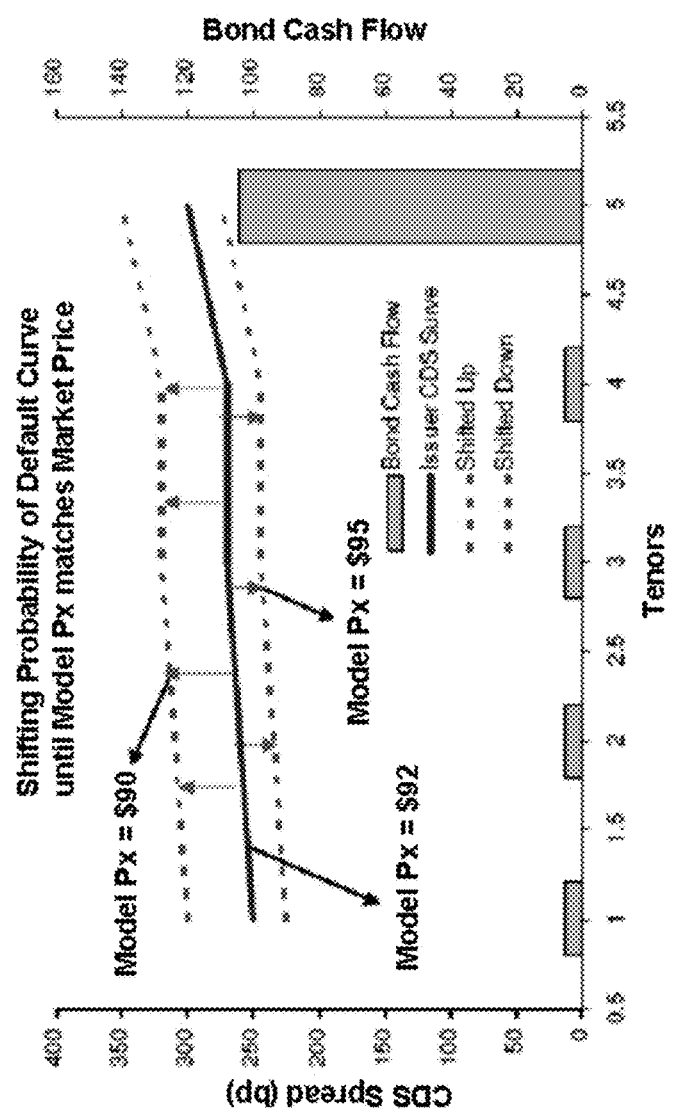
FIG. 20 depicts a default curve according to an exemplary embodiment.

The model can be calibrated on a periodic basis (e.g., daily) using the current CDS curves and prices of loans traded that day. Liquid loan prices can be calibrated to match the market prices by adjusting credit curves (probability of default). The credit curve adjustment for liquid loans is then applied to adjust credit curves of illiquid loans. Even after accounting for the CDS versus cash bond basis, possible interpretations of the need for calibration include funding cost, liquidity premium, and model error. As shown in FIG. 20, a chart shows a shifting probability of default curve until the model price matches the market price.

Figure 21:
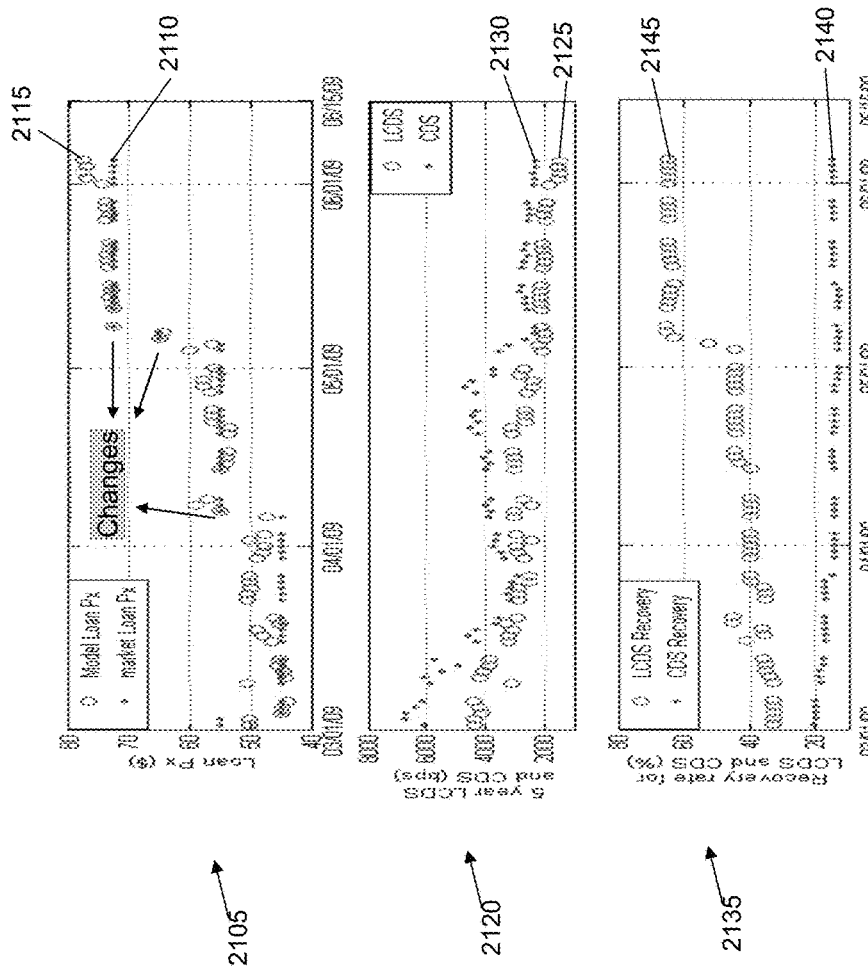
FIG. 21 depicts charts showing changes in market prices, CDS/LCDS, and the market recovery values influence loan prices according to an exemplary embodiment.

The model price can be calibrated to the market price only when the market price changes. For illiquid loans, the model and market prices can differ. For loans with stale market prices, the systems and methods adjust the price to account for market-implied changes in the risk level and/or recovery value. As shown in FIG. 21, the changes in market prices, CDS/LCDS, and the market recovery values influence loan prices. Chart 2105 shows market loan quotes 2110 and model loan prices 2115. Chart 2120 shows quoted LCDS spreads 2125 and CDS spreads 2130 for that credit. Chart 2135 shows quoted CDS recovery values 2140 and LCDS recovery values 2145.

The systems and methods described herein can calculate risk and profit/loss measures, including calculating (a) credit spread sensitivity (CS01) by bumping the firm's credit curve up and down by 1 basis point and taking the average distance in price; (b) recovery value (RR01) is the expected change in price due to a 1% absolute change in recovery rate; (c) the expected time to prepayment (ETP) is calculated by comparing the coupon with the credit curve (XDS) and is the point at which prepayment probability is 50%; (d) the expected to default (ETD) by using the issuer's credit curve (XDS) and is the point at which the cumulative default probability is 50%; (e) beta between the issuer's credit curve and a liquid measure based on CDS; (f) one basis point change in LIBOR (small for floating rate loans); and (g) computes daily changes in portfolio profit/loss based on market moves and their effects on these and other factors.

The expected times to loan default and prepayment are determined as the probability weighted averages of presence in those states over time from examination of the pricing lattice. At each node, the loan is in one of three states: prepayment, default, or continuation. The expected time to a default or prepayment is calculated by weighting the time at node in which that event occurs by the probability of transitioning into that node. The expected time to prepayment (ETP) is calculated by:

$$ETP = \frac{\sum_{time=1}^{\infty}(PPEachTimeInterval)*time}{\sum_{time=1}^{\infty}(PPEachTimeInterval)} \quad (18)$$

The expected time to default (ETD) is calculated by:

$$ETD = \frac{\sum_{time=1}^{\infty}(PDEachTimeInterval)*time}{\sum_{time=1}^{\infty}(PDEachTimeInterval)} \quad (19)$$

Figure 22:
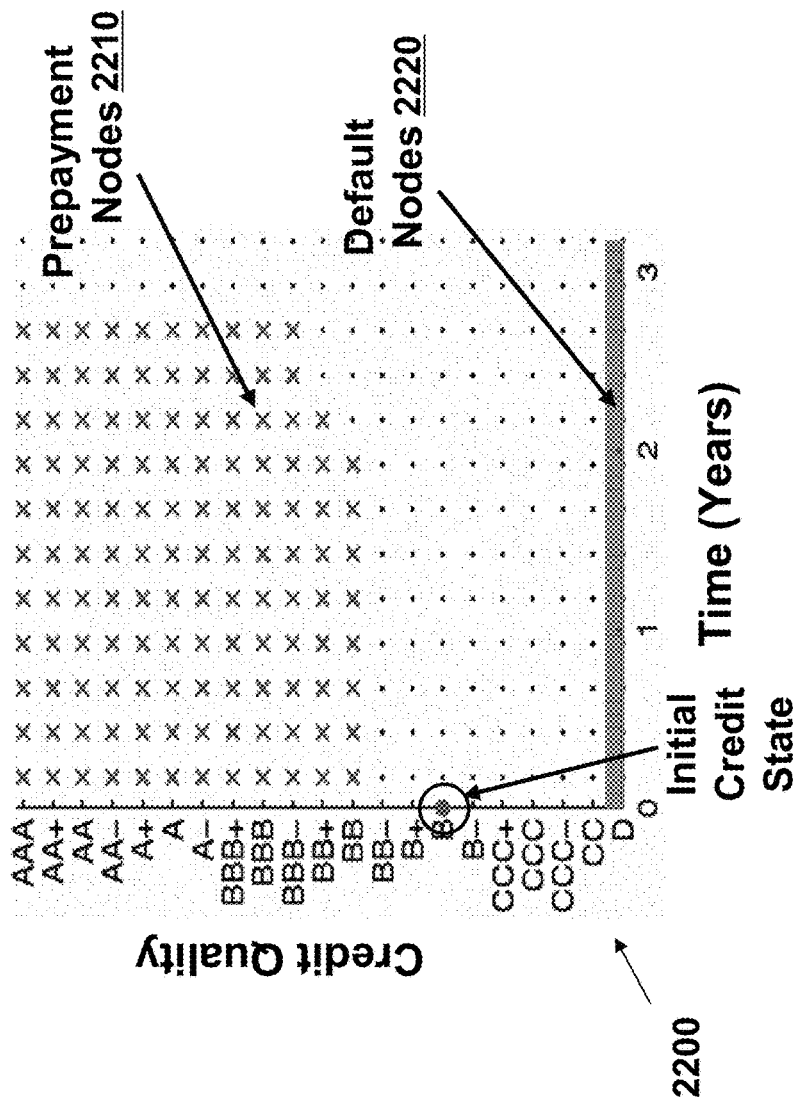
FIG. 22 depicts a pricing lattice according to an exemplary embodiment.

FIG. 22 shows a pricing lattice 2200 having prepayment nodes 2210 and default nodes 2220. For an initial credit state of B at an initial time, prepayment occurs at a given node 2210, default occurs at nodes 2220.

Figure 23:
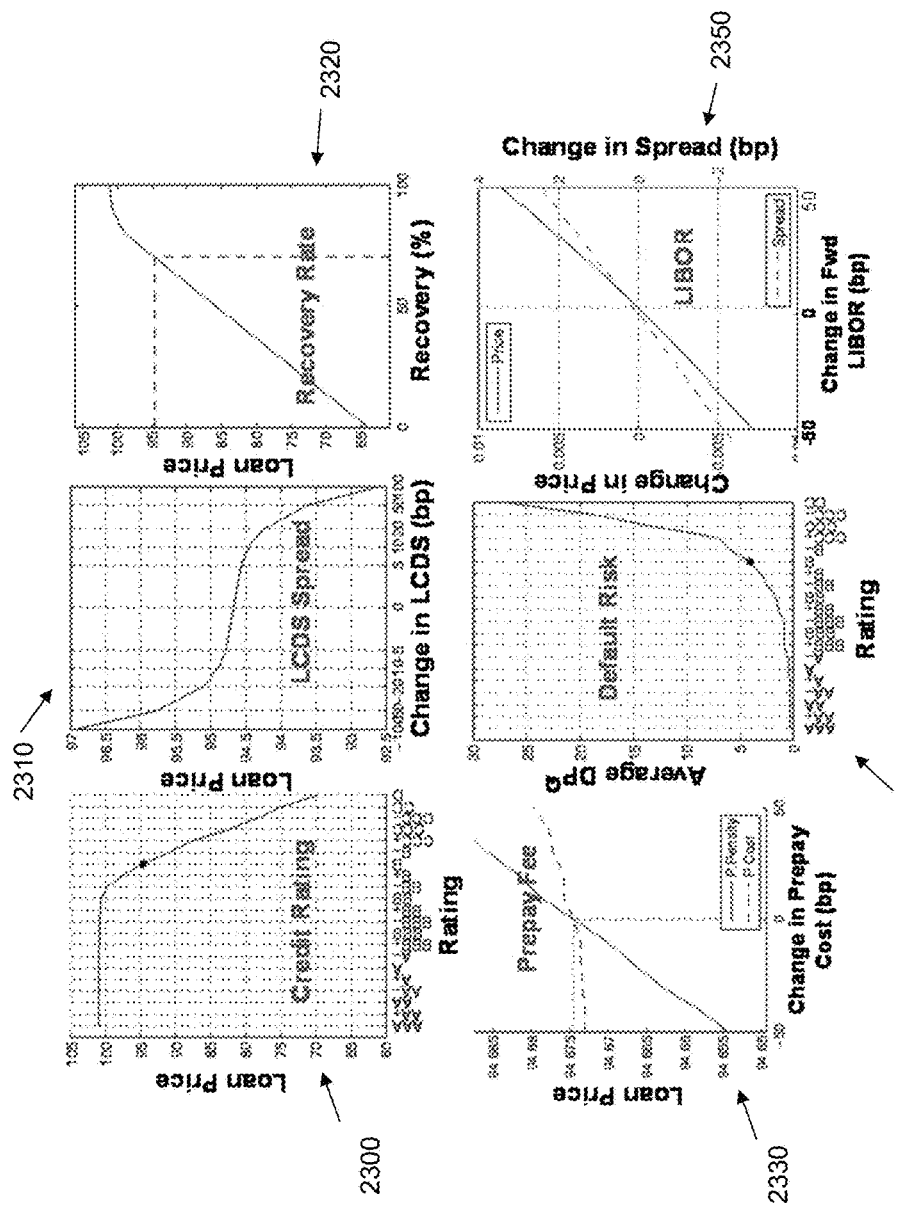
FIG. 23 depicts charts of price sensitivities according to an exemplary embodiment.

The model outputs loan price sensitivities to changes in various market parameters. The model also outputs a set of charts that describe those sensitivities, some of which appear in FIG. 23. The left hand graph in the top row of FIG. 23 shows the sensitivity to the LCDS or CDS spread (i.e., the calibration parameter) on the price of the loan whereas the middle and right panels of the top row show how credit ratings and recovery rates affect the loan price. The graphs in the lower row of FIG. 23 show how changes in prepayment fee (left panel), initial credit state (middle), and LIBOR (right panel) affect prices from the model for the sample loan.

The systems and methods described herein can output price sensitivities to a range of determinants of loan prices such as credit rating 2300 shown as credit rating versus loan price, LCDS spread levels 2310 shown as changes in LCDS basis points versus loan price, recovery rate in default 2320 shown as recovery percentage versus loan price, prepayment fees 23130 shown as change in prepayment costs (basis points) versus loan price, default risk 2340 shown as credit rating versus average $DP^Q$, and LIBOR 2350 shown as change in forward LIBOR (basis points) versus change in price, as depicted in FIG. 23. The charts showing these sensitivities can be shown separately or in any combination to the user to visualize the sensitivity parameters of any loan.

The model described herein differs from the floating rate bond model. In the yield-to-maturity (YTM) model, a loan is modeled as a risk free floating rate bond. The YTM method requires as input a loan price, the expected cash flows of a loan, and a LIBOR curve. The YTM method discounts expected cash flows by solving for the yield spread that matches the loan price. The YTM method does not consider default risk level or recovery rate in default. To account for the possibility of prepayment, the users of the YTM model often decrease the nominal maturity of the loan when pricing. A common assumption for the YTM method is a standard three year prepayment. In order to compare the model herein to the TM method, the respective CS01s are considered when calculated for three distinct cases: (1) loans expected to prepay (loan margin>LCDS), (2) loans expected to default (high LCDS), and (3) loans expected to continue to maturity.

Figure 24:
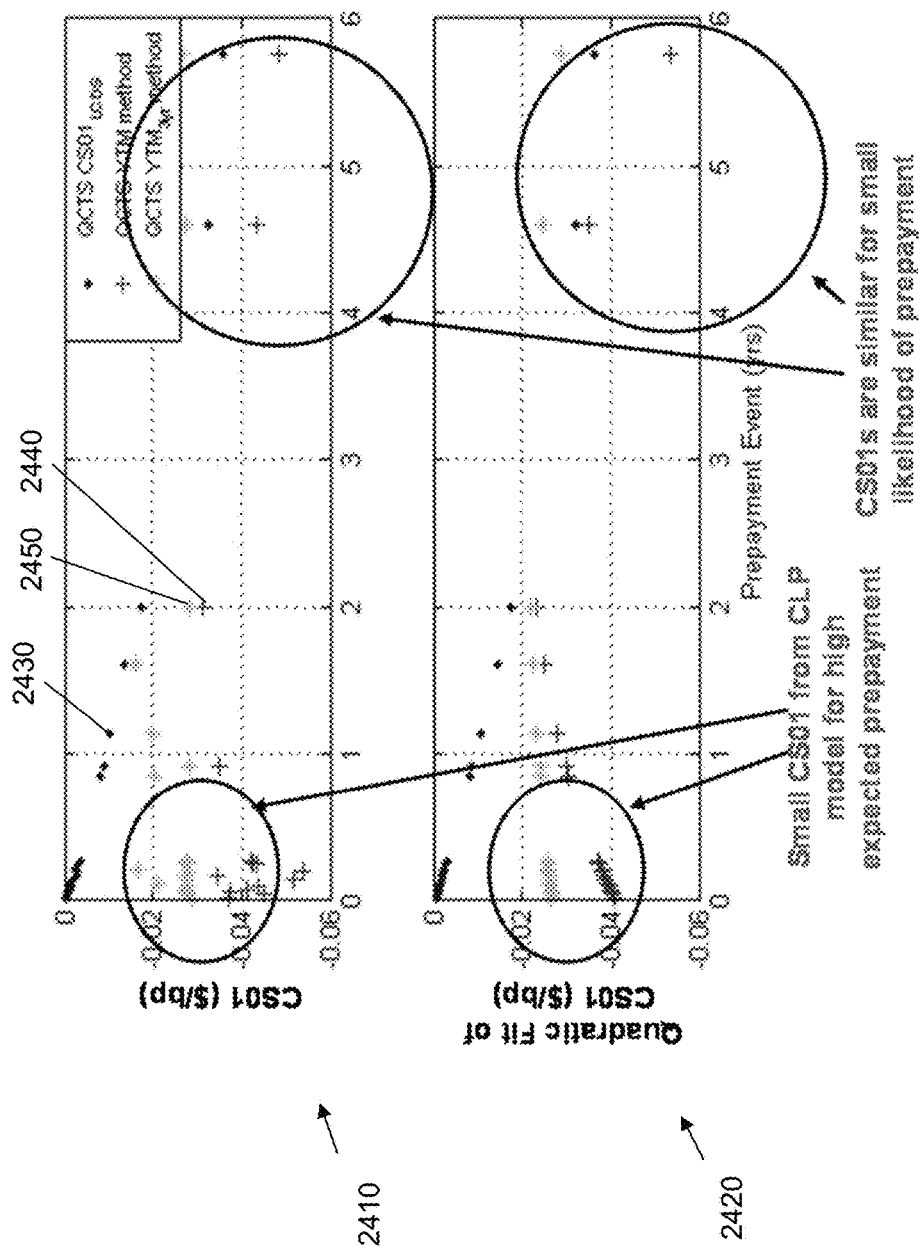
FIG. 24 depicts the effect of loan prepayments on models according to an exemplary embodiment.

As shown in FIG. 24, a first example is shown for the effect of loan prepayments on the model as compared to the YTM model CS01s. Chart 2410 shows CS01s calculated and chart 2420 shows CS01s fitted from the $CS01_{LCDS}$ method 2430, YTM method 2440, and $YTM_{3\text{-}year}$ method 2450. Expected times to 50% prepayment probability were calculated using the model for a set of loans and CS01s were plotted from the model and YTM models. The charts demonstrate that a major determinant of CS01 is the loan's effective duration. For the model described herein, the sooner the expected prepayment, the smaller the effect of a one basis point change in risk. The reverse is true for both versions of the YTM pricer. Therefore, CS01s from the model are less than those from the YTM for short expected times to prepayment (<3 years) and converge at longer times.

Figure 25:
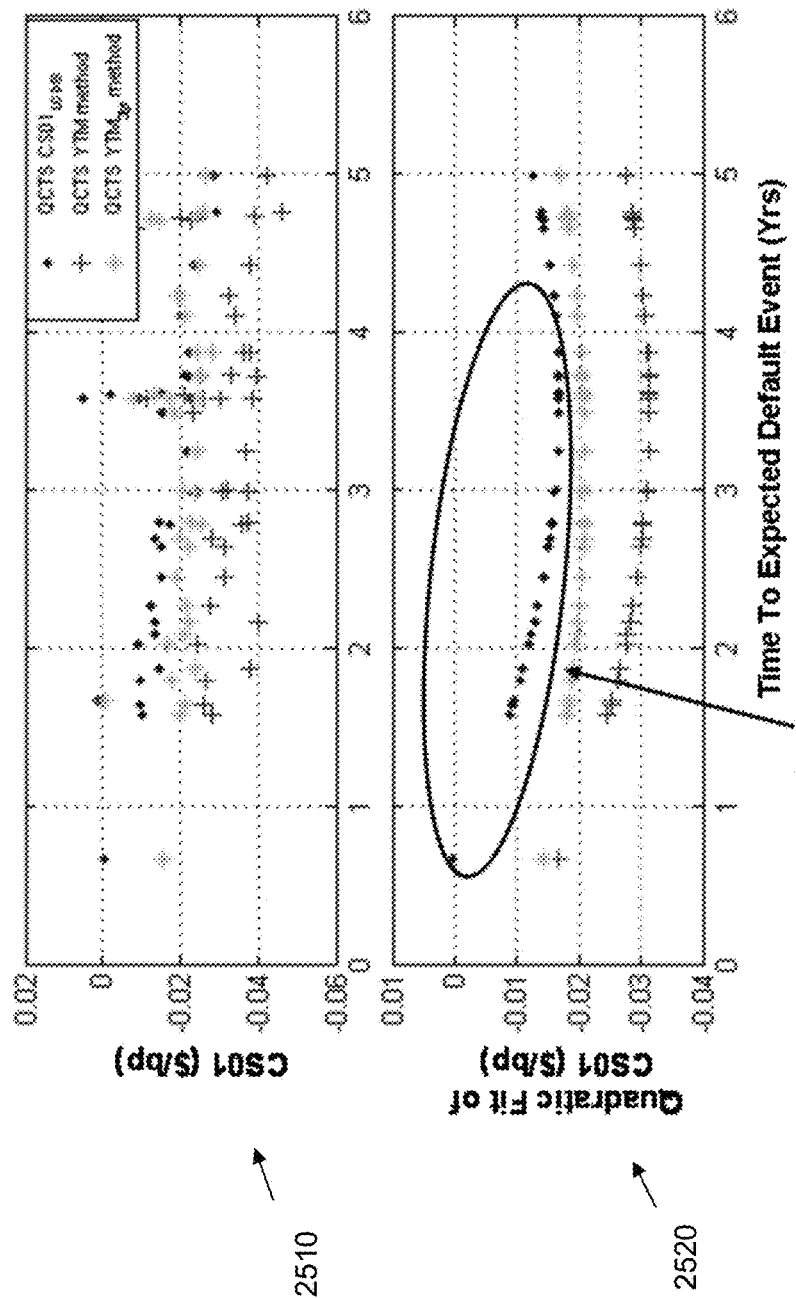
FIG. 25 depicts the effect of defaults on models according to an exemplary embodiment.

As shown in FIG. 25, a second example is shown for the effects of defaults on the model and the YTM model CS01s. Charts 2510, 2520 show the effect of expected time to 50% default probability on CS01s from the model and YTM (both maturity and 3-year) models. Expected times to 50% risk-neutral default were calculated and CS01s from the model and the YTM (maturity and 3-year prepay) models were compared. The model, but not the YTM models, take default into account. If the default probability is high, CS01s should be smaller. For high default probabilities (i.e., short expected default times), CS01 from the model is smaller than YTM CS01s. The shorter duration YTM model (3-year maturity) CS01s are intermediate to the model and the YTM maturity models. Best fit lines to CS01s indicate that CS01s from the model are consistently less than those from either YTM method.

Figure 26:
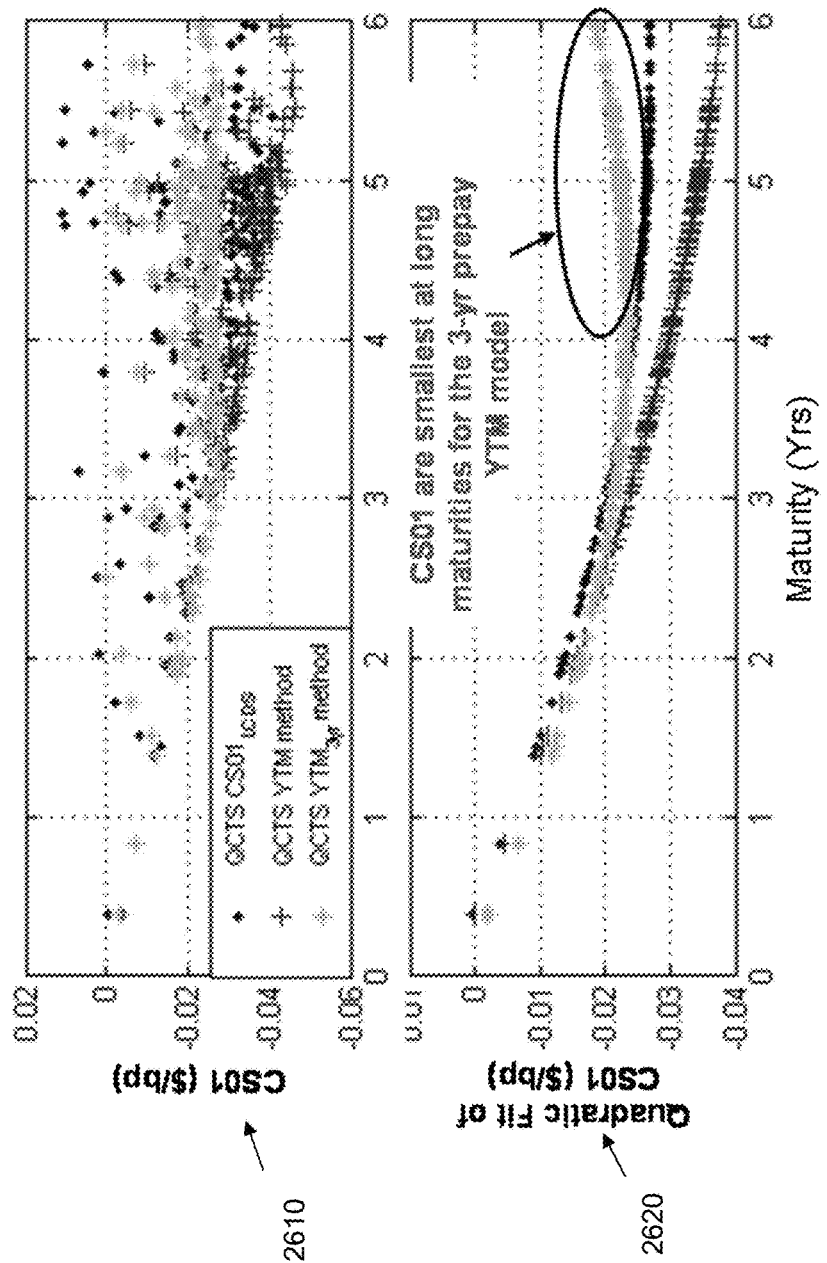
FIG. 26 depicts loans expected to continue until maturity according to an exemplary embodiment.

As shown in FIG. 26, a third example is shown for loans expected to continue until maturity. Charts 2610, 2620 show CS01s for loans with low risk of default and prepayment from the model and YTM (both maturity and 3-year) models. For loans with low expected default or prepayment, it is expected that CS01s are larger due to their longer effective duration. For loans expected to continue until maturity, the difference between the three methods is small. The model CS01 is between the TYM 3-year and YTM maturity for maturities greater than three years. The YTM 3-year model underestimates CS01s at longer maturities.

Figure 27:
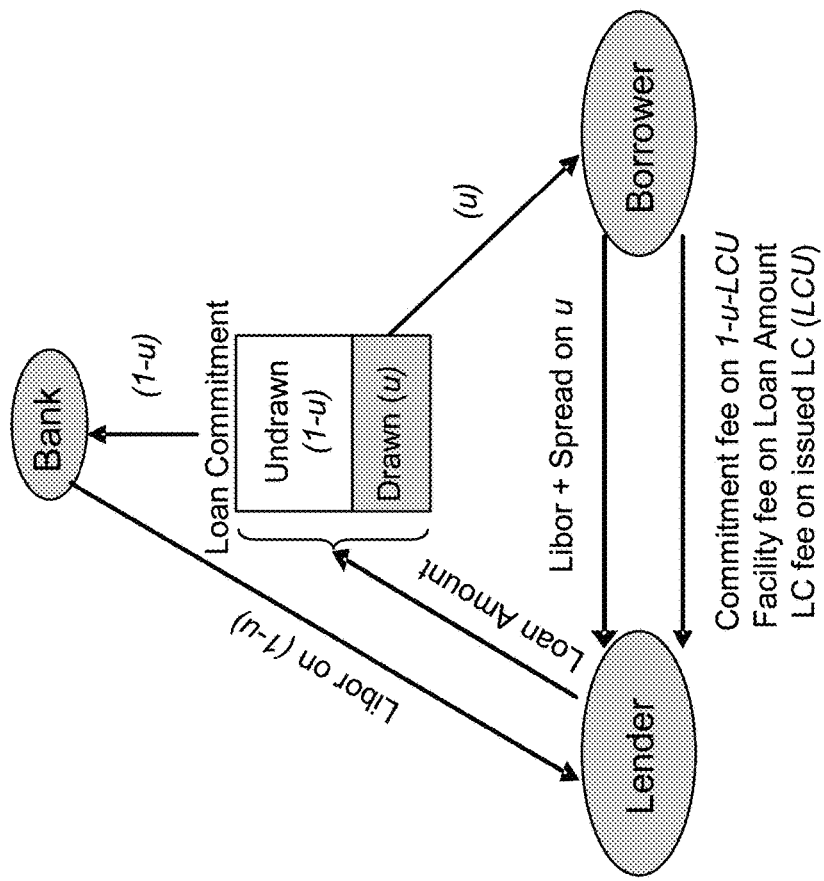
FIG. 27 depicts a representation of a model for valuing term loans, revolving credit lines and letters of credit according to an exemplary embodiment.

The model for term loans can also be used to enable valuation of revolving credit lines and letters of credit. The generalized framework for valuing term loans, revolving credit lines, and letters of credit is shown in FIG. 27. For revolving credit lines, the lender and the borrower enter into an agreement whereby the lender commits an amount (i.e., the principal), and the borrower has the right to draw on that principal while paying different fees on the drawn and undrawn amounts. For modeling purposes, the amount undrawn by the borrower can be viewed as being deposited by the lender in a bank account that earns a rate of LIBOR. The borrower is obligated to pay LIBOR plus a contractual spread on the drawn amount, a commitment fee on the undrawn amount, a facility fee on the principal, and a fee on any associated letter of credit (LC). For term loans the drawn amount is 100%. For amortizing loans the drawn amount is 100%, with the principal decreasing over time. Finally, for a revolving credit line the drawn amount can be time and credit state dependent.

Revolving lines of credit often include letters of credit. An LC is a guarantee for payment backed by the lender that may be used by the borrower when transacting with a third party, known as the beneficiary. For example, an LC may be used to facilitate purchase of goods or in support of an obligation of payment on a financial asset. One example of a financial letter of credit is an obligation to pay an insurance company the worker's compensation premium for a borrower's employees. The issued LC and drawn amount cannot exceed the committed credit line and there may be a limit on the LC notional that is below that of the associated revolving credit line. Also, due to differences in collateral, different letters of credit drawn on the same commitment line often have different recovery values in default, and the model can accommodate this. However, in practice, we typically assume that recovery values for all LCs on a given credit line are the same as that of the drawn loan. The main difference between an issued LC and an amount drawn on a credit line is that the letter of credit is not funded. Thus, the lender need not be compensated at LIBOR for the issued LC, but instead receives a fixed premium roughly equivalent to the obligor's borrowing rate over LIBOR. If the lender makes a payment to the beneficiary of an LC, that amount immediately becomes an obligation of the borrower and is converted within the model into a drawn amount.

To accommodate undrawn credit lines, it is necessary to modify our method of discounting described above for term loans. In addition, we must account for other types of fees associated with undrawn credit lines and letters of credit. As described above, for term loans the funding cost was used to discount the total face amount of the loan. Although the funding cost reflects the amount (above LIBOR) that market participants must pay to fund their borrowing, this applies only to drawn amounts of credit lines. As described below, there are costs to the lender of undrawn credit commitments and the borrower is assessed a fee as compensation. The differential pricing of drawn and undrawn commitments must be incorporated separately in the model. To accommodate this in the backward induction procedure required modification of both our method of discounting and assessment of fees in the lattice. In addition, we needed to embed in our algorithm assumptions regarding usage and prepayment of revolving credit lines. Each of these modifications is described in turn below.

Figure 28:
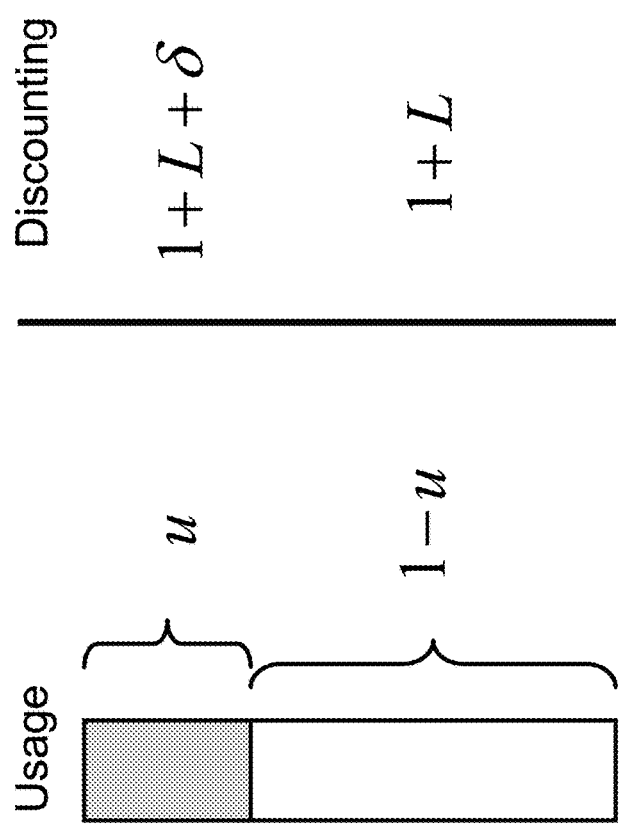
FIG. 28 depicts usage dependent funding cost according to an exemplary embodiment.

It is important to note that all modifications to the model affect only revolving credit lines that are not fully drawn. Our modification of the discounting function is relatively straightforward as schematized in FIG. 28. The figure depicts a loan with a drawn amount u and an undrawn amount 1−u. For term loans and drawn commitments, we discount those amounts by 1+L+δ, where L is LIBOR and δ is the nominal spread of the agreed premium at inception (or according to the pricing grid specified in that agreement— see below). The notional value of undrawn commitments u, is discounted at 1+L, reflecting the fact that no funds have been disbursed. That is, the resulting discount factor for a one-period case can be written as:

$$DF = \frac{u}{1+L+\delta} + \frac{1-u}{1+L} \quad (20)$$

where u is the expected usage in the next time step, L is the LIBOR rate between time t and t+1. As mentioned, when the loan is fully drawn this method discounts the whole face value with the funding cost $$DF(u \rightarrow 1) = \frac{1}{1+L+\delta} \quad (21)$$

and when the loan is not drawn, this method discounts only at L such that $$DF(u \rightarrow 0) = \frac{1}{1+L} \quad (22)$$

Finally, note that since letters of credit are unfunded, their usage does not contribute to the usage in Equation (18). We discuss the fees associated with letters of credit in a subsequent section.

Figure 29:
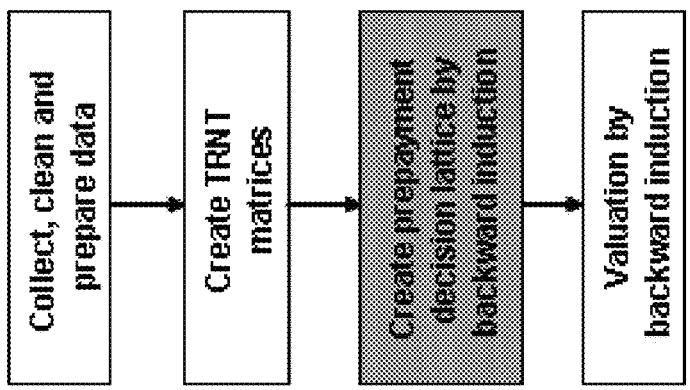
FIG. 29 depicts a loan valuation framework with separate prepayment determination according to an exemplary embodiment.

The prepayment decision can be separated from the valuation process to account for how fees associated with revolving credit lines influence the prepayment decision. Prior to incorporating revolving credit lines into the model, the prepayment decision was calculated concurrent with the cash flow valuation, as shown in FIG. 8. It became necessary to separate the prepayment decision from the valuation process to account for how fees associated with revolving credit lines influence the prepayment decision. The resulting methodology produces identical results for term loans, but a more intuitive result for revolving credit lines. FIG. 29 presents a diagram of the updated model in which an additional stage, the explicit calculation of the prepayment lattice, is inserted prior to the backward induction process. The modified prepayment modeling process is described herein.

The borrower's prepayment decision is based on the borrower's expected payments which are determined by the loan amount, drawn amount, issued LC, and their associated fees. The CLP model employs a credit and time dependent usage lattice ($U_t^i$) that reflects the fraction drawn from the credit line. For term loans, the usage lattice is fully drawn at all nodes until either maturity or prepayment. As before, the model assumes that a prepayment decision can be made only at coupon payment dates. However, the revised CLP also provides for a borrower specific and credit state dependent LC usage lattice ($LCU_t^i$) that reflects the fraction utilized as a letter of credit from the credit line. Usage amounts and assumptions for both drawn amounts and issued LCs are considered in detail below, Conditional on the borrower being in a non-default credit state i<N [i in AAA=1, AA+=2, . . . , D=N] at time t−1, the amount paid by the borrower for all non-default credit states j and time t can be written as:

$$CB_t^{i,j} = F_{t-1} * \Delta t * [U_{t-1}^i * (L_{t-1,t} + s_{t-1}^i) + (1 - U_{t-1}^i - LCU_{t-1}^i) * \mu_t + \omega_t + LCU_{t-1}^i * lcs_{t-1}^i] + (F_{t-1} - F_t), j < N \quad (23)$$

where, $CB_t^{i,j}$: Cash (coupon and/or amortizing principal) paid by the borrower at time t when transitioning from state i to state j between time t−1 and t;

$F_t$: Outstanding principal of the loan at time t. For bullet loans, $F_t$ is constant. For amortizing loans, $F_t$ is a monotonically decreasing function of time;

$F_{t-1} - F_t$: Principal paid back between time t−1 and t $$\Delta t : t - (t-1) = \begin{cases} 1/f & t > 1 \\ t_1 & t = 1 \end{cases};$$

$t_1$ is the time when the first payment is due;

f: Coupon frequency (usually quarterly);

$L_{t-1,t}$: Forward LIBOR rate between t−1 and t (usually for 3 months);

$U_t^i$: Borrower specific credit state and time dependent usage lattice which ranges from 0 for undrawn loan to 1 for fully drawn loan;

$s_t^i$: Drawn spread over LIBOR or Coupon for the drawn amount, can be usage and credit-dependent;

$\mu_t$: Commitment fee can be constant or linked to rating and/or usage;

$\omega_t$: Facility fee can be constant or linked to rating and/or usage;

$LCU_t^i$: Issued LC or usage corresponding to letter of credit which ranges from 0 for unissued letter of credit to 1 for fully issued loan; and $lcs_t^i$: Fee corresponding to letter of credit.

Revolving credit lines have a facility and/or a commitment fee $\omega_t$ and $\mu_t$, respectively; term loans have neither. Also, recall that for amortizing term loans the outstanding principal is calculated according to the amortization schedule $A_k$ using the following equation:

$$F_t = \sum_{k=t+1}^{T} A_k \text{ for } t < T \quad (24)$$

For term loans, many loan contracts have scheduled payments of principal prior to the maturity of the loan. To accommodate this, we define a vector A of amortization values, where each value corresponds to a time step in the lattice pricing. For example, for a term loan, A=(0, 0, 0, 0, 1.0), indicating no amortization payments prior to maturity. In this example, an amortizing loan issued with a coupon at L+200 where LIBOR is assumed constant at 3% and recovery in default is 75% of outstanding face. As a result, A=(0.1, 0.1, 0.1, 0.1, 0.6) and the payment at each coupon date prior to maturity is 10% plus the nominal coupon. So the amount of the coupon as well as the amount recovered in default decreases with decreases in the principal outstanding. We represent the outstanding principal F at any time step t prior to maturity T by assigning a time dependence to F in Equation (19) and the amount of face value to be added to the coupon at any given scheduled amortization date is $F_t - F_{t-1}$. As for term loans, the obligor will prepay the entire principal when economically appropriate and this is assessed in the backward induction algorithm as described above.

Consider the case for which the borrower is in a non-default state at time t−1 but defaults at time t. Typically, as a borrower attempts to avoid default, it draws more heavily than an obligor with a similar credit rating, but not under stress. This rush for cash can occur because the borrower has information about its own fragility that is often not captured in its market price and/or credit rating. In this case, the model assumes that the drawn amount at t−1 is equivalent to the amount drawn in the event of default, called Usage Given Default (UGD) in the model. The value of UGD and the issued LC usage at default, $lcs^N$, is assumed to be 100% and 0%, respectively, and is in agreement with market practices. For such cases, the amount paid by the borrower is calculated as:

$$CB_t^{i,N} = F_{t-1} \cdot UGD \cdot R, \quad (25)$$

where UGD is independent of time to maturity and R is the fractional amount of principal recovered after default.

For valuation purposes, we assume that borrowers will close their credit lines (i.e., repay all outstanding loan principal) if their credit state and market conditions make it uneconomical to continue paying the current rate. To model prepayments, we construct a lattice, $PL_t^i$, where each credit state i at a given time t is assigned a value of 1 if the loan prepays at that node or zero otherwise. We assign values to that array beginning at maturity and working back to the present date. At maturity, T, the value of the loan to the borrower, B, is the sum of the coupon and the outstanding principal. Noting that all remaining principal is paid at time T, the value of the loan for each credit state j at time T is equal to $CB_T^{i,j}$:

$$V_T^{B,i,j} = CB_T^{i,j} \quad (26)$$

where $CB_T^{i,j}$ is defined in Equations (24) and (25).

Having values for $V_t^{B,i,j}$ at T, we begin the backward induction process for T−1. In general, given $V_{t+1}^{B,i,j}$ and the transition probabilities $p_{t+1}^{Q,i,j} = (T_{t+1}^Q)_{i,j}$, the CDS-implied rating transition probabilities from t to t+1, the continuation value to the borrower at time t for state i is calculated as:

$$CV_t^{B,i} = DF_t^{L=0} \sum_{j=1}^{N} \left( V_{t+1}^{B,i,j} \cdot p_{t+1}^{Q,i,j} \right), \quad (27)$$

where $DF_t^{L=0}$ is the discount factor defined using Equation (20), but adjusted such that LIBOR=0 while keeping the funding cost δ. The justification for setting LIBOR to zero in Equation (27) is explained in the next section.

Within the model, prepayment at a node occurs if the continuation value exceeds the cost of refinancing, also known as the termination cost. Let $C^C$ denote the borrowers' cancellation costs and $C^P$ be any cancellation penalty owed to the lender, both expressed as fractions of the total commitment $F_t$. Then, the termination cost, $TC_t$, is:

$$TC_t = F_t * (1 + C^C + C^P) \quad (28)$$

where the sum, $C^C + C^P$ is referred to as the penalty cost (or P-Cost).

At each node, the borrower then compares the continuation value of the loan with the termination cost and will close the credit line at state i and time t if:

$$CV_t^{B,i} > TC_t \qquad (29)$$

Values are assigned to the prepayment indicator lattice, $PL_t^i$, where $PL_t^i = 1$ or 0 denoting prepayment or continuation, respectively, such that:

$$PL_t^i = 1 \text{ if } CV_t^{B,i} > TC_t$$

$$PL_t^i = 0 \text{ if } CV_t^{B,i} \leq TC_t. \qquad (30)$$

Once the prepayment decision has been made, the conditional loan value for the borrower at state j (conditional on having transitioned from credit state i at time t−1) is given by $$V_t^{B,i,j} = \begin{cases} CB_t^{i,j} + TC_t & \text{for } PL_t^i = 1 \\ CB_t^{i,j} + CV_t^{B,i} & \text{for } PL_t^i = 0 \end{cases} \qquad (31)$$

Equations (28)-(31) are applied iteratively to populate the prepayment lattice as t goes backward from T to 0.

The continuation value in Equation (27) does not depend on the LIBOR rate between t and t+1, but reflects only the cost of funding δ (Equation (20)) determined from the CDS-cash basis as discussed previously. This change is necessary to avoid incorrectly discounting both the drawn spread and fees amount by LIBOR when only the drawn amount is dependent on LIBOR. Furthermore, the valuation process is such that both the accrual and discounting of the drawn spread depend on LIBOR; thus setting LIBOR to zero has minimal effect on the present value of the drawn amount. In short, the over-discounting of prepayment fees by using LIBOR forwards leads to underestimation of the probability of prepayment; this is corrected by setting LIBOR equal to 0.

Figure 30:
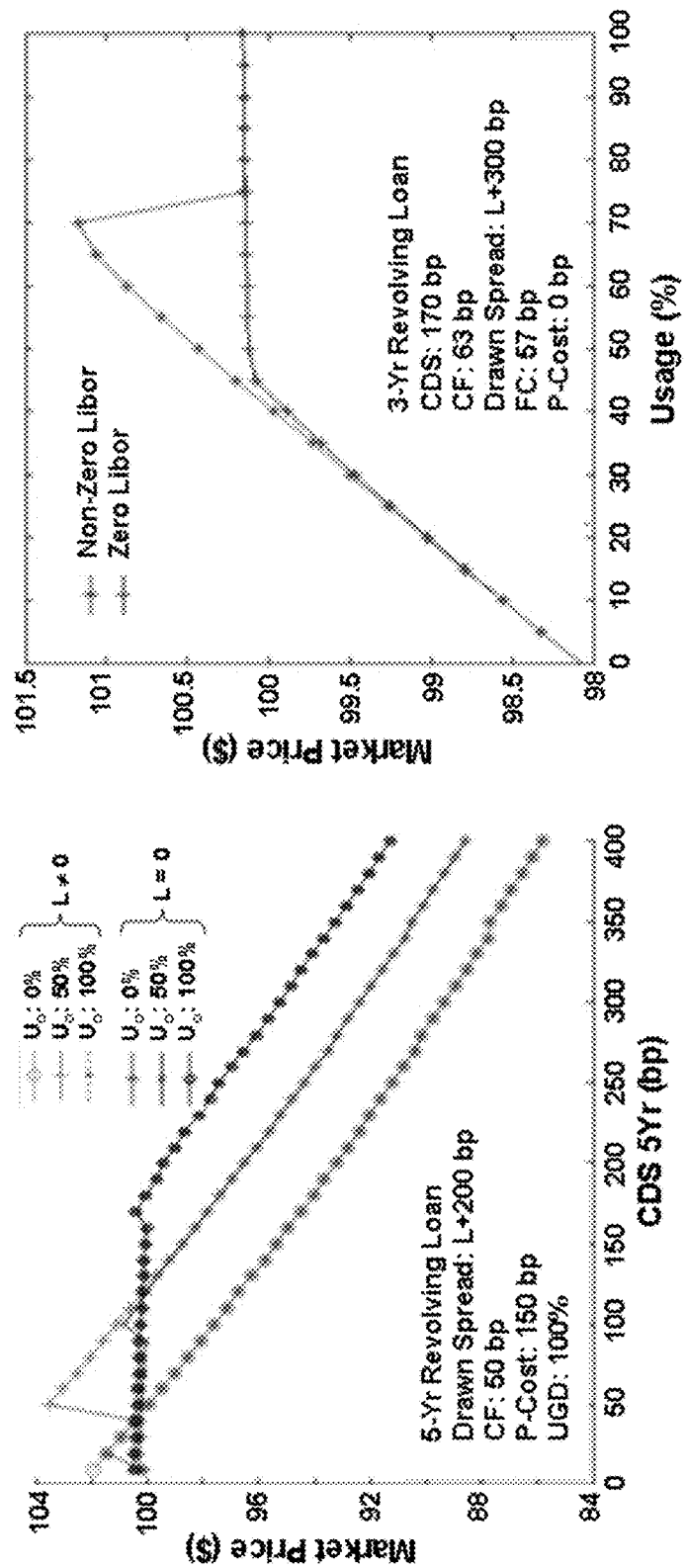
FIG. 30 depicts the effect of using forward LIBOR or no discounting on model prices for assigning values to the prepayment lattice according to an exemplary embodiment.

The problem with our previous prepayment method and the effect of our solution is illustrated in FIG. 30, which depicts the effect of using forward LIBOR or no discounting on model prices for assigning values to the prepayment lattice according to an exemplary embodiment. The left panel of the figure displays model prices as a function of CDS spread using either forward LIBOR rates or LIBOR=0 (i.e., no discounting). Price curves are shown for usage levels of 0%, 50%, and 100%. When the price is below par, discounting at LIBOR or 0 has no effect on the model price regardless of usage. In addition, fully drawn loans (i.e., $U_0$=100%) prices above par are also unaffected by LIBOR rate since there are no unfunded portion on which to apply fees. However, for partially drawn credit lines, including LIBOR in the calculation for determining prepayment results in prices well above par and in excess of the termination cost.

Another aspect of this problem is illustrated in the right panel of FIG. 30 in which model prices with and without forward LIBOR are plotted versus drawn usage. The figure shows that setting LIBOR to zero in the prepayment calculation produces the expected price cap for loans just above par regardless of usage, with little effect on prices for loans below par (i.e. with less prepayment probability). Finally, it is important to note that the discounting using LIBOR=0 occurs only when assigning values to the prepayment lattice.

Given the prepayment lattice, the value of the loan can be computed. Having created the prepayment decision lattice, $PL_t^i$, we now consider the value of the cash flow to the lender. Let $CL_t^{i,j}$ be the cash received by the lender when the borrower transitions from state i to state j at time t. Thus, for all t<T, $$CL_t^{i,j} = F_{t-1} \Delta t \cdot [U_{t-1}^i \cdot (L_{t-1,t} + s_{t-1}^i) + (1 - U_{t-1}^i - LCU_{t-1}^i) \cdot (L_{t-1,t} + \mu_i) + \omega_i] + F_{t-1} \Delta t \cdot [LCU_{t-1}^i \cdot (L_{t-1,t} + lcs_{t-1}^i)] + (F_{t-1} - F_t), j < N. \qquad (32)$$

For default state, i.e., j=N, the issued LC usage, $lcs^N$, falls to zero, while the drawn usage increases by $lcs^N$. Thus, on the transition to default state, the lender's cash flow is:

$$CL_t^{i,N} = F_{t-1} \cdot UGD \cdot R + F_{t-1} \cdot (1 - UGD) \cdot L_{t-1,t} \qquad (33)$$

where all other symbols are as defined above. The value to the lender at maturity, $V_T^{L,i,j}$, is given as:

$$V_T^{L,i,j} = CL_T^{i,j}. \qquad (34)$$

Given $PL_t^i$, the continuation value to the lender at time t can be calculated using the following:

$$CV_t^{L,i} = DF_t \sum_{j=1}^{N} \left( V_{t+1}^{L,i,j} \cdot p_{t+1}^{Q,i,j} \right) \text{ and} \qquad (35)$$

$$V_t^{L,i,j} = \begin{cases} CL_t^{i,j} + F_t \cdot (1 + C^P) & \text{for } PL_t^i = 1 \\ CL_t^{i,j} + CV_t^{L,i} & \text{for } PL_t^i = 0 \end{cases} \qquad (36)$$

where $DF_t$ is given by Equation (37).

$$DF_t = \cdot \frac{FU_t^i}{(1 + (L_{t-1,t} + \delta_t^i) \cdot \Delta t)} + \frac{1 - FU_t^i}{(1 + L_{t-1,t} \cdot \Delta t)} \qquad (37)$$

$DF_t$ in Equation (37) is similar to Equation (20) except that $FU_t^i$ is substituted for u to reflect expected future usage of revolving credit line and $\delta_t^i$ is substituted for δ to reflect a rating and time dependent funding cost.

Equations (35) and (36) are applied repeatedly, starting at t=T back to t=1, to compute the value of the loan $V_t^{L,i,j}$. Finally, from t=1 we discount back to t=0 such that the present value to the lender, $V_0^{L,i^*}$, is:

$$V_0^{L,R} = DF_{t_1} \cdot \sum_{j=1}^{N} \left( V_1^{L,i^*,j} \cdot p_1^{Q,i^*,j} \right) \qquad (38)$$

where i* indicates the initial credit rating of the borrower.

Figure 31:
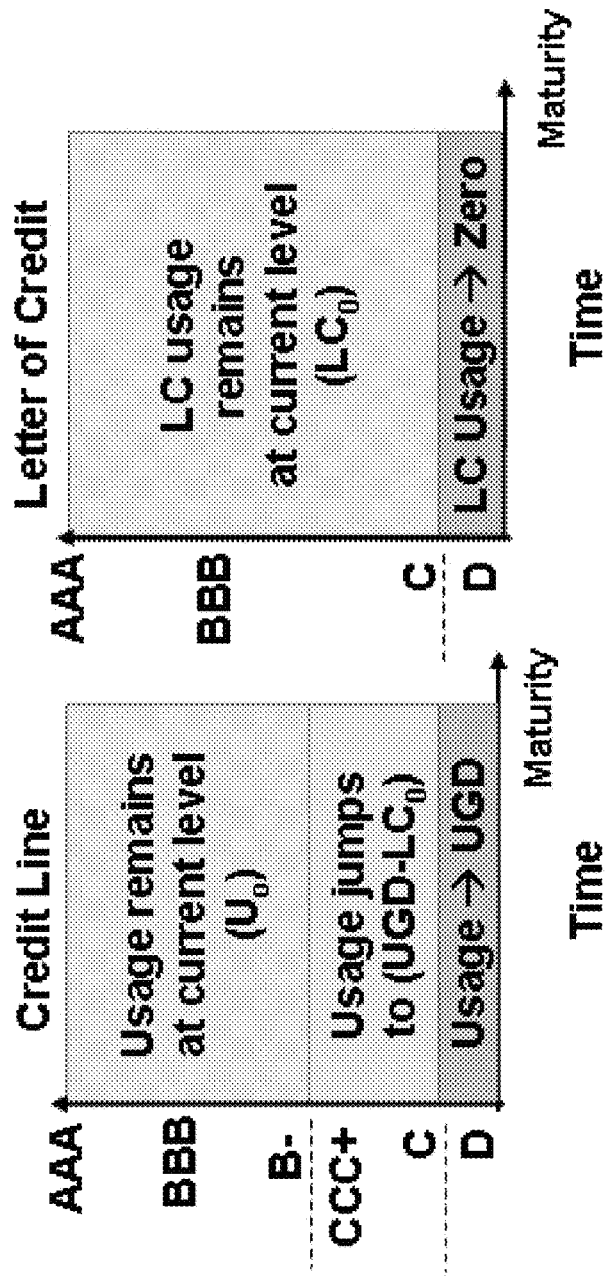
FIG. 31 depicts usage assumptions for revolving credit lines and letters of credit according to an exemplary embodiment.

For revolving lines of credit, the model requires as input a loan's current usage and any issued LCs. These are combined with model-embedded assumptions regarding the dependence of future drawn usage and issued LCs on credit state. The assumptions as currently assumed by Citi's Global Portfolio Management group are shown in FIG. 31 in which $U_0$ and $LC_0$ are amounts of the drawn credit line and the issued LC, respectively, on the pricing date.

The model currently assumes: (1) A constant drawn usage equivalent to the current usage for all times as long as the borrower's credit state is between AAA and B−; (2) Usage is equal to the UGD minus any issued LC for credit states between CCC+ and C; and (3) A usage of UGD at default.

For letters of credit, we assume a constant amount issued equal to $LC_0$ for all non-default states. If the borrower defaults, we assume that the lender pays the issued amount of the LC to the beneficiary. Upon the default-triggered LC payment, the issued LC falls to zero and the drawn usage increases by that amount.

Figure 32:
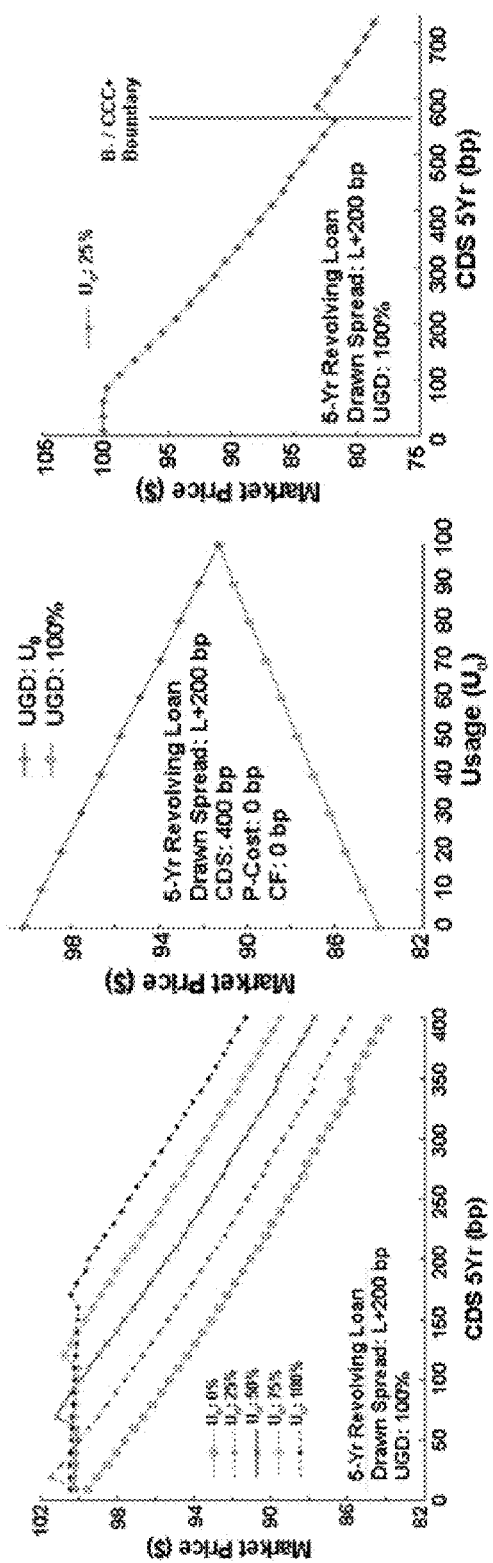
FIG. 32 depicts the effect of credit-dependent usage on revolving loan prices.

Model prices for revolving credit lines are sensitive to assumptions regarding credit dependent usage, as illustrated in the set of graphs in FIG. 32. The left panel which presents model prices versus CDS levels for five-year revolving credit lines for usage levels varying from 0% to 100%. For all levels of CDS, prices increase with increasing usage when the loan price is below par. This is because, since UGD is assumed to be 100% in default, a lender is facing the same loss in default for the undrawn loan ($U_o$=0%) as for a fully-drawn loan ($U_o$=100%). Despite that the losses in default are the same, the holder of the fully drawn loan would likely receive coupon payments prior to the default of this distressed firm, whereas only the commitment fee would be received on an undrawn credit line.

Another aspect of price-UGD relation is demonstrated in the middle panel of FIG. 32, which plots model prices for UGD=100% or UGD=$U_o$ as a function of $U_o$. For low values of $U_o$, the case where UGD=$U_0$ will have a higher price than when UGD=100% drawn commitment. However, as $U_0$ increases from 0%, this difference narrows until they become identical instruments at $U_o$=100%. That is, with UGD=$U_o$ price goes down as more has been drawn, but for UGD=100%, price goes up as coupon income prior to default increases. For intermediate values of UGD, the resulting price will lie somewhere between the two curves in FIG. 32. The effect of the increased coupons from the newly drawn portion prior to default is illustrated in the right panel of FIG. 32. That figure shows the effect on prices as usage steps from $U_0$ to UGD=100% as credit crosses the B−/CCC+ boundary at about 581 bp. That is, when the borrower's CDS implied credit state crosses the distressed state boundary, cashflows to the lender from coupons on increased usage occur with only a minor increase in risk. This effect results in the CR01 (price sensitivity to CDS) flipping to positive from negative, which subsequently reverses with further increases in CDS.

To examine the sensitivity of the pricing model to usage assumptions, we examined the effects of four different usage schemes on loan prices. Those usage schemes are illustrated in the left panel of FIG. 33. These are: (1) Usage is constant and same for all credit ratings and time [$U_0$=UGD=25%]; (2) Usage is constant for all credit states between AAA and B− [$U_0$=25%]. For states CCC+ and below the usage is 100% [UGD=100%]; (3) Uo increases linearly between AAA and CCC+ ranging from 0% to 75%. For states CCC+ and below the usage is 100% [UGD=100%]; and (4) Usage increases linearly between AAA and D ranging from 0% to 100%.

Figure 33:
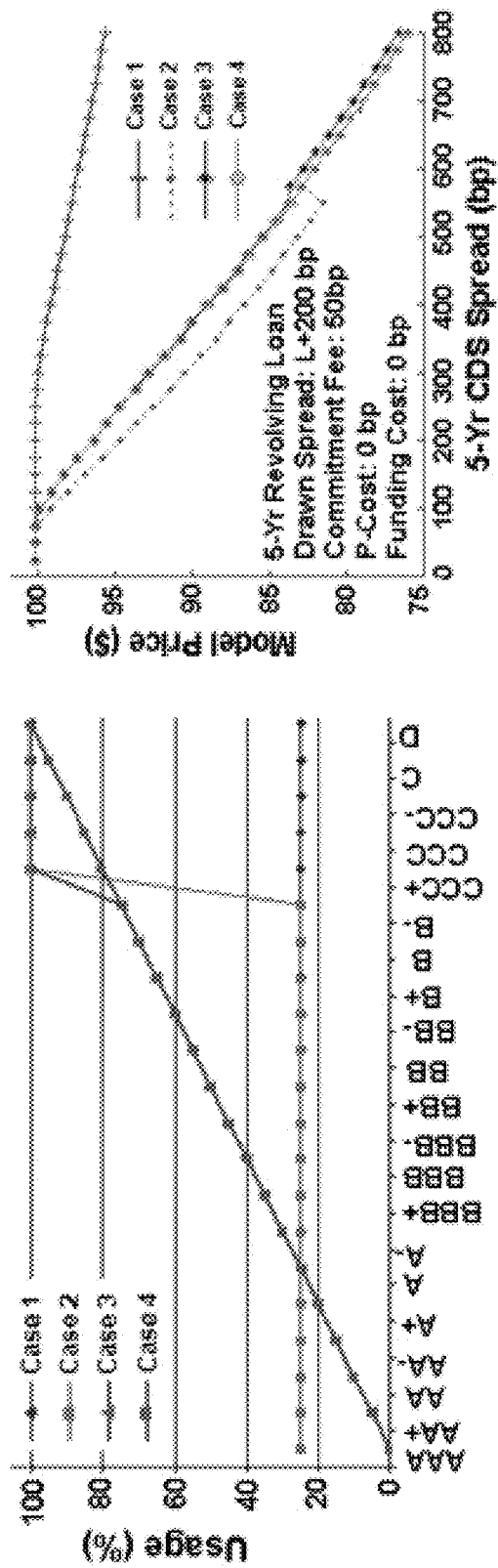
FIG. 33 depicts the effect of usage assumptions on model prices.

Loan prices for all four cases are shown as a function of CDS spread in the right panel of FIG. 33. Prices for Case 1, a constant 25% usage for all credit states, are greatest for all CDS spreads as would be expected from the middle panel of FIG. 33. Cases 2 and 3 each have an abrupt increase in usage at the B−/CCC+ boundary with a concomitant increase in price. However, the jump is smaller for Case 3 than for Case 2 due to the smaller increase in usage for Case 3 at the B−/CCC+ boundary. Finally, the smooth usage transitions of Case 4 produces no significant discontinuities in price or changes in CR01 with CDS spreads. Note that we might reevaluate our UGD assumptions as the business gains experience.

Figure 34:
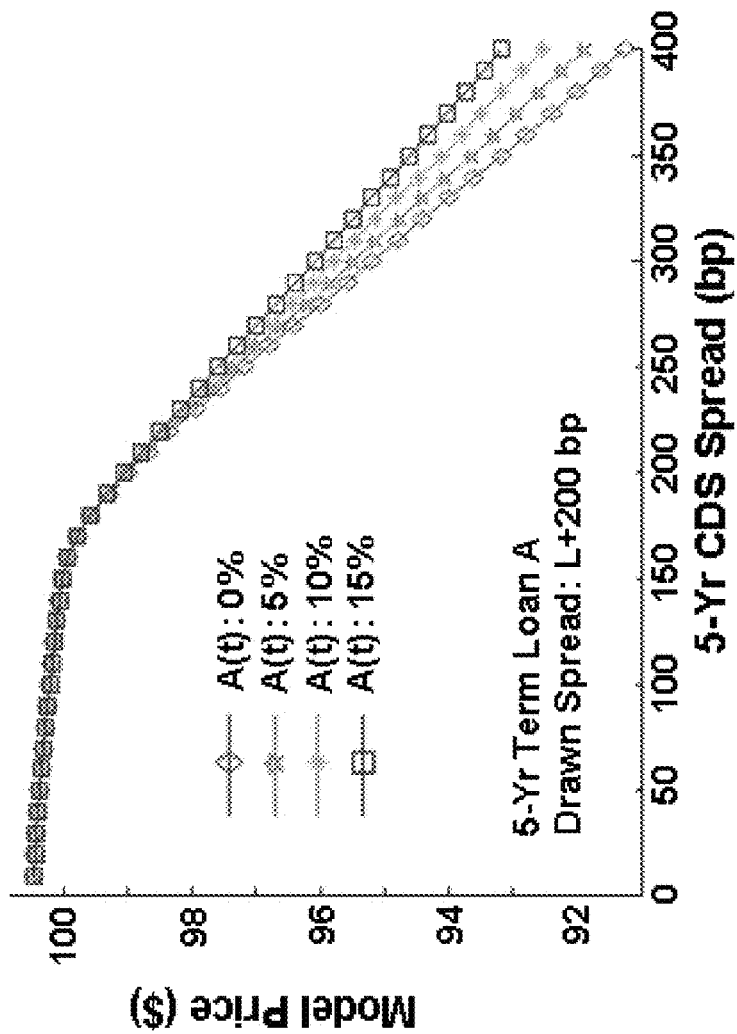
FIG. 34 depicts changes in CDS spreads on model prices for a five-year term loan for various annual amortization rates according to an exemplary embodiment.

Recall that the ability to value amortizing loans in the risk-neutral loan pricer is described in Equation (24). FIG. 34 illustrates how CDS spreads and amortization schedules affect model prices for a five-year term loan with a drawn spread of LIBOR+200 bp. As in Equation (24), we let A be the vector of amortizing values for a five-year loan given by (x, x, x, x, 1−4x) where x is the annual fractional yearly amortizations as shown by A(t) in FIG. 34. As for bullet loans (i.e., where x=0%), the loan prepays the entire principal when economically appropriate. Notice that loan prices increase as amortization rate increases, reflecting the decreased duration of the loan and the resulting decrease in losses due to default.

Loans are floating rate instruments and therefore have minimal interest rate risk. We define interest rate risk as the change in price for a 1 bp change in rates, specified as IR01. We note, IR01 (whether positive or negative) is small compared to the risks from changes in probability of default or recovery rate (CR01 and RR01, respectively). For a loan, which typically resets off of three-month LIBOR, only the upcoming coupon payment has direct interest rate risk. Thus, one would expect the loan holder to be only slightly long interest rates (negative IR01). As is explained below, depending on the definition of IR01, a loan holder could actually be slightly short interest rate risk (positive IR01). That is the resulting IR01 will depend on the assumed relationship between LIBOR rates and the obligor's CDS curve. In our implementation, IR01 is defined as $$IR01 = \frac{\partial P}{\partial L}\bigg|_{CDS} \quad (39)$$

which is the change in price when only LIBOR changes but CDS spreads and all other pricing parameters are held constant. However, holding CDS spreads constant while varying LIBOR results in changes in survival probabilities as calculated under the risk-neutral measure. Although loans are floating rate instruments, an investor may be long or short small amounts of IR01, depending on how it is defined.

Figure 35:
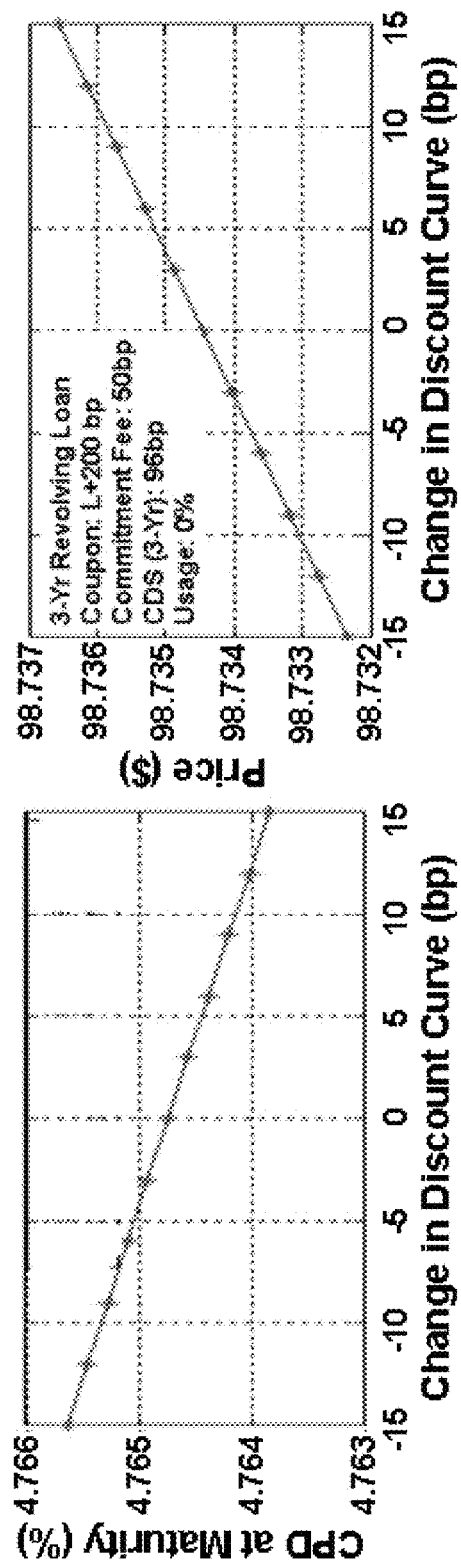
FIG. 35 depicts the effect of interest rate (LIBOR) change on default probability and loan price for constant CDS spreads according to an exemplary embodiment.

That IR01 can be negative is due to risk-neutral PDs decreasing with decreases in LIBOR. The CDS spread-implied cumulative probability of default (CPD) is calculated by equating the present value of the fixed leg of a credit default swap (premium payments) to the present value of the contingent leg of the swap (payment upon default). For example, the left panel of FIG. 35 demonstrates how CPDs depend on the level of the discount curve for a three-year CDS contract when calculated under risk-neutral measure. The right panel of FIG. 35 shows corresponding changes in price for a three-year credit line with a flat CDS of 96 bp. The left graph shows that as interest rates decrease, the three-year CPD increases. The reason for this is because the CDS spread, under risk-neutral measure, is assumed to be a spread-to-Libor, not Treasuries. Thus, when Libor decreases, but U.S. Treasuries do not, there is an increase in risk-neutral PDs. This increase in default probability results in a decrease in the value of the loan as depicted in the right panel. Although the effect of rates on survival probability and subsequently on price are small they can become evident when multiplied by the CR01 of the loan. Thus, given the interaction between negative IR01 for the first coupon and positive IR01 from changes in survival probabilities with rates, the net IR01 may be positive in some cases. Nevertheless, in any case, IR01's are typically negligible for almost all loans.

Figure 36:
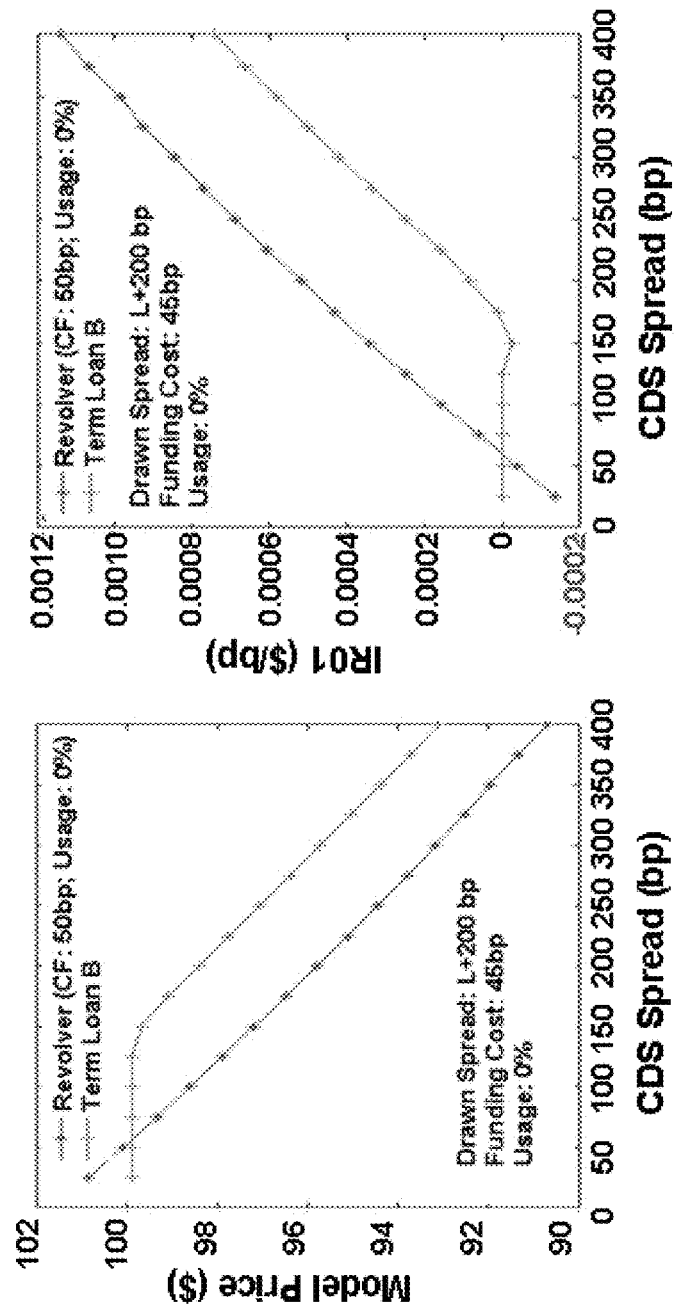
FIG. 36 depicts the dependence of model prices and IR01 on CDS spread for a three-year revolving loan and a three-year loan term according to an exemplary embodiment.

The left and right panels of FIG. 36 show the dependence of loan price and IR01, respectively, on the CDS level. For comparison, results are shown for a three-year term loan (green line) with a drawn spread of LIBOR+200 bp and a funding cost of 45 bp and a revolving line of credit (red line) with a 50 bp commitment fee. As described above, the results demonstrate that the IR01 can be positive if CDS level remains constant as LIBOR is varied.

The method of computing IR01 changed to render those values consistent with the intuitive relationship between price and interest rate. That is, we can hold the probability of default constant while changing interest rates by varying the US Treasury rate, r, while keeping the LIBOR spread constant. Then, one can redefine Equation (40) as:

$$IR01 = \frac{\partial P}{\partial r}\bigg|_{CPD} \quad (40)$$

Using Equation (40) takes into account that a change in interest rate would lead to a change in CDS premium while keeping the survival curve constant.

Letters of credit (LCs) are guarantees for payment by financial institutions for obligations incurred by borrowers. The parties to a letter of credit are the beneficiary who is to receive the money, the issuing bank (of whom the applicant is a client), and the advising bank (of whom the beneficiary is a client). Thus, LCs can be viewed as credit protection for a third party, purchased by an obligor to that party and guaranteed by the lender. Committed LCs have running floating-rate coupons similar to that for a loan along with the commitment fees on the undrawn portion. Thus, pricing LCs is very similar to valuing a revolving credit line.

Figure 37:
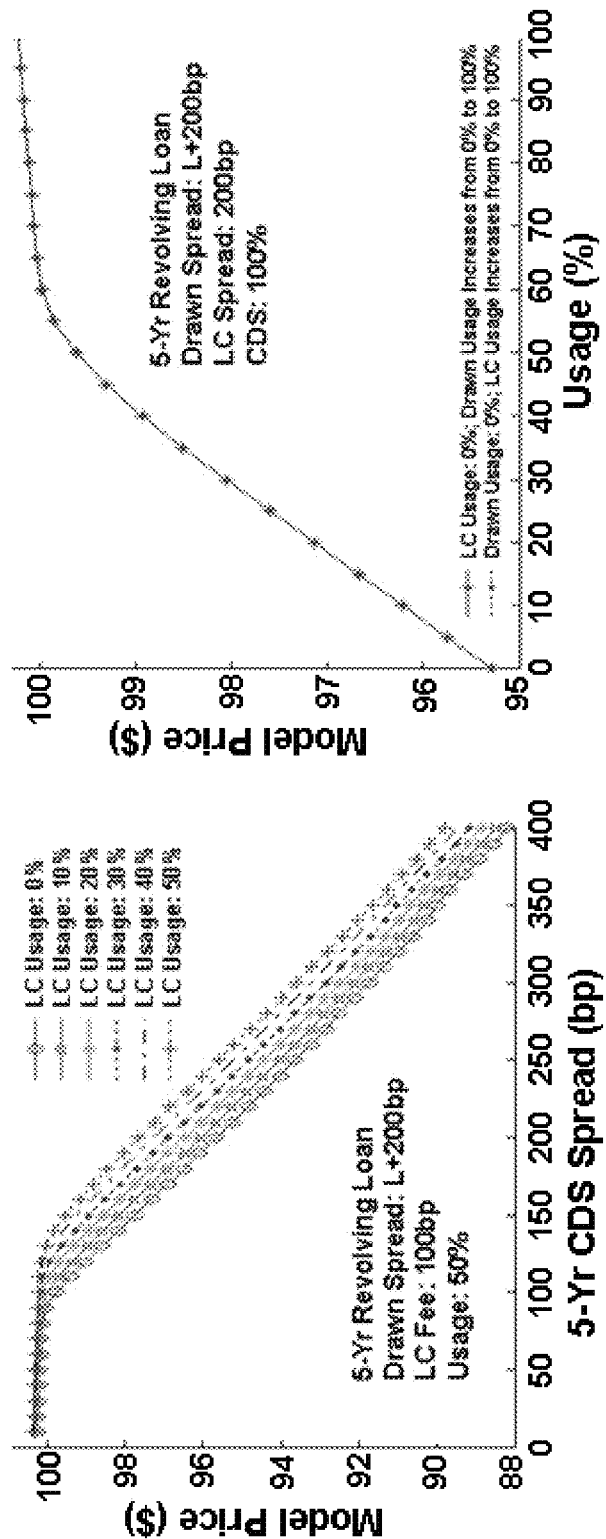
FIG. 37 depicts the effect of letter of credit usage on loan price with varying CDS, the effect of drawn usage on a revolving loan and LC usage on loan prices from the model according to an exemplary embodiment.

As issued fractions of LC commitments increase, loan prices increase for all levels of CDS. FIG. 37 shows several aspects of LC pricing. The left panel of the figure demonstrates the effect of LC usage, denoted $LCU_t^i$ in the model formulation, on loan values. Prices are calculated on a hypothetical five-year revolving credit line with drawn spread of 200 bp, a drawn amount of 50%, a letter of credit fee (LC Fee) of 100 bp, no commitment fee, no facility fee, and assumed recovery rate in default of 40% of drawn principal. Prices are shown for LC usages ranging from 0% to 50% (the maximum LC usage given a drawn amount of 50%). The figure shows that as issued LC (i.e., $LCU_t^i$) increases, loan prices increase for all levels of CDS. This price increase results from the increases in the lender's expected cash flows despite the increased chance of a loss given default.

The right panel of FIG. 37 demonstrates the similarity between values of LCs and revolving loans as a function of usage. The red curve in the figure is created using a hypothetical five-year loan with 0% drawn usage, drawn spread and LC fee of 200 bp and a range of values of issued LC from 0% to 100% of the outstanding line. The blue curve is created using a hypothetical five-year revolving loan with 0% issued LC, drawn spread and LC fee of 200 bp and a range of values of drawn usage from 0% to 100%. Since the loans have same drawn spread and LC fee and given that the model assumes the same recovery in default for drawn usage and issued LC the two curves are identical.

The loan pricing framework presented above is applicable to European loans as well. The main differences between pricing loans issued in Euros and U.S. Dollars is in the input data, but not in the pricing lattice framework, per se. When pricing European loans, one needs to substitute European swap rates for U.S. Dollar rates and use European CDS spread curves and their average levels by credit agency ratings. However, no changes are required in the pricing algorithm. These features are incorporated in the model that that can be used for daily loan pricing.

A pricing grid specifies the drawn spread to be paid by the borrower as a function of time and credit rating. Given increasing recognition that agency ratings tend to lag market perceptions of credit risk, alternatives to agency-ratings-based pricing grids are becoming more common. In particular, pricing grids based on firms' CDS spreads have been used as well as pricing grids based on firms' leverage ratios. In this section, we describe the implementation of CDS based pricing grids and leveraged-based grids in Citi's Loan Pricing model.

Figure 38:
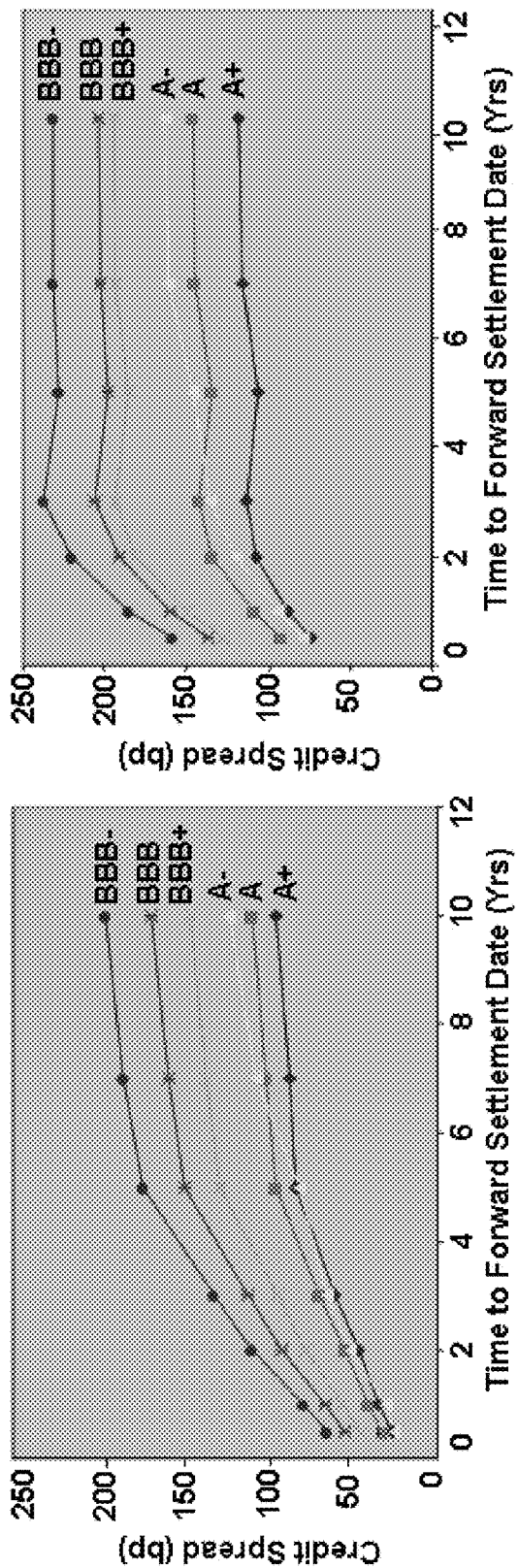
FIG. 38 depicts CDS curves by rating, and three-month curves corresponding to CDS spreads according to an exemplary embodiment.

The relationship between CDS spread curves by rating and their corresponding three-year forward CDS rates appear in FIG. 38. For example, the three-year forward curves for each rating on Sep. 24, 2010, the day the curves were obtained, are the CDS spreads at three years in the left panel of the figure. At 0.5 years, the three month forward rates are the CDS spreads over the period between 0.5 years and 3.5 years and so on.

In a CDS based pricing grid the drawn spread is dependent on a specific tenor of the CDS curve of either the issuer or a specified index—referred to as the grid CDS curve. This document describes the construction of CDS based pricing grids in the Citi Loan Pricing model. For example, consider a loan in which the borrower agrees to pay a drawn spread equivalent to its three year CDS spread ($CDS_{3YR}$). In pricing this loan the model needs to estimate $CDS_{3YR}$ spread at every coupon payment date until the loan matures. Previously the model assumed that the future $CDS_{3YR}$ spread is equivalent to the current $CDS_{3YR}$. In implementing CDS-based grids the model is modified to use the future $CDS_{3YR}$ level. The $CDS_{3YR}$ is obtained by taking the $CDS_{3YR}$ forward spread at every future coupon date.

FIG. 39 presents an example of a typical CDS spread-based pricing grid. As indicated, the pricing grid is based on a combination of credit ratings and three-year CDS spreads. For example, given a credit rating of A– the drawn fee is 100% of the issuer's $CDS_{3YR}$, but only if it falls between a floor of 100 bp and a cap of 200 bp. If the CDS spread is lower/higher than the floor/cap then the floor/cap level is used as the fee. In our initial implementation of the loan model, we used the spot CDS level observed on the pricing date to calculate the drawn fee and assumed that it would remain constant until maturity. As mentioned above, implementation of the CDS spread-based grids requires using forward three-year CDS spreads at each coupon date. Thus, in this implementation, we calculate forward CDS levels implied by CDS spread curves and compare these forward CDS levels with the floors and caps to determine the fee. Similarly, the model calculates the drawn spread for paths in which the issuer rating changes by using the representative CDS curve for the new rating.

Based on the pricing grid shown in FIG. 39 the drawn spreads for selected times are presented in FIG. 40. The figure shows the pricing grid with constant three-year CDS on the left and our new method using forward three-year CDS on the right for $2^{nd}$, $4^{th}$, $6^{th}$ and $8^{th}$ coupon dates.

The impact of using either spot or forward CDS spreads is illustrated for a loan in Citi's FAS 159 Fair Value Option portfolio. This loan has a CDS spread-dependent pricing grid similar to that presented in FIG. 39. As usage rises from 0% to 60% prices increase linearly for both spot and forward CDS. However, prices generated using the forward CDS curve rise faster until reaching par at 60%, after which prices remain constant. When using spot CDS, because prices remain below par over the entire range of usage, they continue to rise linearly. FIG. 39 demonstrates the importance of using forward CDS over the static CDS curve. For this particular loan, the price difference can be as large as $1.18.

Additionally, the pricing model can value revolving credit lines that have pricing grids linked to firms' leverage ratios. The need for this extension is evidenced by 13% of the loans issued in 2009 and 2010 having leverage ratio pricing grids. A leverage-ratio-based pricing grid specifies the drawn spread to be paid by the borrower as a function the firm's leverage ratio, defined as Net Debt/EBITDA. As a borrower's leverage ratio increases, the firm is expected to pay more drawn spread to compensate for the increase in credit risk, and vice versa. An example of the leverage-ratio-based pricing grid is shown in FIG. 41. The figure indicates that if the issuer's leverage ratio is 2.1, then the coupon on the drawn portion of the loan would be 75 bp. If the borrower's leverage ratio increases to 2.6, corresponding to the third row in FIG. 41, the coupon on the drawn portion would increase to 90 bps.

For loans with pricing grids based on agency ratings, the model begins with the loan at the current rating. The model then calculates the cash flows as the issuer's credit state propagates over time based on the historical ratings migration probabilities and the issuer's CDS curve as described earlier. One way to extend the model would be to obtain a historical leverage ratio migration matrix to substitute for the ratings migration matrix. Alternatively, one could map leverage ratios to ratings and continue to use the historical ratings transition matrix. However, historical leverage ratio data by rating category is sparse to non-existent. Furthermore, a preliminary analysis of external leverage ratio-ratings data showed the relationship between leverage ratio and agency credit rating is not strong.

Given the scarcity of leverage data and the poor relationship between credit and leverage given our current data set, we adopted a simplified method to price leverage ratio loans. The method should be viewed as provisional until such time as the data required for the fully calibrated model is obtained. Our method is based on the assumption that the issuer's leverage ratio will either remain at current level for the life of the loan or the obligor will default with the probability implied by the issuer's CDS curve. This assumption is based on discussions with the business and reflects how leverage ratio dependent revolver loans are priced by trading desks which also lack historical data. Under this simplification, loans with leverage-dependent pricing will be modeled with a two state assumption: in the non-default state the spread and facility/commitment fees will be treated as constant, and in default, as with all other loans, the borrower receives the recovery value.

Without the historical leverage ratio volatility it is not possible to assess the effect on pricing of our simplified model. However, it is useful to examine how such this assumption impacts prices of loans with ratings-based pricing grids. FIG. 42 shows the price comparison for the FAS 159 portfolio, between the current model and the proposed simplified method as applied to rating-based pricing grid. That is, if an issuer is currently rated BBB+, the simplified model assumes it remains at BBB+ for the rest of the life with a CDS implied probability of default. The difference between both methods is very small, no more than 14 cents (Fortune Brands). If the leverage ratio migration volatility is comparable to the ratings migration volatility it is fair to expect the same small impact on the leverage ratio loans.

The methods and systems described herein can value loans under risk neutral measure using backward induction. The need for a pricing model calibrated to CDS and bond prices is required due to the lack of price discovery for loans, the loan prepayment option, and the requirements of revolving credit lines. Construction and implementation of the lattice model poses both theoretical and numerical challenges which were addressed in this report. The model has been deployed for applications in various businesses across the firm. Evidence of the usefulness of this approach can be found in the many successful applications that have embodied the model since its development. These include implementation of the "fair-value option" prescribed by FAS 159, loan origination, loan pricing verification for illiquid trading positions, quarterly mark-to-market for bank regulator reporting purposes, and for margining of client loan positions.

Various embodiments can be implemented for credit-state assignment to value fees on revolving credit lines. Using one method, a change in implied credit state could lead to an unrealistic change in a revolver's fees, thereby influencing inappropriately the model price. The revised solution resolves this issue while simplifying the model.

Figure 43:
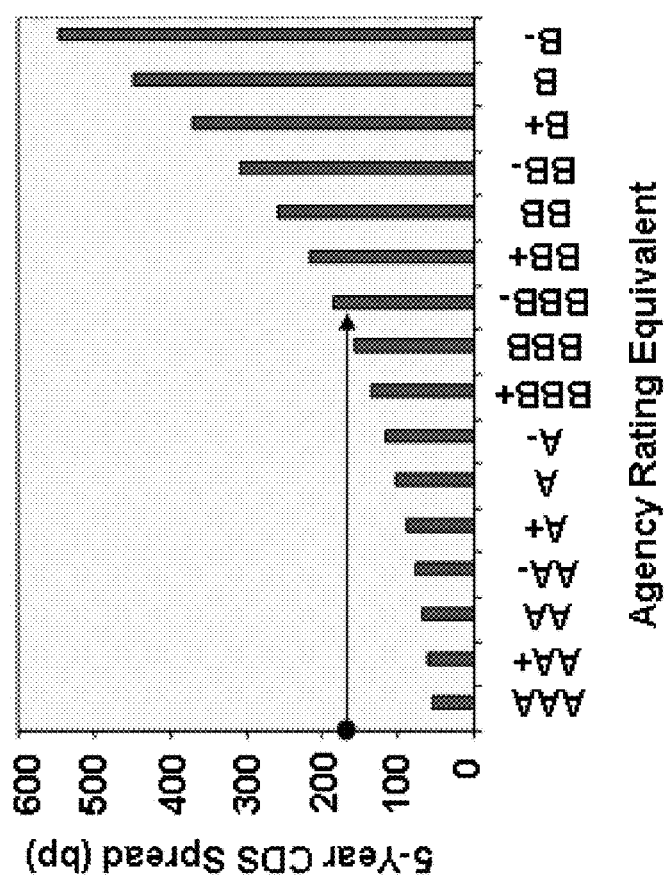
FIG. 43 depicts mapping between median 5-year CDS by credit rating according to an exemplary embodiment.

In one method, the model assigned an implied credit state to an obligor based on a mapping between median CDS spreads and credit ratings. An example of that mapping appears in FIG. 43. The figure shows how the implied credit state of an issuer is the rating the corresponding to the issuer's CDS spread relative to the spreads of all other rated issuers. The point on the CDS spread axis at 175 bp is shown to correspond to the bucketed median of firms with a triple-B-minus credit rating on Jul. 19, 2010. The implied state is calculated daily and uses CDS data and S&P ratings. Note that an issuer's implied rating can change if its CDS curve changes or if the overall CDS market changes.

A problem with this method is that the implied credit rating can change frequently when the issuer's market CDS places it near an implied rating boundary. In the example shown in FIG. 43, an issuer with a CDS of 175 bp would have an implied rating of triple-B-minus. However, if the CDS tightened to 160 bp the implied rating would improve to triple-B. The model requires an implied credit state because the calculation of the risk neutral credit-state transition matrix in which the issuer's risk neutral probability of default is combined with a historical ratings transition matrix. This calculation is numerically unstable when the actuarial probability of default is too small compared with the risk neutral probability of default.

Since an obligor can have only one rating, the model reconciles the actual and implied rating by assuming that the actual rating will converge to the implied rating following the upcoming coupon. For revolving loans, whose fees depend on credit state, the fees paid by the issuer can be different from what would be expected from the issuer's true rating. For example, given the pricing grid in FIG. 44, a double-A rated issuer pays a commitment fee of 15 bp per annum. However, if the issuer's CDS-implied credit state decreases to double-A-minus, the model assumes that the rating agencies will change the issuer's rating to double-A-minus after the next coupon payment. After the ratings change, the commitment fee increases to 25 bp as shown in FIG. 44. We note, rarely do the rating agencies change their ratings quickly after a market spread widening. Thus, the assumption that the rating and fee will change within a coupon period is likely incorrect.

In a revised method, the model is more aligned with the observation that if there were no observable market data changes, the loan should continue to pay the fee associated with its unchanged credit rating. Under the revised method, the fee in the above example should remain at 15 bp regardless of the internal implied state. The effect of the internally calculated implied state on the price loan should be minimal.

The model can be brought into agreement with economic intuition by creating an internal pricing grid where the fee associated with implied state is equal to the fee associated with the obligor's actual S&P rating. FIG. 45 displays the implied fee grid based on the pricing grid in FIG. 44 and the actual/implied states of from double-A+ to double-A-minus. Notice that in FIG. 45, the implied fee for implied state of double-A-minus is 15 bp, whereas the actual fee for that rating from FIG. 44 is 25 bp; the actual fee for a double-A-plus credit. The implied fee is a shift of the original fee structure. The number steps shifted is equal to the difference between implied and actual rating. In the example above, the shift is equal to difference between the numerical ratings of double-A and double-A-minus (2 notches). Note that if the shifting leaves some states without an implied fee—as is the case for triple-A in the example. Fees for those states are assigned using the value of its closest rating neighbor.

The model price is dependent on a change in implied credit state. That is, the expected price (EPV) on day i+1 is given by the price on day i plus the change in the following sensitivities and inputs:

$$EPV_{i+1} = PV_i + \begin{cases} \frac{\partial PV_i}{\partial CDS} * \Delta CDS + \frac{1}{2} * \frac{\partial^2 PV_i}{\partial CDS^2} * \Delta CDS^2 + \\ \frac{\partial PV_i}{\partial Tmat} * \Delta Tmat + \\ \frac{\partial PV_i}{\partial Irtg} * \Delta Irtg \end{cases} \quad (60)$$

where PV is model price, Tmat is time to maturity and Irtg is implied rating. Of course, a better expected price can be achieved by adding other sensitivities (interest rate, hazard rate per tenor, usage, etc) but the ones listed are the most important and practical ones for loans.

With the proposed changes the price attribution analysis no longer needs to consider the change in implied rating and the equation is simply, $$EPV_{i+1} = PV_i + \begin{cases} \frac{\partial PV_i}{\partial CDS} * \Delta CDS + \frac{1}{2} * \frac{\partial^2 PV_i}{\partial CDS^2} * \Delta CDS^2 + \\ \frac{\partial PV_i}{\partial Tmat} * \Delta Tmat \end{cases} \quad (61)$$

FIG. 46 illustrates the impact on the change in credit state assignment on prices from the model for a sample of credits for Jul. 16, 2010.

As expected, price differences are highest for those loans with the largest discrepancy between actual and implied ratings. For loans where the implied rating was better than the actual rating (e.g. American Electric) the expected fee increases and the price increases. Conversely, the price decreases if the implied state is worse. Note that for the synthetic letters of credit (e.g., El Paso and First Energy) there is no change when the proposed method is implemented because the fee does not depend on rating.

In implementing these systems and methods to be performed by a suitably programmed computer, it is intended that the computer have a processor and a computer readable medium, wherein the computer readable medium has program code. The program code can be made of one or more modules that carry out instructions for implementing the systems and methods herein. The processor can execute the instructions as programmed in the modules of the program code. For example, the processor can execute instructions for determining, calculating, assigning, obtaining, converting, computing, and variations thereof.

The systems and methods described can be implemented as a computer program product having a tangible computer readable medium having a computer readable program code embodied therein, the computer readable program code adapted to be executed to implement a method for performing the methods described above. Each step or aspect can be performed by a different module, or a single module can perform more than a single step.

The systems and methods described herein as software can be executed on at least one server, though it is understood that they can be configured in other ways and retain its functionality. The above-described technology can be implemented on known devices such as a personal computer, a special purpose computer, cellular telephone, personal digital assistant (PDA), a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Moreover, the disclosed methods may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method comprising:
   generating, by a server, in a database a record of a corporate loan, the record comprising data containing an initial credit state of the corporate loan, the database comprising non-transitory machine-readable storage media storing one or more records of one or more corporate loans;
   responsive to the server receiving from a first device a first data input containing a transition matrix containing a plurality of nodes, wherein each node in the transition matrix has a set of transition probabilities indicative of probabilities of transitioning to each subsequent node of the transition matrix:
   converting, by the server, the first data input containing the transition matrix received from the first device to a second data input containing a risk neutral matrix, based upon market data received from one or more servers;
   applying, by the server, backward induction for each node of the risk neural matrix;
   creating, by the server, a third data input containing a company-specific transition matrix using company-specific market data received from the one or more servers and the market data received from the one or more servers;
   calculating, by the server, the price of the corporate loan, based upon the first data input, the second data input, the third data input, and the initial state indicated by the record of the corporate loan stored in the database; and
   presenting, by the server, for display on a second device associated with a user an interface configured for visualizing sensitivity measures compared to various determinants and based on the price of the corporate loan.

2. The method according to claim 1, wherein converting the transition matrix to a risk neutral matrix comprises incorporating market data.

3. The method according to claim 2, wherein the market data is loan credit default swaps (LCDS) or credit default swaps (CDS) data.

4. The method according to claim 1, wherein creating the company-specific transition matrix comprises using company-specific loan credit default swaps (LCDS) or credit default swaps (CDS) data.

5. The method according to claim 1, wherein calculating the price for the corporate loan considers prepayment by the obligor.

6. The method according to claim 1, wherein calculating the price for the corporate loan considers an option adjusted spread or option adjusted price on the loan.

7. The method according to claim 1, further comprising assigning, by the server, a probability of transitioning to each subsequent node in the transition matrix.

8. The method according to claim 1, wherein converting further comprises applying the Jarrow, Lando and Turnbull (JLT) method.

9. A computer-implemented method comprising:
   generating, by a server, in a database a record of a corporate loan, the record comprising data containing an initial credit quality rating, the database comprising non-transitory storage media storing one or more records of one or more corporate loans;
   calculating, by the server, one or more sets of transition probabilities based on data inputs in response to the server receiving the data inputs from a first device;
   generating, by the server, a first data input containing a transition matrix of historical credit migrations based on the one or more sets of transition probabilities, wherein each node in the transition matrix has a set of transition probabilities indicative of probabilities of transitioning to each subsequent node of the transition matrix;
   converting, by the server, the first data input containing the transition matrix to a second data input containing a risk neutral matrix by assigning a default probability adjustment to the first data input containing the transition matrix;
   creating, by the server, a third data input containing a company-specific transition matrix using company-specific market data received from an input device;
   calculating, by the server, the price of the corporate loan for transmission to a user device based upon the first data input, the second data input, the third data input, and the initial credit quality rating in the record of the corporate loan in the database; and
   presenting, by the server, for display on a second device associated with a user an interface configured for visualizing sensitivity measures compared to various determinants and based on the price of the corporate loan.

10. The method according to claim 9, wherein calculating further comprises using backward induction.

11. The method according to claim 9, wherein converting the transition matrix to a risk neutral matrix comprises incorporating market data.

12. The method according to claim 11, wherein the market data is loan credit default swaps (LCDS) or credit default swaps (CDS) data.

13. The method according to claim 9, wherein creating the company-specific transition matrix comprises using company-specific loan credit default swaps (LCDS) or credit default swaps (CDS) data.

14. The method according to claim 9, wherein calculating the price for the corporate loan considers prepayment by the obligor.

15. The method according to claim 9, wherein calculating the price for the corporate loan considers an option adjusted spread or option adjusted price on the loan.

16. The method according to claim 9, further comprising assigning, by the server, a probability of transitioning to each subsequent node in the transition matrix.

17. The method according to claim 9, wherein converting further comprises applying the Jarrow, Lando and Turnbull (JLT) method.

* * * * *